US012704232B2

(12) United States Patent
Kolchiba

(10) Patent No.: US 12,704,232 B2
(45) Date of Patent: Aug. 11, 2026

(54) VEHICLE LAMP

(71) Applicant: KOITO MANUFACTURING CO., LTD., Tokyo (JP)

(72) Inventor: Mykyta Kolchiba, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/872,648

(22) PCT Filed: May 24, 2023

(86) PCT No.: PCT/JP2023/019301
§ 371 (c)(1),
(2) Date: Dec. 6, 2024

(87) PCT Pub. No.: WO2023/238667
PCT Pub. Date: Dec. 14, 2023

(65) Prior Publication Data

US 2025/0361997 A1 Nov. 27, 2025

(30) Foreign Application Priority Data

Jun. 9, 2022 (JP) ................................ 2022-093903
Jun. 9, 2022 (JP) ................................ 2022-093904
(Continued)

(51) Int. Cl.
*F21S 41/265* (2018.01)
*F21S 41/143* (2018.01)
(Continued)

(52) U.S. Cl.
CPC .......... *F21S 41/265* (2018.01); *F21S 41/143* (2018.01); *F21S 41/255* (2018.01); *F21S 41/275* (2018.01);
(Continued)

(58) Field of Classification Search
CPC ...... F21S 41/265; F21S 41/275; F21S 41/322; F21S 41/143; F21S 41/255; F21S 41/43;
(Continued)

(56) References Cited

U.S. PATENT DOCUMENTS 7,588,358 B1 * 9/2009 Condon ............ G02B 19/0061 362/520
7,648,256 B2 * 1/2010 Shiratsuchi .......... F21V 7/0091 362/268
(Continued)

FOREIGN PATENT DOCUMENTS

EP 3 879 313 A1 9/2021
JP 2009-187859 A 8/2009
(Continued)

OTHER PUBLICATIONS

Int. Search Report (PCT/ISA/210) dated Aug. 1, 2023 issued by the Int. Searching Authority in Application No. PCT/JP2023/019301.
(Continued)

*Primary Examiner* — Matthew J. Peerce
(74) *Attorney, Agent, or Firm* — Sughrue Mion, PLLC

(57) ABSTRACT

A vehicle lamp includes a light source, and a lens. The lens includes a central region centered on an optical axis of the lamp and a peripheral region located around the central region. A rear surface of the peripheral region is formed with plural total reflection prism elements which reflects light emitted from the light source toward the front of the vehicle lamp in a state of being aligned in a concentric circular form centered on the optical axis. The rear surface of the peripheral region includes an inner periphery-side region and an outer periphery-side region. The plurality of total reflection prism elements form a first annular concave curved surface centered on the optical axis as an envelope surface in the inner periphery-side region and form a second annular
(Continued)

concave curved surface centered on the optical axis as an envelope surface in the outer periphery-side region.

4 Claims, 62 Drawing Sheets

(30) Foreign Application Priority Data

| | | | |
|---|---|---|---|
| Jun. 9, 2022 | (JP) | ................................ | 2022-093905 |
| Jun. 9, 2022 | (JP) | ................................ | 2022-093906 |

(51) Int. Cl.

| | |
|---|---|
| ***F21S 41/20*** | (2018.01) |
| ***F21S 41/255*** | (2018.01) |
| ***F21S 41/275*** | (2018.01) |
| ***F21S 41/32*** | (2018.01) |
| ***F21S 41/43*** | (2018.01) |
| ***F21S 43/14*** | (2018.01) |
| ***F21S 43/20*** | (2018.01) |
| ***F21W 102/155*** | (2018.01) |
| ***F21Y 115/10*** | (2016.01) |

(52) U.S. Cl.
CPC .......... *F21S 41/285* (2018.01); *F21S 41/322* (2018.01); *F21S 41/43* (2018.01); *F21S 43/14* (2018.01); *F21S 43/26231* (2024.05); *F21S 43/26411* (2024.05); *F21S 43/26421* (2024.05); *F21W 2102/155* (2018.01); *F21Y 2115/10* (2016.08)

(58) Field of Classification Search
CPC .... F21S 41/285; F21S 43/14; F21S 43/26421; F21S 43/26411; F21S 43/26231
See application file for complete search history.

(56) References Cited

U.S. PATENT DOCUMENTS

| | | | | |
|---|---|---|---|---|
| 8,419,232 | B2 * | 4/2013 | Minano ................ | F21S 41/285 362/300 |
| 10,608,151 | B2 * | 3/2020 | Aruga .................... | F21S 43/26 |
| 12,218,294 | B2 * | 2/2025 | Okahisa ............... | F21S 41/143 |
| 2012/0075870 | A1 * | 3/2012 | Kayanuma ............. | F21V 5/045 362/333 |
| 2012/0300466 | A1 * | 11/2012 | Asai ..................... | F21V 7/0091 362/297 |
| 2014/0204592 | A1 | 7/2014 | Miyashita et al. | |
| 2018/0106445 | A1 | 4/2018 | Okubo | |
| 2018/0320852 | A1 | 11/2018 | Mandl | |
| 2021/0341123 | A1 | 11/2021 | Mototsuji | |
| 2021/0404611 | A1 | 12/2021 | Van Der Sijde et al. | |

FOREIGN PATENT DOCUMENTS

| | | | |
|---|---|---|---|
| JP | 2012-073545 | A | 4/2012 |
| JP | 2012-174601 | A | 9/2012 |
| JP | 2012-248407 | A | 12/2012 |
| JP | 2018-531495 | A | 10/2018 |
| JP | 2020-061231 | A | 4/2020 |
| JP | 2020-072055 | A | 5/2020 |
| JP | 2021-189306 | A | 12/2021 |
| WO | 2013/024836 | A1 | 2/2013 |

OTHER PUBLICATIONS

Written Opinion (PCT/ISA/237) dated Aug. 1, 2023 issued by the Int. Searching Authority in Application No. PCT/JP2023/019301.
Office Action issued on Aug. 14, 2025 by the Japanese Patent Office in corresponding JP Patent Application No. 2022-093904.
Communication issued on Jun. 16, 2026, by the European Patent Office in corresponding European Patent Application No. 23 819 650.5.

* cited by examiner

VEHICLE LAMP

CROSS-REFERENCE TO RELATED APPLICATIONS

This application is a National Phase Entry of PCT International Application No. PCT/JP2023/019301 filed on May 24, 2023, which claims priority to Japanese Patent Application No. 2022-093903 filed on Jun. 9, 2022, Japanese Patent Application No. 2022-093904 filed on Jun. 9, 2022, Japanese Patent Application No. 2022-093905 filed on Jun. 9, 2022, and Japanese Patent Application No. 2022-093906 filed on Jun. 9, 2022, the contents of all of which are incorporated herein by reference in their entirety.

TECHNICAL FIELD

The present disclosure relates to a vehicle lamp.

BACKGROUND ART

There has been known a vehicle lamp configured to radiate light emitted from a light source toward the front of a lamp through a lens.

As a configuration of the lens in such a vehicle lamp, Patent Literature 1 describes a configuration including a central region centered on an optical axis extending in a front-rear direction of the lamp and a peripheral region located around the central region. A plurality of total reflection prism elements, which allow light from a light source to be incident and then totally reflected toward the front of the lamp, are formed on a rear surface of the peripheral region in a state of being aligned in a concentric circular form centered on the optical axis.

In addition, there has been known a vehicle lamp configured to form a necessary light distribution pattern by radiating light emitted from a light source toward the front of the lamp through a microlens array.

As a configuration of the microlens array in such a vehicle lamp, Patent Literature 2 describes a configuration including a rear lens array having a plurality of condenser lens portions for condensing light emitted from a light source, and a front lens array having a plurality of projection lens portions for projecting each of a plurality of light source images formed by the plurality of condenser lens portions. This vehicle lamp is configured to include a collimator lens for allowing light emitted from the light source to be incident on the rear lens array as parallel light.

CITATION LIST

Patent Literature

Patent Literature 1: JP2009-187859A
Patent Literature 2: JP2020-61231A

SUMMARY OF INVENTION

Technical Problem

By adopting a configuration in which a plurality of total reflection prism elements allow light emitted from a light source to be incident and then totally reflected toward the front of the lamp, such as the lens of a vehicle lamp described in Patent Literature 1, it becomes possible to use light emitted from the light source as forward-radiated light over a wide area.

However, in the vehicle lamp described in FIG. 1 of Patent Literature 1, the lens is formed to extend in a flat plate shape along a vertical plane orthogonal to the optical axis. As a result, it is often difficult to obtain a sufficient amount of light for light directed toward an outer peripheral edge portion of the lens among the light emitted from the light source, and therefore, it is not easy to secure a sufficient amount of light emitted from the outer peripheral edge portion of the lens.

On the other hand, if the lens is formed to curve toward the rear side of the lamp with respect to the vertical plane orthogonal to the optical axis, as in the vehicle lamp shown in FIG. 11 of Patent Literature 1, it is possible to obtain a sufficient amount of light even for light emitted from the light source toward the outer peripheral edge portion of the lens.

However, when such a lens is adopted, the total reflection prism elements formed at the outer peripheral edge portion inevitably increase in size, resulting in a significant change in thickness at the outer peripheral edge portion of the lens. For this reason, when forming a lens, it becomes difficult to precisely form a total reflection prism element at the outer peripheral edge portion, making it difficult to perform high-precision light distribution control with this lens.

In addition, when such a lens is adopted, the light emitted from the light source, arriving at the outer peripheral edge portion, has a considerably large opening angle with respect to the optical axis. As a result, the reflected light from the plurality of total reflection prism elements becomes uneven in intensity depending on the radial position, making it difficult to perform high-precision light distribution control with this lens.

Further, in a vehicle lamp, such as that described in Patent Literature 1, if a plurality of lens elements for controlling the emission of light arriving from a plurality of total reflection prism elements are formed on the front surface of the lens in a state divided into a shape of vertical and horizontal grids, it becomes possible to form a light distribution pattern having a cutoff line at an upper end portion by appropriately adjusting the orientation of the plurality of lens elements.

In this case, it is desired to form a light distribution pattern with as clear a cutoff line as possible.

In a vehicle lamp, such as that described in Patent Literature 2, in order to form a light distribution pattern by the radiated light into one with reduced light distribution unevenness, it is desired to cause the light emitted from the light source to be incident on each of the plurality of condenser lens portions in the microlens array as parallel light of uniform brightness.

To achieve this, in the vehicle lamp described in Patent Literature 2, the collimator lens is configured as a large block-shaped light-transmitting member, which results in an increased depth dimension of the vehicle lamp.

Accordingly, an object of the present disclosure is to provide a vehicle lamp configured to radiate light emitted from a light source toward the front of the lamp through a lens, which enables an amount of light emitted from an outer peripheral edge portion of the lens to be sufficiently secured and light distribution control by the lens to be performed with high precision.

In addition, an object of the present disclosure is to provide a vehicle lamp configured to radiate light emitted from a light source toward the front of the lamp through a lens, which enables formation of a light distribution pattern with a clear cutoff line.

Further, an object of the present disclosure is to provide a vehicle lamp including a microlens array, which enables formation of a light distribution pattern with reduced light distribution unevenness while reducing a depth dimension of the vehicle lamp.

Solution to Problem

The present disclosure seeks to achieve the above object by devising a configuration for a rear surface in a region around a lens.

That is, a vehicle lamp according to a first aspect of the present disclosure includes:

a light source; and a lens, in which the vehicle lamp is configured to radiate light emitted from the light source toward a front of the vehicle lamp through the lens, the lens includes a central region centered on an optical axis extending in a front-rear direction of the vehicle lamp and a peripheral region located around the central region, a plurality of total reflection prism elements configured to allow light emitted from the light source to be incident and then totally reflected toward the front of the vehicle lamp are formed on a rear surface of the peripheral region in a state of being aligned in a concentric circular form centered on the optical axis, the rear surface of the peripheral region is divided into an inner periphery-side region and an outer periphery-side region, and the plurality of total reflection prism elements form a first annular concave curved surface centered on the optical axis as an envelope surface in the inner periphery-side region and form a second annular concave curved surface centered on the optical axis as an envelope surface in the outer periphery-side region.

The type of "vehicle lamp" is not particularly limited, and for example, a headlamp, a fog lamp, a tail lamp, a clearance lamp, and the like can be adopted.

The type of "light source" is not particularly limited, and for example, a light-emitting element such as a light-emitting diode, a light source bulb, and the like can be adopted.

The specific range and outer shape of each of the "central region" and the "peripheral region" are not particularly limited.

The specific curvature of each of the "first annular concave curved surface" and the "second annular concave curved surface" is not particularly limited.

In addition, the present disclosure seeks to achieve the above object by additionally arranging a condenser lens between a light source and a lens.

That is, a vehicle lamp according to a second aspect of the present disclosure includes:

a light source;

a lens; and a condenser lens arranged between the light source and the lens and configured to allow light emitted from the light source to be incident on the lens in a condensed state, in which the vehicle lamp is configured to radiate the light emitted from the light source toward a front of the vehicle lamp through the lens, the lens includes a central region centered on an optical axis extending in a front-rear direction of the vehicle lamp and a peripheral region located around the central region, a plurality of total reflection prism elements configured to allow light emitted from the light source to be incident and then totally reflected toward the front of the vehicle lamp are formed on a rear surface of the peripheral region in a state of being aligned in a concentric circular form centered on the optical axis, and the plurality of total reflection prism elements form an annular concave curved surface centered on the optical axis as an envelope surface.

The type of the "vehicle lamp" is not particularly limited, and for example, a headlamp, a fog lamp, a tail lamp, a clearance lamp, and the like can be adopted.

The type of "light source" is not particularly limited, and for example, a light-emitting element such as a light-emitting diode, a light source bulb, and the like can be adopted.

The specific range and outer shape of each of the "central region" and the "peripheral region" are not particularly limited.

The specific curvature of the "annular concave curved surface" is not particularly limited.

The "condenser lens" is not particularly limited in its specific configuration, arrangement, and the like as long as it is capable of allowing light emitted from a light source to be incident on the lens in a condensed state.

Further, the present disclosure seeks to achieve the above objects by devising a configuration for a front surface of a lens.

That is, a vehicle lamp according to a third aspect of the present disclosure includes:

a light source; and a lens, in which the vehicle lamp is configured to form a light distribution pattern with a cutoff line by radiating light emitted from the light source toward a front of the vehicle lamp through the lens, the lens includes a central region centered on an optical axis extending in a front-rear direction of the vehicle lamp and a peripheral region located around the central region, a plurality of total reflection prism elements configured to allow light emitted from the light source to be incident and then totally reflected toward the front of the vehicle lamp are formed on a rear surface of the peripheral region in a state of being aligned in a concentric circular form centered on the optical axis, a plurality of lens elements configured to control emission of light arriving from the plurality of total reflection prism elements are formed on a front surface of the lens in a state divided into a shape of vertical and horizontal grids, and at least some of the plurality of lens elements have vertical inclination angles set to different values from each other among the plurality of lens elements constituting a vertical row of the vertical and horizontal grids.

The type of "vehicle lamp" is not particularly limited, and for example, a headlamp, a fog lamp, and the like can be adopted.

The type of "light source" is not particularly limited, and for example, a light-emitting element such as a light-emitting diode, a light source bulb, and the like can be adopted.

The specific range and outer shape of each of the "central region" and the "peripheral region" are not particularly limited.

The "front surface of the lens" may be divided into a shape of vertical and horizontal grids in its entire region, or may be divided into a shape of vertical and horizontal grids in only a portion of the region.

The "plurality of lens elements" are not particularly limited in their specific shapes or sizes as long as the lens elements are formed in a state divided into a shape of vertical and horizontal grids.

Further, the present disclosure seeks to achieve the above object by devising a configuration for a collimator lens.

That is, a vehicle lamp according to a fourth aspect of the present disclosure includes:

a light source;

a microlens array including: a rear lens array having a plurality of condenser lens portions for condensing light emitted from the light source; and a front lens array having a plurality of projection lens portions for projecting each of a plurality of light source images formed by the plurality of condenser lens portions; and a collimator lens arranged between the light source and the rear lens array and configured to allow light emitted from the light source to be incident on the rear lens array as parallel light, in which the vehicle lamp is configured to form a light distribution pattern by radiate light emitted from the light source toward a front of the vehicle lamp through the microlens array, the collimator lens includes a central region centered on an optical axis extending in a front-rear direction of the vehicle lamp and a peripheral region located around the central region, a plurality of total reflection prism elements configured to allow light emitted from the light source to be incident and then totally reflected toward the front of the vehicle lamp are formed on a rear surface of the peripheral region in a state of being aligned in a concentric circular form centered on the optical axis, and the plurality of total reflection prism elements form an annular concave curved surface centered on the optical axis as an envelope surface.

The type of "vehicle lamp" is not particularly limited, and for example, a headlamp, a fog lamp, and the like can be adopted.

The type and specific shape of the "light distribution pattern" are not particularly limited, and for example, a high beam light distribution pattern or a low beam light distribution pattern of a headlamp, a light distribution pattern for a fog lamp, a light distribution pattern for road drawing, and the like can be adopted.

The type of "light source" is not particularly limited, and for example, a light-emitting element such as a light-emitting diode, a light source bulb, and the like can be adopted.

The specific range and outer shape of each of the "central region" and the "peripheral region" are not particularly limited.

The specific curvature of the "annular concave curved surface" is not particularly limited.

Advantageous Effects of Invention

The vehicle lamp according to the first aspect of the present disclosure is configured to radiate light emitted from the light source toward the front of the lamp through the lens. The plurality of total reflection prism elements configured to allow light emitted from the light source to be incident and then totally reflected toward the front of the lamp are formed on the rear surface of the peripheral region located around the central region centered on the optical axis extending in the front-rear direction of the lamp in the lens in a state of being aligned in a concentric circular form centered on the optical axis. Therefore, the light emitted from the light source can be used as forward-radiated light over a wide area.

In addition, since the rear surface of the peripheral region of the lens is divided into the inner periphery-side region and the outer periphery-side region, and the plurality of total reflection prism elements form the first annular concave curved surface centered on the optical axis as an envelope surface in the inner periphery-side region and form the second annular concave curved surface centered on the optical axis as an envelope surface in the outer periphery-side region, the following effects can be achieved.

That is, the plurality of total reflection prism elements form the first annular concave curved surface centered on the optical axis as an envelope surface in the inner periphery-side region of the rear surface of the peripheral region, so light emitted from the light source incident on the inner periphery-side region can be totally reflected toward the front of the lamp as light with substantially uniform brightness by the plurality of total reflection prism elements.

In addition, the plurality of total reflection prism elements form the second annular concave curved surface centered on the optical axis as an envelope surface in the outer periphery-side region of the rear surface of the peripheral region, so light emitted from the light source incident on the outer periphery-side region can also be totally reflected toward the front of the lamp as light with substantially uniform brightness by the plurality of total reflection prism elements.

Furthermore, the plurality of total reflection prism elements form the first and second annular concave curved surfaces set dually as envelope surfaces, ensuring that the sizes of the total reflection prism elements formed at an outer peripheral edge portion in the inner periphery-side region, as well as the total reflection prism elements formed at an outer peripheral edge portion in the outer periphery-side region, do not become excessively large. Therefore, when forming a lens, it becomes possible to precisely form a plurality of total reflection prism elements, thereby enabling light distribution control to be performed with high precision.

As such, according to the present disclosure, in a vehicle lamp configured to radiate light emitted from a light source toward the front of the lamp through a lens, light distribution control by the lens can be performed with high precision while sufficiently securing an amount of light emitted from the outer peripheral edge portion of the lens.

Furthermore, as in the present disclosure, the plurality of total reflection prism elements form the first and second annular concave curved surfaces set dually as envelope surfaces, ensuring that the lens can be made thinner compared to a case where a single annular concave curved surface is formed as an envelope surface.

In the above configuration, as an additional configuration, each of the plurality of total reflection prism elements formed in the inner periphery-side region may be configured to totally reflect light emitted from a first virtual point light source located on a rear side of the lamp relative to the light source as parallel light directed toward the forward-facing direction of the lamp, within a plane including the optical axis, and each of the plurality of total reflection prism elements formed in the outer periphery-side region may be configured to totally reflect light emitted from a second virtual point light source located on a rear side of the lamp relative to the light source and on a front side of the lamp relative to the first virtual point light source as parallel light directed toward the forward-facing direction of the lamp, within the plane including the optical axis. According to this configuration, the following effects can be achieved.

That is, the light source has a certain size, and by setting the positions of the first and second virtual point light sources as described above, it becomes possible to easily totally reflect the light emitted from the light source as substantially parallel light directed toward the forward-facing direction of the lamp by the plurality of totally reflecting prism elements in any of the inner periphery-side region and the outer periphery-side region.

In the above configuration, as an additional configuration, a position of the first virtual point light source may be set on an opposite side to an incidence region, in the inner periphery-side region, of light emitted from the first virtual point light source with respect to the optical axis, and a position of the second virtual point light source may be set on an opposite side to an incidence region, in the outer periphery-side region, of light emitted from the second virtual point light source with respect to the optical axis. According to this configuration, the light emitted from the light source having a certain size can be totally reflected as substantially parallel light directed toward the forward-facing direction of the lamp with higher precision by the plurality of totally reflecting prism elements in any of the inner periphery-side region and the outer periphery-side region.

In the above configuration, as an additional configuration, the light source may include a light-emitting element arranged with a light-emitting surface facing the front of the lamp. According to this configuration, it also becomes possible to easily form a light distribution pattern having a cutoff line or the like by radiated light from the vehicle lamp.

In the above configuration, as an additional configuration, a plurality of lens elements configured to control emission of light arriving from the plurality of total reflection prism elements may be formed on the front surface of the lens, and the plurality of lens elements may be configured such that a horizontal cross-sectional shape including the optical axis forms a convex curve centered on the optical axis as an envelope line According to this configuration, it becomes possible to easily form a light distribution pattern formed by radiated light from the vehicle lamp as a light distribution pattern with suppressed light unevenness.

The vehicle lamp according to the second aspect of the present disclosure is configured to radiate light emitted from the light source toward the front of the lamp through the lens. The plurality of total reflection prism elements configured to allow light emitted from the light source to be incident and then totally reflected toward the front of the lamp are formed on the rear surface of the peripheral region located around the central region centered on the optical axis extending in the front-rear direction of the lamp in the lens in a state of being aligned in a concentric circular form centered on the optical axis. Therefore, the light emitted from the light source can be used as forward-radiated light over a wide area.

In this case, since the plurality of total reflection prism elements form an annular concave curved surface centered on the optical axis as an envelope surface, a sufficient amount of light can be obtained even for light emitted from the light source toward the outer peripheral edge portion of the lens.

In addition, since the condenser lens configured to allow light emitted from the light source to be incident on the lens in a condensed state is arranged between the light source and the lens, an opening angle of light emitted from the light source, arriving at the outer peripheral edge portion of the peripheral region of the lens, with respect to the optical axis can be reduced. Accordingly, it is possible to prevent the intensity of reflected light from the plurality of total reflection prism elements from becoming uneven depending on the radial position, thereby enabling light distribution control by the lens to be performed with high precision.

As such, according to the present disclosure, in a vehicle lamp configured to radiate light emitted from a light source toward the front of the lamp through a lens, light distribution control by the lens can be performed with high precision while sufficiently securing an amount of light emitted from the outer peripheral edge portion of the lens.

In addition, in the above configuration, as an additional configuration, the condenser lens may be configured as a plano-convex lens whose front surface is formed into a convex curved surface shape. According to this configuration, it becomes possible to use the light emitted from the light source as forward-radiated light over a wider area.

In the above configuration, a plurality of condenser lens elements aligned in a concentric circular form centered on the optical axis may be configured to be formed on the front surface of the condenser lens. According to this configuration, a region where light emitted from the light source is incident on the lens through the condenser lens can be appropriately set by a surface shape of each of the plurality of condenser lens elements, resulting in enhanced degree of freedom of light distribution control by the lens.

In the above configuration, as an additional configuration, a plurality of lens elements configured to control emission of light arriving from the plurality of total reflection prism elements may be formed on the front surface of the lens. According to this configuration, the degree of freedom of light distribution control can be further enhanced.

In the above configuration, as an additional configuration, the light source may include a light-emitting element arranged with a light-emitting surface facing the front of the lamp. According to this configuration, it also becomes possible to easily form a light distribution pattern having a cutoff line or the like by radiated light from the vehicle lamp.

The vehicle lamp according to the third aspect of the present disclosure is configured to radiate light emitted from the light source toward the front of the lamp through the lens. The plurality of total reflection prism elements configured to allow light emitted from the light source to be incident and then totally reflected toward the front of the lamp are formed on the rear surface of the peripheral region located around the central region centered on the optical axis extending in the front-rear direction of the lamp in the lens in a state of being aligned in a concentric circular form centered on the optical axis. Therefore, the light emitted from the light source can be used as forward-radiated light over a wide area.

In addition, since the plurality of lens elements configured to control emission of light arriving from the plurality of total reflection prism elements are formed on the front surface of the lens in a state divided into a shape of vertical and horizontal grids, it becomes possible to easily form a light distribution pattern having a cutoff line at an upper end portion by appropriately adjusting the orientation of the plurality of lens elements.

In this case, since at least some of the plurality of lens elements have vertical inclination angles set to different values from each other among the plurality of lens elements constituting a vertical row of the vertical and horizontal grids, it becomes possible to align positions of upper end edges of a light distribution pattern formed by light emitted from each of the plurality of lens elements, thereby making it easy to form a light distribution pattern having a cutoff line at an upper end portion.

As such, according to the present disclosure, in a vehicle lamp configured to radiate light from a light source toward the front of the lamp through a lens, it is possible to form a light distribution pattern having a clear cutoff line.

In the above configuration, as an additional configuration, the plurality of lens elements having vertical inclination angles set to different values from each other may be formed continuously with each other in a vertical row of the vertical and horizontal grids. According to this configuration, it becomes possible to prevent a step from being formed between the plurality of lens elements. Also, it becomes possible to prevent upward scattered light from being unintentionally radiated from a step portion, making it possible to easily maintain a clear cutoff line. In addition, with the configuration in which no step is formed between the plurality of lens elements, the front surface of the lens can be made a simpler design, thereby enhancing the appearance of the lens.

In the above configuration, as an additional configuration, a plurality of lens elements having different horizontal cross-sectional shapes from each other may be provided as the plurality of lens elements having vertical inclination angles set to different values from each other. According to the above configuration, it is possible to form a light distribution pattern having a clear cutoff line while enabling a position of a high-intensity area to be appropriately displaced left or right from the forward-facing direction of the lamp, thereby making it easy to obtain light distribution suitable for vehicle traveling.

In the above configuration, as an additional configuration, the plurality of total reflection prism elements may form an annular concave curved surface centered on the optical axis as an envelope surface. According to this configuration, a sufficient amount of light can be obtained even for light emitted from the light source toward the outer peripheral edge portion of the lens.

In the above configuration, as an additional configuration, the light source may include a light-emitting element arranged with a light-emitting surface facing the front of the lamp. According to this configuration, it becomes possible to form a light distribution pattern having a cutoff line more easily by radiated light from the vehicle lamp.

In the vehicle lamp according to the fourth aspect of the present disclosure, light emitted from the light source incident on the microlens array as parallel light through the collimator lens is condensed by the plurality of condenser lens portions constituting the rear lens array of the microlens array, and the plurality of light source images formed by the condenser lens portions are projected by the plurality of projection lens portions constituting the front lens array of the microlens array, respectively. Therefore, it becomes possible to easily form a light distribution pattern in any shape.

In this case, the plurality of total reflection prism elements configured to allow light emitted from the light source to be incident and then totally reflected toward the front of the lamp are formed on the rear side of the peripheral region located around the central region centered on the optical axis extending in the front-rear direction of the lamp in the collimator lens in a state of being aligned in a concentric circular form centered on the optical axis. Therefore, the light emitted from the light source can be used as forward-radiated light over a wide area while suppressing the depth dimension of the vehicle lamp.

Furthermore, since the plurality of total reflection prism elements form an annular concave curved surface centered on the optical axis as an envelope surface, a sufficient amount of light can be obtained even for light emitted from the light source toward an outer peripheral edge portion of the collimator lens. Accordingly, the light emitted from the light source can be allowed to be incident on each of the plurality of condenser lens portions as parallel light with substantially uniform brightness, thereby enabling formation of a light distribution pattern with reduced light distribution unevenness.

As such, according to the present disclosure, in a vehicle lamp including a microlens array, a light distribution pattern with reduced light distribution unevenness can be formed while reducing the depth dimension of the vehicle lamp.

In the above configuration, as an additional configuration, the collimator lens and the rear lens array may be formed integrally. According to this configuration, the depth dimension of the vehicle lamp can be further reduced, and the cost of the vehicle lamp can be reduced by reducing the number of components.

In the above configuration, as an additional configuration, in the front lens array, that focal lengths of at least some of the projection lens portions among the plurality of projection lens portions may have different values from each other. According to this configuration, it is possible to form light distribution patterns of different sizes by light emitted from the plurality of projection lens portions, thereby enhancing the degree of freedom of light distribution of the combined light distribution pattern.

In the above configuration, as an additional configuration, a light-shielding sheet including a plurality of light-transmitting portions for defining respective outer shapes of the plurality of light source images may be arranged between the rear lens array and the front lens array. According to this configuration, it is possible to form a light distribution pattern corresponding to each size and outer shape of the plurality of light-transmitting portions.

In this case, the specific size and outer shape of each of the "plurality of light-transmitting portions" are not particularly limited.

In the above configuration, as an additional configuration, the light source may include a light-emitting element arranged with a light-emitting surface facing the front of the lamp. According to this configuration, it becomes possible to easily reduce the depth dimension of the vehicle lamp.

DESCRIPTION OF EMBODIMENTS

First Embodiment

Hereinafter, a first embodiment of the present disclosure will be described with reference to the drawings.

Figure 1:
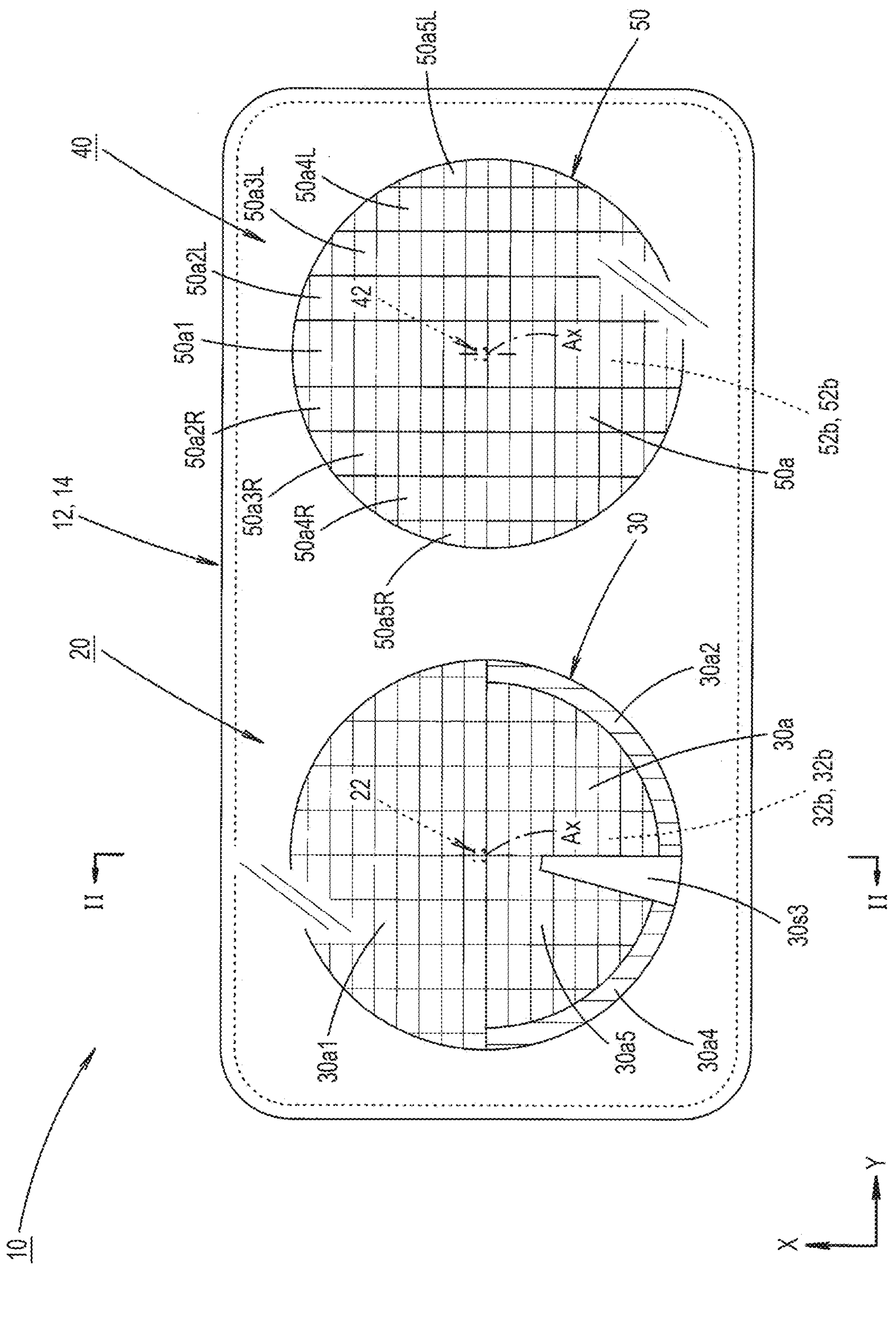
FIG. 1 is a front view showing a vehicle lamp according to a first embodiment of the present disclosure.
Figure 2:
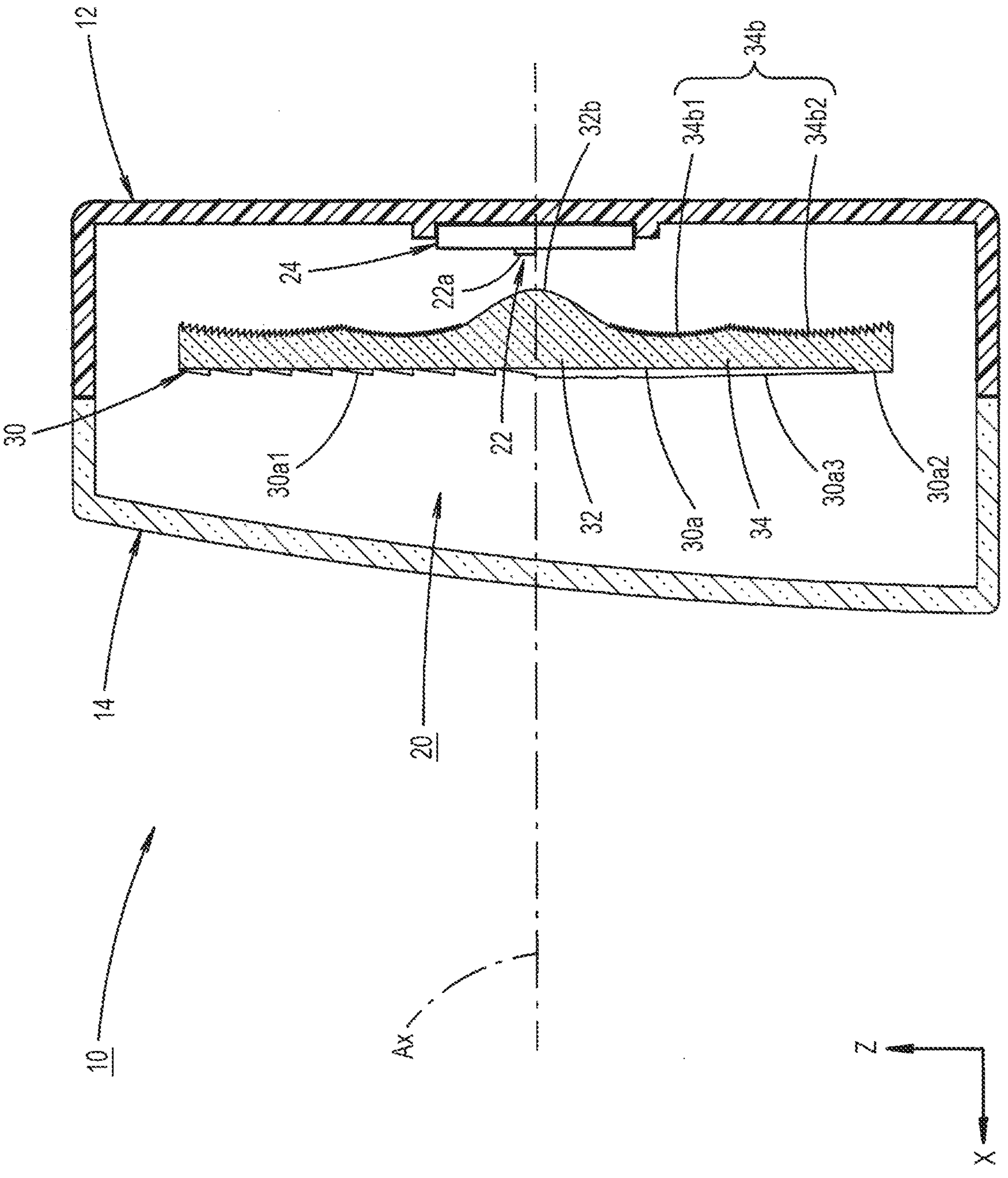
FIG. 2 is a cross-sectional view taken along line II-II of FIG. 1.

FIG. 1 is a front view showing a vehicle lamp 10 according to the first embodiment of the present disclosure. FIG. 2 is a cross-sectional view taken along line II-II of FIG. 1.

In FIGS. 1 and 2, a direction indicated by X is "front of the lamp," a direction indicated by Y is a "left direction" (or "right direction" when viewed from the front of the lamp) orthogonal to the "front of the lamp," and a direction indicated by Z is "upper direction." The same applies to the drawings other than FIGS. 1 and 2.

As shown in FIGS. 1 and 2, a vehicle lamp 10 according to the present embodiment is a headlamp arranged at a front end portion of a vehicle, and includes first and second lamp units 20 and 40 incorporated in a state of being aligned in a vehicle width direction within a lamp chamber formed by a lamp body 12 and a transparent light-transmitting cover 14 attached to a front end opening portion thereof.

The first lamp unit 20 includes a light-emitting element 22 and a lens 30 arranged on a front side of the lamp relative to the light-emitting element 22, and is configured to radiate light emitted from the light-emitting element 22 toward the front of the lamp through the lens 30.

The second lamp unit 40 includes a light-emitting element 42 and a lens 50 arranged on a front side of the lamp relative to the light-emitting element 42, and is configured to radiate light emitted from the light-emitting element 42 toward the front of the lamp through the lens 50.

The light-emitting elements 22 and 42 of the first and second lamp units 20 and 40 are supported on a lamp body 12 via a common substrate 24, and the lenses 30 and 50 are supported on the lamp body 12 via an attachment structure (not shown).

The vehicle lamp 10 is configured to form a low beam light distribution pattern (which will be described below) by radiated light from the first and second lamp units 20 and 40.

Next, the specific configurations of each of the first and second lamp units 20 and 40 will be described.

First, the configuration of the first lamp unit 20 will be described.

Figure 3A:
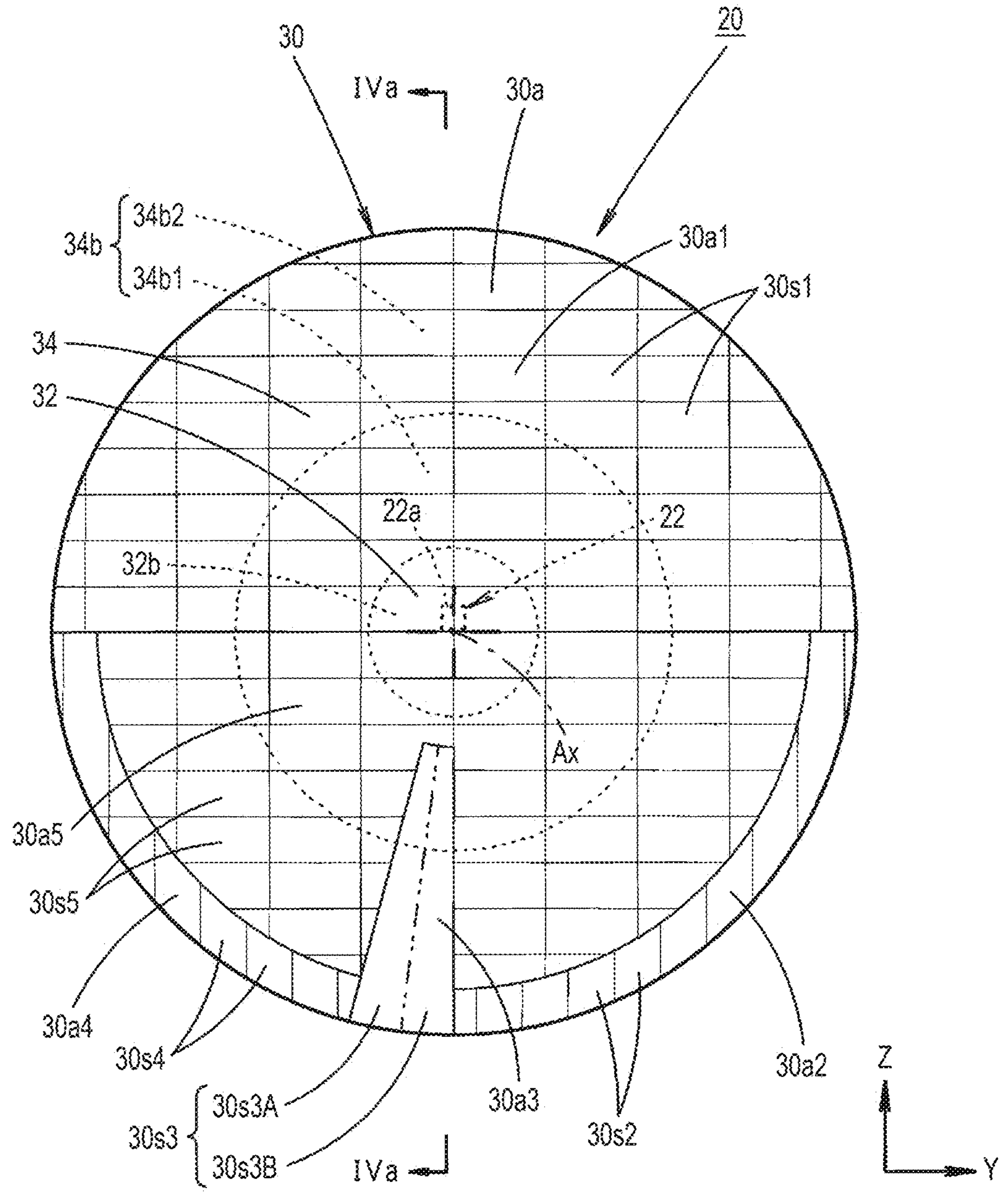
FIG. 3A is a front view showing a first lamp unit of the vehicle lamp.
Figure 4A:
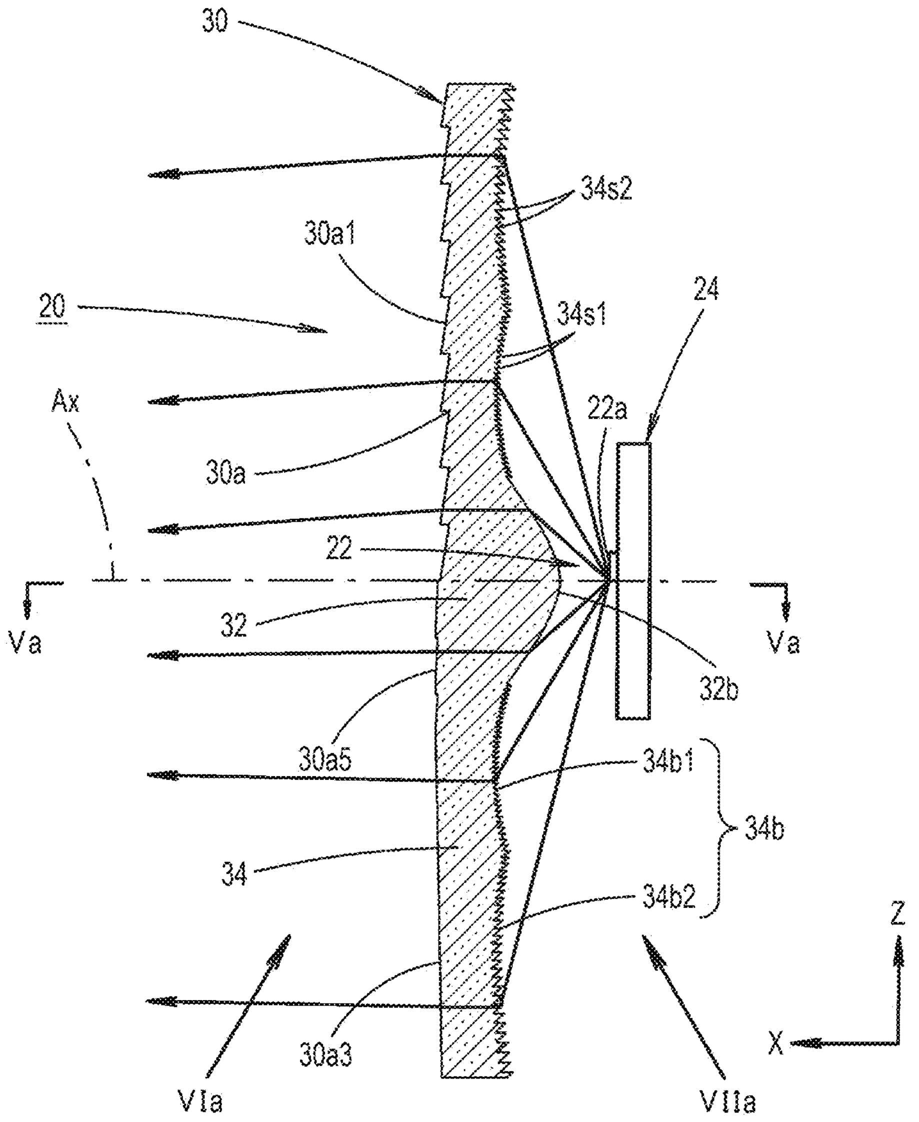
FIG. 4A is a cross-sectional view taken along line IVa-IVa of FIG. 3A.
Figure 5:
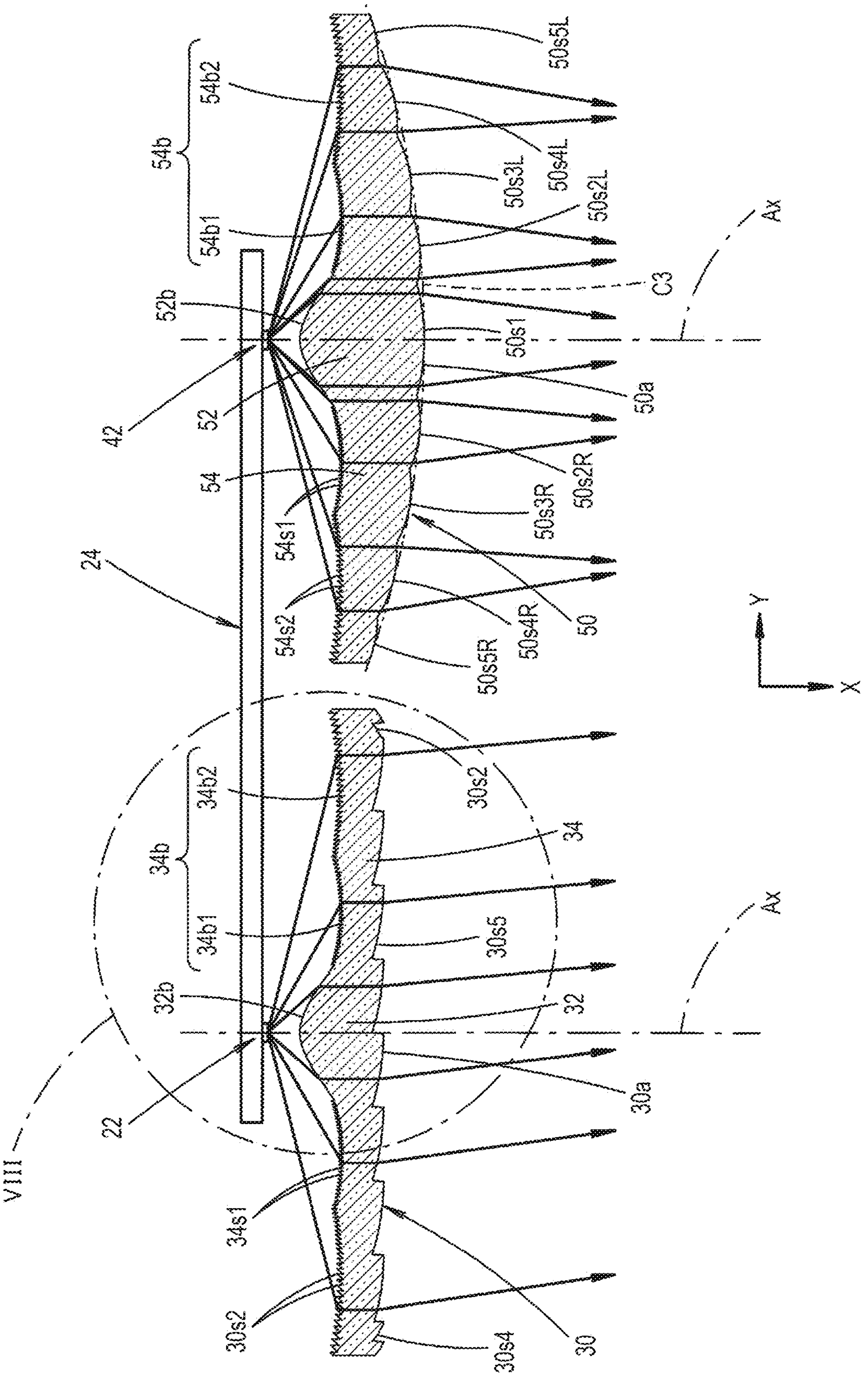
FIG. 5 is a cross-sectional view taken along line Va-Va of FIG. 4A.
Figure 6A:
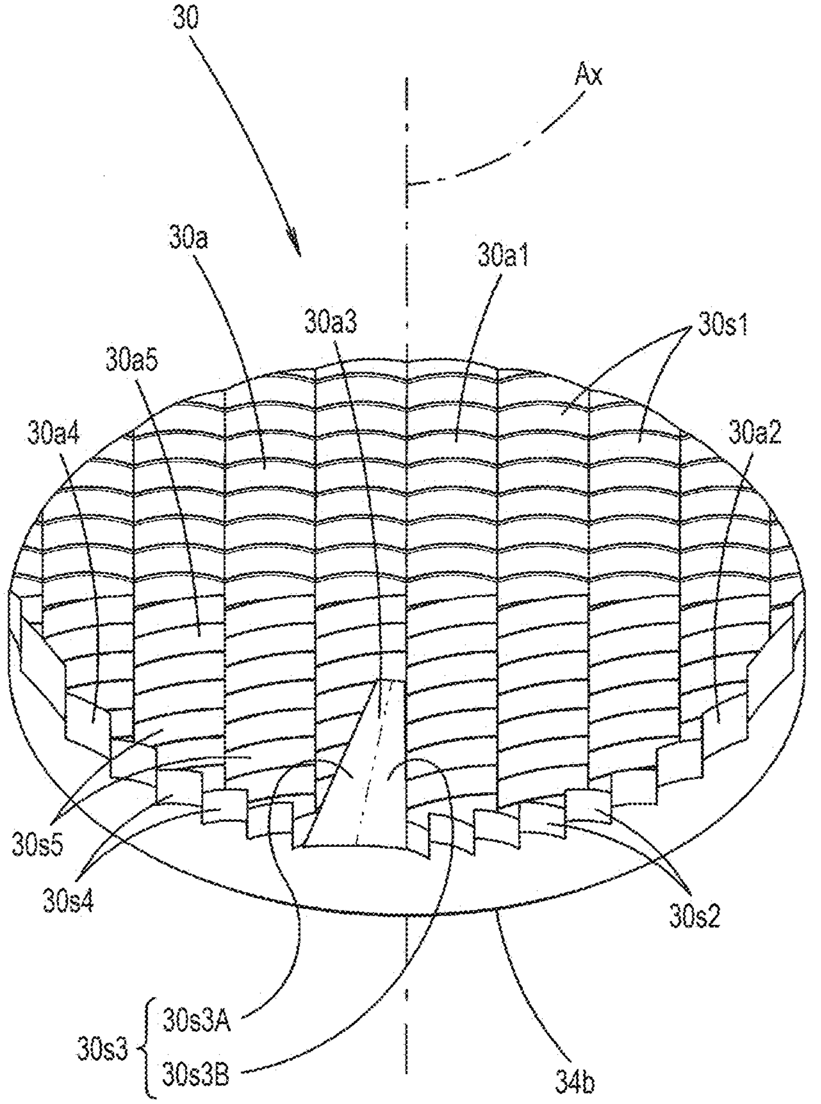
FIG. 6A is a perspective view showing a lens of the first lamp unit as viewed in a direction of arrow VIa of FIG. 4A.
Figure 7A:
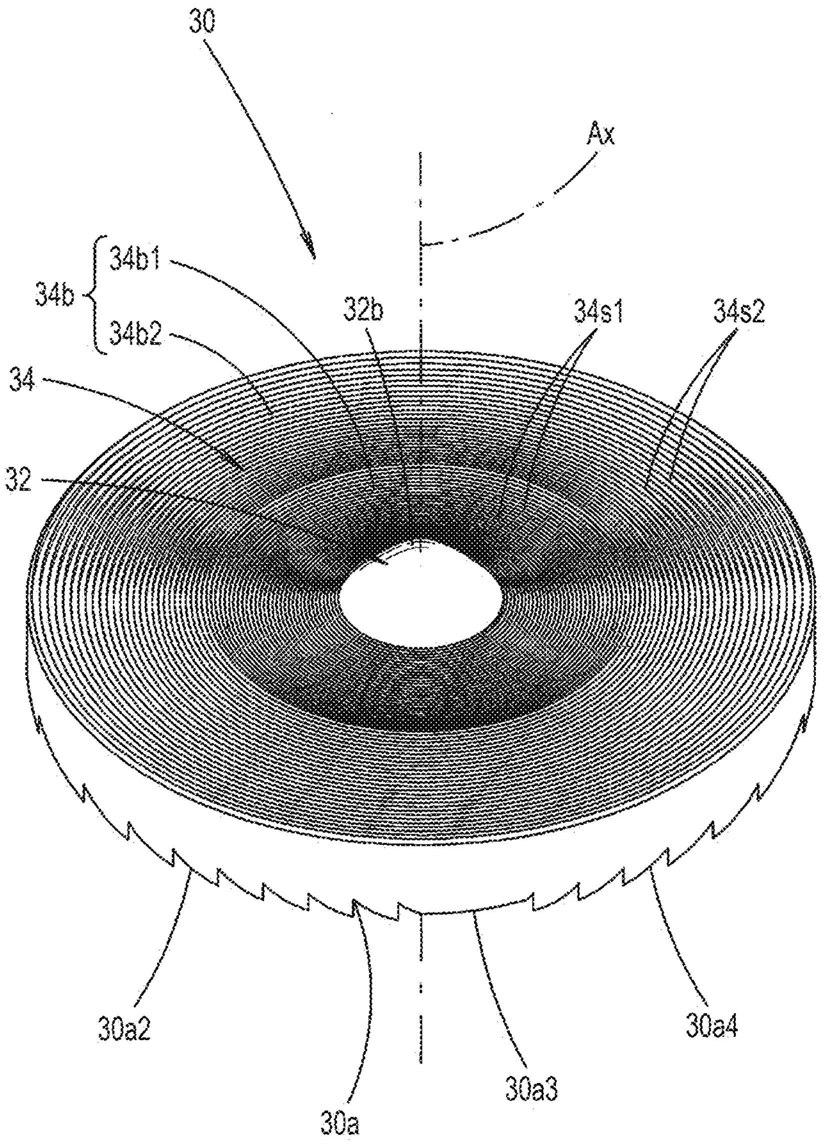
FIG. 7A is a perspective view showing the lens of the first lamp unit as viewed in a direction of arrow VIIa of FIG. 4A.

FIG. 3A is a front view showing the first lamp unit 20. FIG. 4A is a cross-sectional view taken along line IVa-IVa of FIG. 3A, and FIG. 5 is a cross-sectional view taken along line Va-Va of FIG. 4A. In addition, FIG. 6A is a perspective view showing the lens 30 of the first lamp unit 20 as viewed in a direction of arrow VIa of FIG. 4A, and FIG. 7A is a perspective view showing the lens 30 as viewed in a direction of arrow VIIa of FIG. 4A.

As shown in these drawings, the lens 30 of the first lamp unit 20 has an optical axis Ax extending in the front-rear direction of the lamp, and has a circular outer shape centered on the optical axis Ax when viewed from the front of the lamp. An outer dimension of the lens 30 is set to a value of 50 mm or less (e.g., about 35 mm).

The light-emitting element 22 is a white light-emitting diode and is arranged with a light-emitting surface 22*a* facing the front of the lamp (specifically, the forward-facing direction of the lamp). The light-emitting surface 22*a* of the light-emitting element 22 has a rectangular outer shape (specifically, a square of about 1×1 mm). The light-emitting element 22 is arranged in a state where a center position in the left-right direction on a lower end edge of the light-emitting surface 22*a* (hereinafter, referred to as a "reference position") is positioned on the optical axis Ax of the lens 30.

The lens 30 is an injection-molded product made of transparent resin and has a central region 32 centered on the optical axis Ax and a peripheral region 34 located around the central region 32.

A rear surface 32*b* of the central region 32 is configured as a single convex lens surface centered on the optical axis Ax, and is designed to deflect light emitted from the light-emitting element 22 to be incident in a direction close to the optical axis Ax. Specifically, a surface shape of the rear surface 32*b* is set to guide the light emitted from the reference position of the light-emitting element 22 to a front surface 30*a* of the lens 30 as parallel light directed toward the forward-facing direction of the lamp.

A rear surface 34*b* of the peripheral region 34 is divided into an inner periphery-side region 34*b*1 and an outer periphery-side region 34*b*2.

A plurality of total reflection prism elements 34*s*1 are formed on the inner periphery-side region 34*b*1 in a state of being aligned in a concentric circular form centered on the optical axis Ax, and a plurality of total reflection prism elements 34*s*2 are formed on the outer periphery-side region 34*b*2 in a state of being aligned in a concentric circular form centered on the optical axis Ax.

The plurality of total reflection prism elements 34*s*1 and 34*s*2 are all Fresnel lens-type total reflection prisms and are configured to allow light emitted from the light-emitting element 22 to be incident and then totally reflected toward the front of the lamp. Specifically, each of the plurality of total reflection prism elements 34*s*1 and 34*s*2 is designed to allow light emitted from the reference position of the light-emitting element 22 to be incident while being refracted in a direction away from the optical axis Ax and then to be guided to the front surface 30*a* of the lens 30 as parallel light directed toward the forward-facing direction of the lamp.

A boundary position between the central region 32 and the peripheral region 34 is defined by a circle with a radius of 3 to 5 mm (e.g., a radius of about 4 mm) centered on the optical axis Ax. In addition, a boundary position between the inner periphery-side region 34*b*1 and the outer periphery-side region 34*b*2 is defined by a circle with a radius of 8 to 12 mm (e.g., a radius of about 10 mm) centered on the optical axis Ax.

Figure 8:
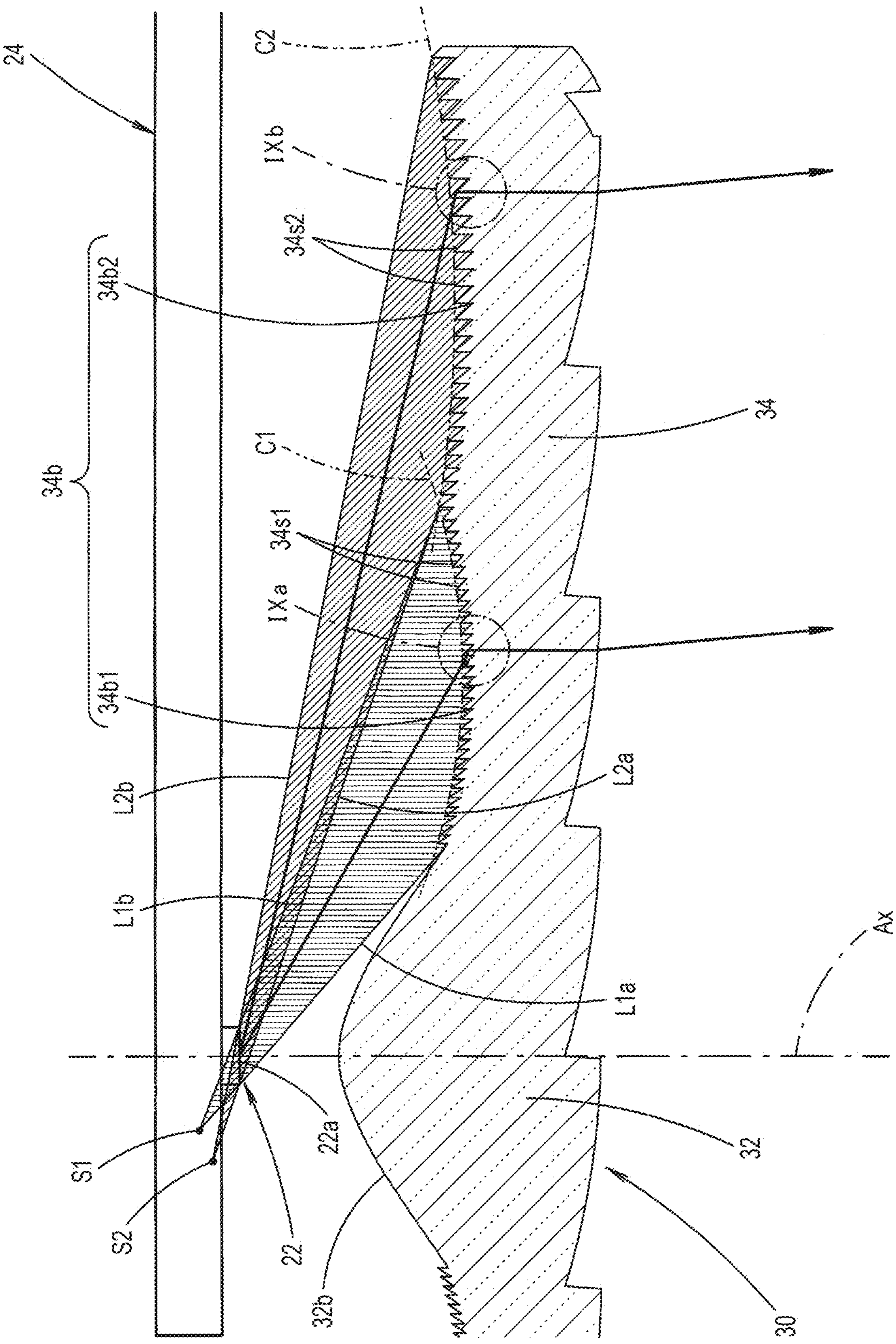
FIG. 8 is a detailed view of portion VIII of FIG. 5.
Figure 9A:
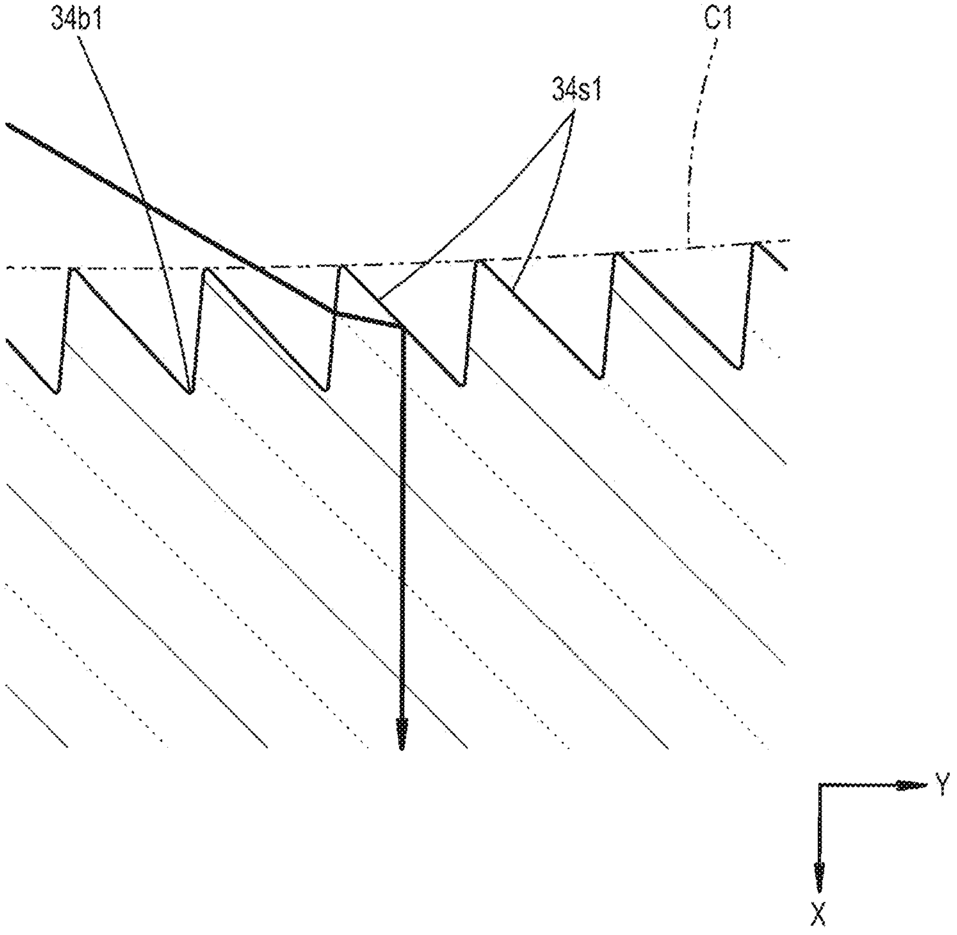
FIG. 9A is a detailed view of portion IXa of FIG. 8.
Figure 9B:
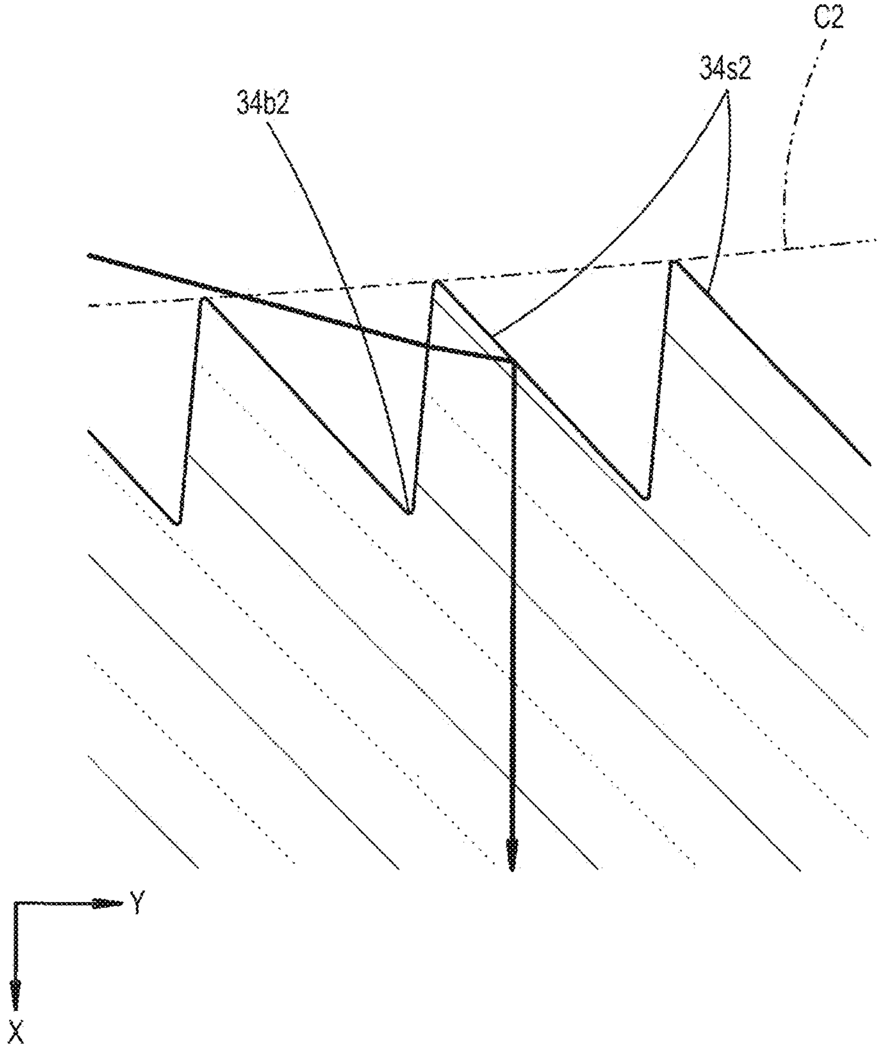
FIG. 9B is a detailed view of portion IXb of FIG. 8.

FIG. 8 is a detailed view of portion VIII of FIG. 5. FIG. 9A is a detailed view of portion IXa of FIG. 8, and FIG. 9B is a detailed view of portion IXb of FIG. 8.

As shown in FIG. 8, among the plurality of total reflection prism elements 34*s*1 and 34*s*2 formed on the rear surface 34*b* of the peripheral region 34, the plurality of total reflection prism elements 34*s*1 positioned in the inner periphery-side region 34*b*1 form a first annular concave curved surface C1 (a cross-sectional shape is indicated by a two-dot chain line in the drawing) centered on the optical axis Ax as an envelope surface, and the plurality of total reflection prism elements 34*s*2 positioned in the outer periphery-side region 34*b*2 form a second annular concave curved surface C2 (a cross-sectional shape is indicated by a two-dot chain line in the drawing) centered on the optical axis Ax as an envelope surface.

Each of the plurality of total reflection prism elements 34*s*1 formed in the inner periphery-side region 34*b*1 is configured to totally reflect light emitted from a first virtual point light source S1 located on a rear side of the lamp relative to the light-emitting surface 22*a* of the light-emitting element 22 as parallel light directed toward the forward-facing direction of the lamp, within a plane including the optical axis Ax. The first virtual point light source S1 is located on an opposite side to an incidence region, in the inner periphery-side region 34*b*1, of light emitted from the first virtual point light source S1 with respect to the optical axis Ax. Specifically, the first virtual point light source S1 is located at an intersection of a straight line L1*a* connecting an inner peripheral edge of the inner periphery-side region 34*b*1 and a right end edge (a left end edge in FIG. 8) of the light-emitting surface 22*a* of the light-emitting element 22 and a straight line Lib connecting an outer peripheral edge of the inner periphery-side region 34*b*1 and a left end edge of the light-emitting surface 22*a* of the light-emitting element 22.

In addition, each of the plurality of total reflection prism elements 34*s*2 formed in the outer periphery-side region 34*b*2 is configured to totally reflect light emitted from a second virtual point light source S2 located on a rear side of the lamp relative to the light-emitting surface 22*a* of the light-emitting element 22 and on a front side of the lamp relative to the first virtual point light source S1 as parallel light directed toward the forward-facing direction of the lamp, within the plane including the optical axis Ax. The second virtual point light source S2 is located on an opposite side to an incidence region, in the outer periphery-side region 34*b*2, of light emitted from the second virtual point light source S2 with respect to the optical axis Ax. Specifically, the second virtual point light source S2 is located at an intersection of a straight line L2*a* connecting an inner peripheral edge of the outer periphery-side region **34*b*2 and the right end edge of the light-emitting surface 22*a* of the light-emitting element 22** and a straight line L2*b* connecting an outer peripheral edge of the outer periphery-side region **34*b*2 and the left end edge of the light-emitting surface 22*a* of the light-emitting element 22**.

It is noted that since the plurality of total reflection prism elements **34*s*1 and 34*s*2** are formed over an entire circumference centered on the optical axis Ax, the first and second virtual point light sources S1 and S2 are also arranged to draw annular trajectories centered on the optical axis Ax.

The first annular concave curved surface C1 is formed such that inner and outer peripheral edges of the inner periphery-side region **34*b*1 are substantially at the same position with respect to the front-rear direction of the lamp. In addition, the second annular concave curved surface C2 is formed such that inner and outer peripheral edges of the outer periphery-side region 34*b*2** are substantially at the same position with respect to the front-rear direction of the lamp.

In addition, as shown in FIG. 9A, in the inner periphery-side region **34*b*1, a pitch of the plurality of total reflection prism elements 34*s*1 and a curvature of the first annular concave curved surface CI are set such that the light emitted from the light-emitting element 22 is incident approximately equally on each of the plurality of total reflection prism elements 34*s*1. In addition, as shown in FIG. 9B, in the outer periphery-side region 34*b*2, a pitch of the plurality of total reflection prism elements 34*s*2 and a curvature of the second annular concave curved surface C2 are set such that the light emitted from the light-emitting element 22 is incident approximately equally on each of the plurality of total reflection prism elements 34*s*2**.

As a result, the plurality of total reflection prism elements **34*s*1 formed in the inner periphery-side region 34*b*1 have a cross-sectional shape in which the total reflection prism elements 34*s*1 located closer to the outer peripheral edge of the inner periphery-side region 34*b*1 are larger than the total reflection prism elements 34*s*1 located closer to the inner peripheral edge. In addition, the plurality of total reflection prism elements 34*s*2 formed in the outer periphery-side region 34*b*2 have a cross-sectional shape in which the total reflection prism elements 34*s*2 located closer to the outer peripheral edge of the outer periphery-side region 34*b*2 are larger than the total reflection prism elements 34*s*1** located closer to the inner peripheral edge.

The plurality of total reflection prism elements **34*s*2 formed in the outer periphery-side region 34*b*2 have a larger cross-sectional shape as a whole than the plurality of total reflection prism elements 34*s*1 formed in the inner periphery-side region 34*b*1. However, since the plurality of total reflection prism elements 34*s*1 and 34*s*2 form the first and second annular concave curved surfaces C1 and C2 set dually as envelope surfaces, even the total reflection prism element 34*s*2 located closer to the outer peripheral edge of the outer periphery-side region 34*b*2** does not become large in its cross-sectional shape.

In the lens 30, the central region 32 is partially thick, but the peripheral region 34 is thin as a whole. Specifically, the central region 32 has a maximum thickness of about 4 to 6 mm on the optical axis Ax, while the peripheral region 34 has a substantially constant thickness of about 2 to 4 mm.

As shown in FIGS. 3A to 6B, the front surface **30*a* of the lens 30** includes a plurality of lens elements (which will be described below) formed on a vertical plane orthogonal to the optical axis Ax.

The front surface **30*a* of the lens 30 is divided into five emission regions 30*a*1, 30*a*2, 30*a*3, 30*a*4, and 30*a*5**.

The emission region **30*a*1 is a semicircular region located in an upper half of the front surface 30*a*, the emission regions 30*a*2 and 30*a*4 are semicircular arc-shaped regions extending in a band shape along an outer peripheral edge of the lower half of the front surface 30*a*, the emission region 30*a*3 is a region having a vertically long outer shape spreading downward in a fan shape in a lower region of the front surface 30*a*, and the emission region 30*a*5 is a remaining region in the lower half of the front surface 30*a***.

The emission region **30*a*1 is divided into a shape of vertical and horizontal grids, each of which is horizontally long (e.g., about 2×4 mm), with a convex curved lens element 30*s*1 assigned to each grid. Each lens element 30*s*1 is configured to emit light from the light-emitting element 22, arriving as parallel light from the rear surfaces 32*b* and 34*b* of the lens 30**, toward the front of the lamp while deflecting the light downward and then widely diffusing the deflected light in the left-right direction.

The emission regions **30*a*2 and 30*a*4 are divided into a shape of vertical stripes (e.g., with a horizontal width of about 2 mm) with each of convex curve-shaped lens elements 30*s*2 and 30*s*4** assigned to each vertical striped region.

Each of the lens elements **30*s*2 constituting the emission region 30*a*2 located on the left side of the emission region 30*a*3 (on the right side when viewed from the front of the lamp) is configured to emit light from the light-emitting element 22, arriving as parallel light from the rear surface 34*b* of the lens 30**, toward the front of the lamp while slightly deflecting the light downward and then widely diffusing the deflected light in the right direction.

Each of the lens elements **30*s*4 constituting the emission region 30*a*4 located on the right side of the emission region 30*a*3 is configured to emit light from the light-emitting element 22, arriving as parallel light from the rear surface 34*b* of the lens 30**, toward the front of the lamp while slightly deflecting the light upward and then widely diffusing the deflected light in the left direction.

The emission region **30*a*3 has a left side edge (a right edge when viewed from the front of the lamp) configured by a straight line extending in a direction directly downward from the optical axis Ax, and a right side edge configured by a straight line extending in a direction inclined to the right with respect to the direction directly downward from the optical axis Ax (specifically, a direction inclined at an angle of about 15° to the right from the direction directly downward). An upper end edge of the emission region 30*a*3 is configured by an arc centered on the optical axis Ax. The arc is located on a slightly outer periphery side with respect to the boundary position between the central region 32 and the peripheral region 34 of the lens 30. In addition, a lower end edge of the emission region 30*a*3 is configured by an outer peripheral edge of the front surface 30*a***.

The emission region **30*a*3 is configured by a single lens element 30*s*3. The lens element 30*s*3 has a surface shape with a convex free-form curved surface. That is, the surface of the lens element 30*s*3 has a free-form curved surface whose curvature of the convex curved surface gradually changes from a right half 30*s*3A to a left half 30*s*3B. The lens element 30*s*3 is configured to emit light from the light-emitting element 22, arriving as parallel light from the rear surface 34*b* of the lens 30, toward the front of the lamp while slightly deflecting the light upward and then gradually changing an emission direction thereof from the right half 30*s*3A to the left half 30*s*3**B.

Similarly to the emission region 30*a*1, the emission region 30*a*5 is divided into a shape of vertical and horizontal grids with a convex curved lens element 30*s*5 assigned to each grid. However, each lens element 30*s*5 is configured to emit light from the light-emitting element 22, arriving as parallel light from the rear surfaces 32*b* and 34*b* of the lens 30, toward the front of the lamp while slightly deflecting the light downward and then widely diffusing the deflected light in the left direction.

Next, the configuration of the second lamp unit 40 will be described.

Figure 3B:
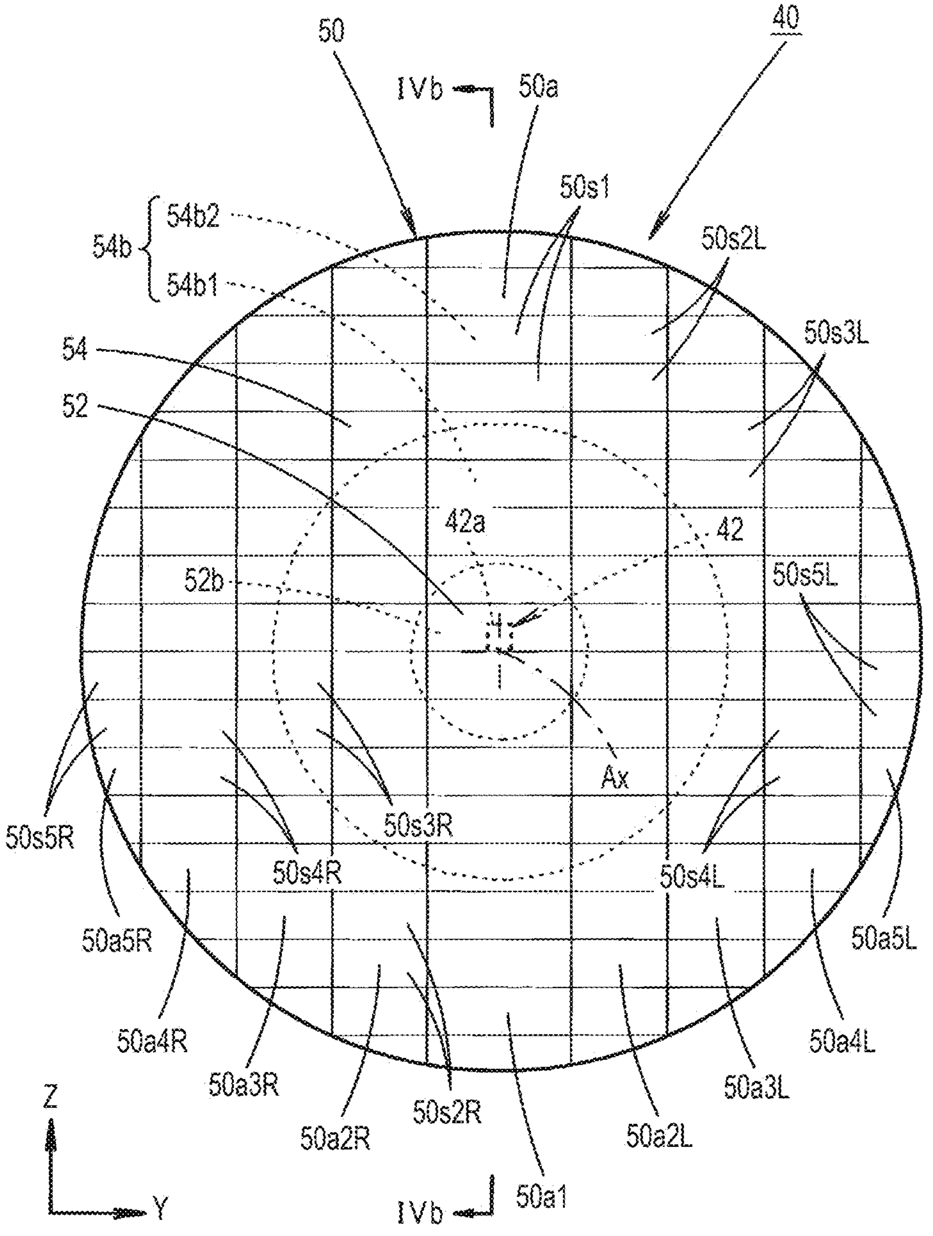
FIG. 3B is a front view showing a second lamp unit of the vehicle lamp.
Figure 4B:
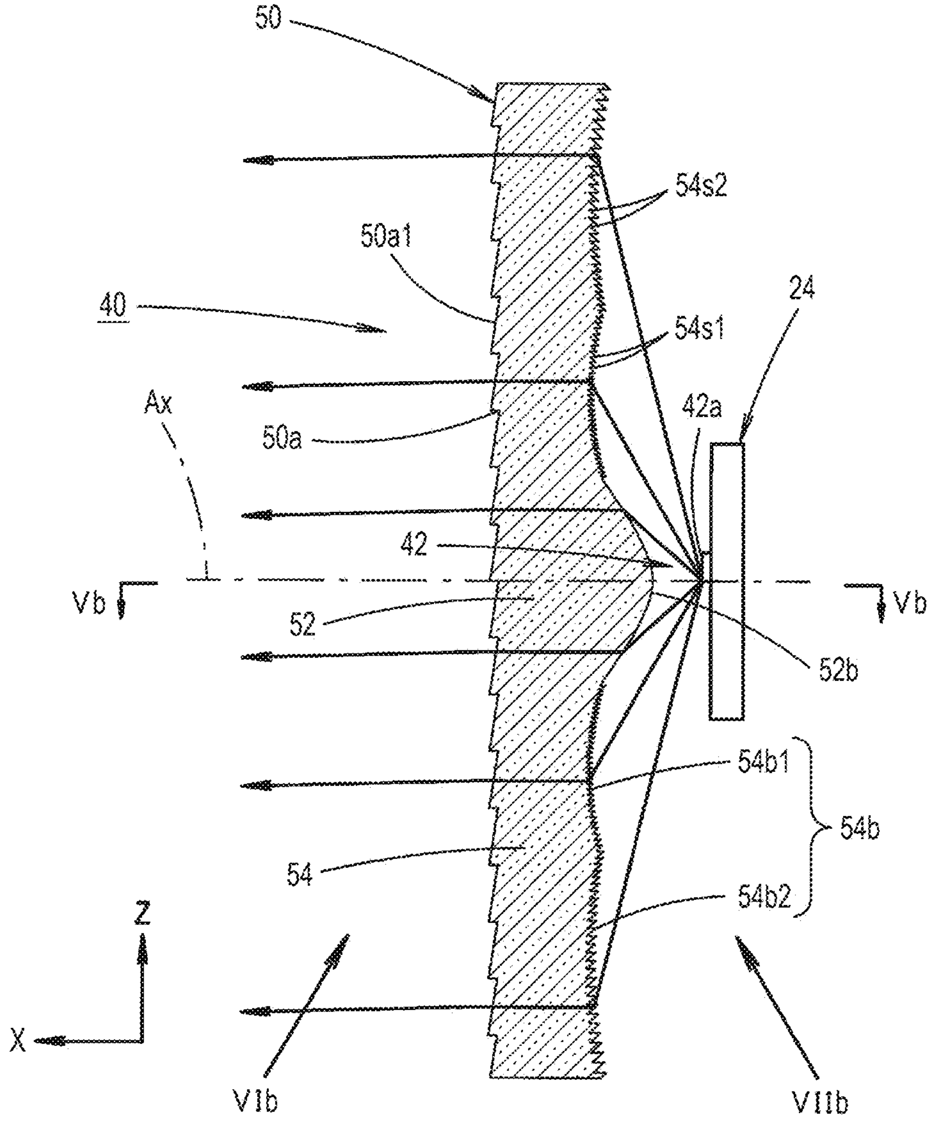
FIG. 4B is a cross-sectional view taken along line IVb-IVb of FIG. 3B.
Figure 6B:
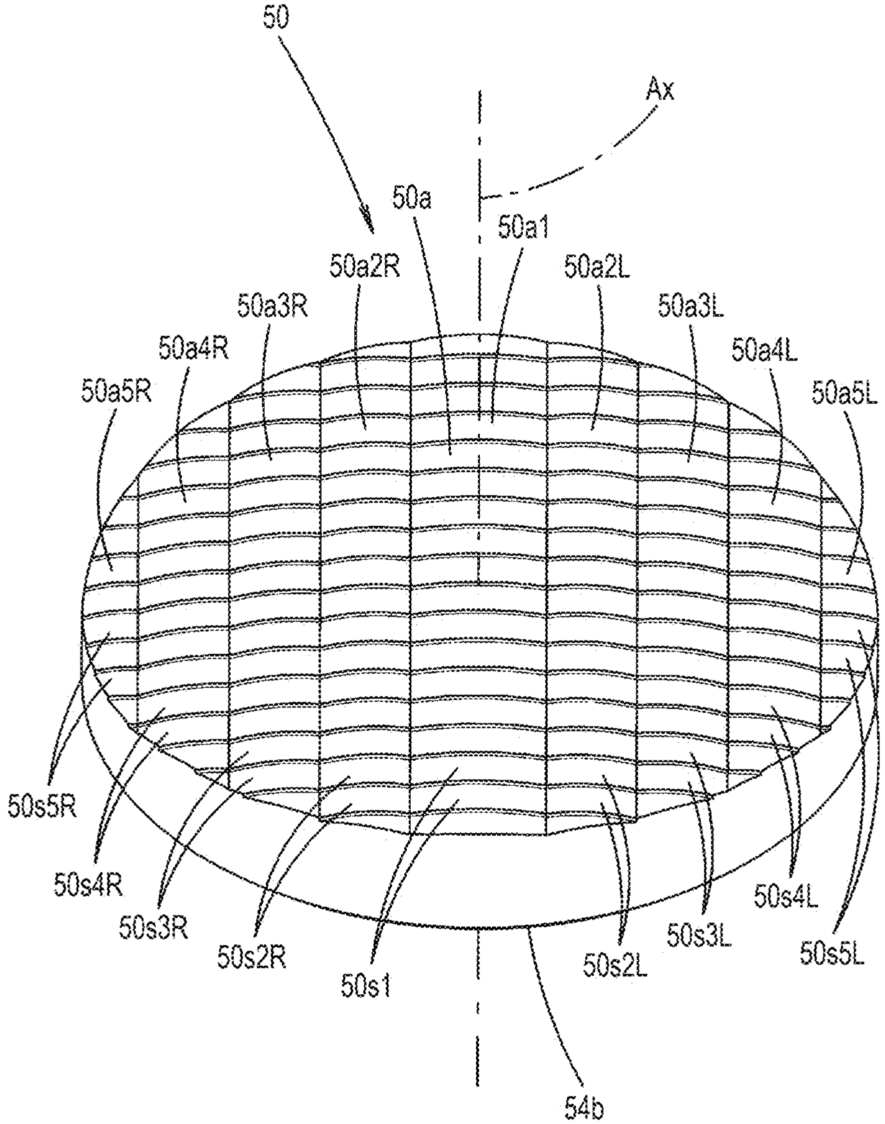
FIG. 6B is a perspective view showing a lens of the second lamp unit as viewed in a direction of arrow VIb of FIG. 4B.
Figure 7B:
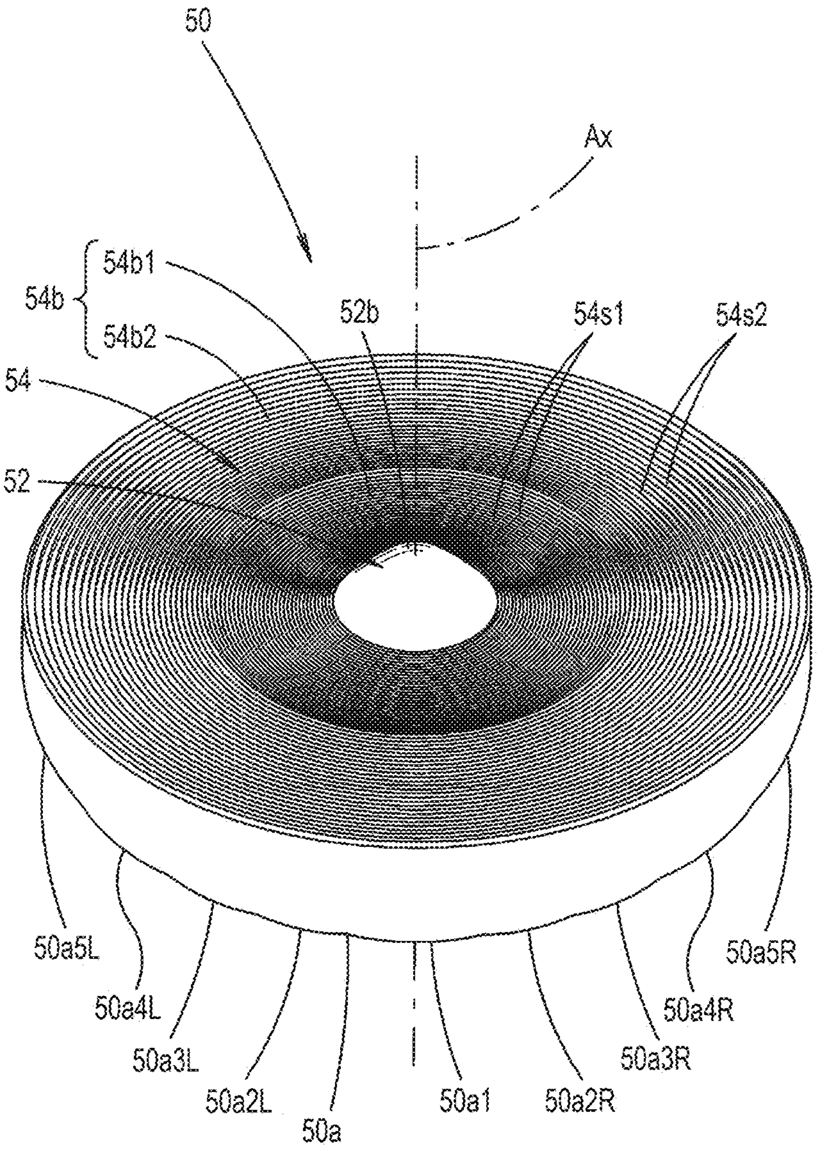
FIG. 7B is a perspective view showing the lens of the second lamp unit as viewed in a direction of arrow VIIb of FIG. 4B.

FIG. 3B is a front view showing the second lamp unit 40. FIG. 4B is a cross-sectional view taken along line IVb-IVb of FIG. 3B, and FIG. 5 is a cross-sectional view taken along line Vb-Vb of FIG. 4B. In addition, FIG. 6B is a perspective view showing the lens 50 of the second lamp unit 40 as viewed in a direction of arrow VIb of FIG. 4B, and FIG. 7B is a perspective view showing the lens 50 as viewed in a direction of arrow VIIb of FIG. 4B.

As shown in the drawings, also in the second lamp unit 40, the configuration and arrangement of the light-emitting element 42 are similar to those of the light-emitting element 22 of the first lamp unit 20, the basic configuration and arrangement of the lens 50 are similar to those of the lens 30 of the first lamp unit 20. A configuration of a front surface 50*a* is different from that of the lens 30.

That is, the lens 50 of the second lamp unit 40 is an injection-molded product made of transparent resin and has a central region 52 centered on the optical axis Ax extending in the front-rear direction of the lamp and a peripheral region 54 located around the central region 52.

The configurations of a rear surface 52*b* of the central region 52 and a rear surface 54*b* of the peripheral region 54 are similar to those of the lens 30 of the first lamp unit 20. That is, the rear surface 54*b* of the peripheral region 54 is divided into an inner periphery-side region 54*b*1 and an outer periphery-side region 54*b*2, each formed with the plurality of total reflection prism elements 54*s*1 and 54*s*2 aligned in a concentric circular form centered on the optical axis Ax, respectively.

The front surface 50*a* of the lens 50 is divided into nine emission regions 50*a*1, 50*a*2L, 50*a*2R, 50*a*3L, 50*a*3R, 50*a*4L, 50*a*4R, 50*a*5L, and 50*a*5R, each formed with a plurality of lens elements (which will be described below).

The nine emission regions 50*a*1 to 50*a*5R are each formed as a band-shaped region extending in the vertical direction along a cylindrical surface bulging toward the front side of the lamp and extending in the vertical direction.

The emission region 50*a*1 is formed with a wide width (for example, a width of about 6 mm) centered on the optical axis Ax, and on the left and right sides thereof, the emission regions 50*a*2L and 50*a*2R, the emission regions 50*a*3L and 50*a*3R, the emission regions 50*a*4L and 50*a*4R, and the emission regions 50*a*5L and 50*a*5R are formed to be adjacent in this order, each with a width of, for example, about 4 mm.

The nine emission regions 50*a*1 to 50*a*5R are all divided by a certain vertical width (e.g., a width of about 2 mm) and are assigned with convex curved lens elements 50*s*1, 50*s*2L, 50*s*2R, 50*s*3L, 50*s*3R, 50*s*4L, 50*s*4R, 50*s*5L, and 50*s*5R, respectively. Each of the plurality of lens elements 50*s*1 to 50*s*5R is configured to emit light from the light-emitting element 42, arriving as parallel light from the rear surfaces 52*b* and 54*b* of the lens 50, toward the front of the lamp while deflecting the light downward and then diffusing the deflected light in the left-right direction.

As shown in FIG. 5, the plurality of lens elements 50*s*1 to 50*s*5R are configured such that a horizontal cross-sectional shape including the optical axis Ax forms a convex curve C3 centered at a point on the optical axis Ax as an envelope line. Accordingly, the light emitted from each of the lens elements 50*s*1 constituting the emission region 50*a*1 located at the center becomes light that is evenly diffused to the left and right, but the light emitted from each of the lens elements 50*s*2L to 50*s*5R constituting the other emission regions 50*a*2L to 50*a*5R becomes light that is unevenly diffused to the left and right because an inclination angle of the convex curve C3 toward the rear side of the lamp gradually increases from the optical axis Ax toward both left and right sides. That is, the degree of unevenness in the left-right diffusion increases in the order of the lens elements 50*s*2L and 50*s*2R, the lens elements 50*s*3L and 50*s*3R, the lens elements 50*s*4L and 50*s*4R, and the lens elements 50*s*5L and 50*s*5R.

Figure 10:
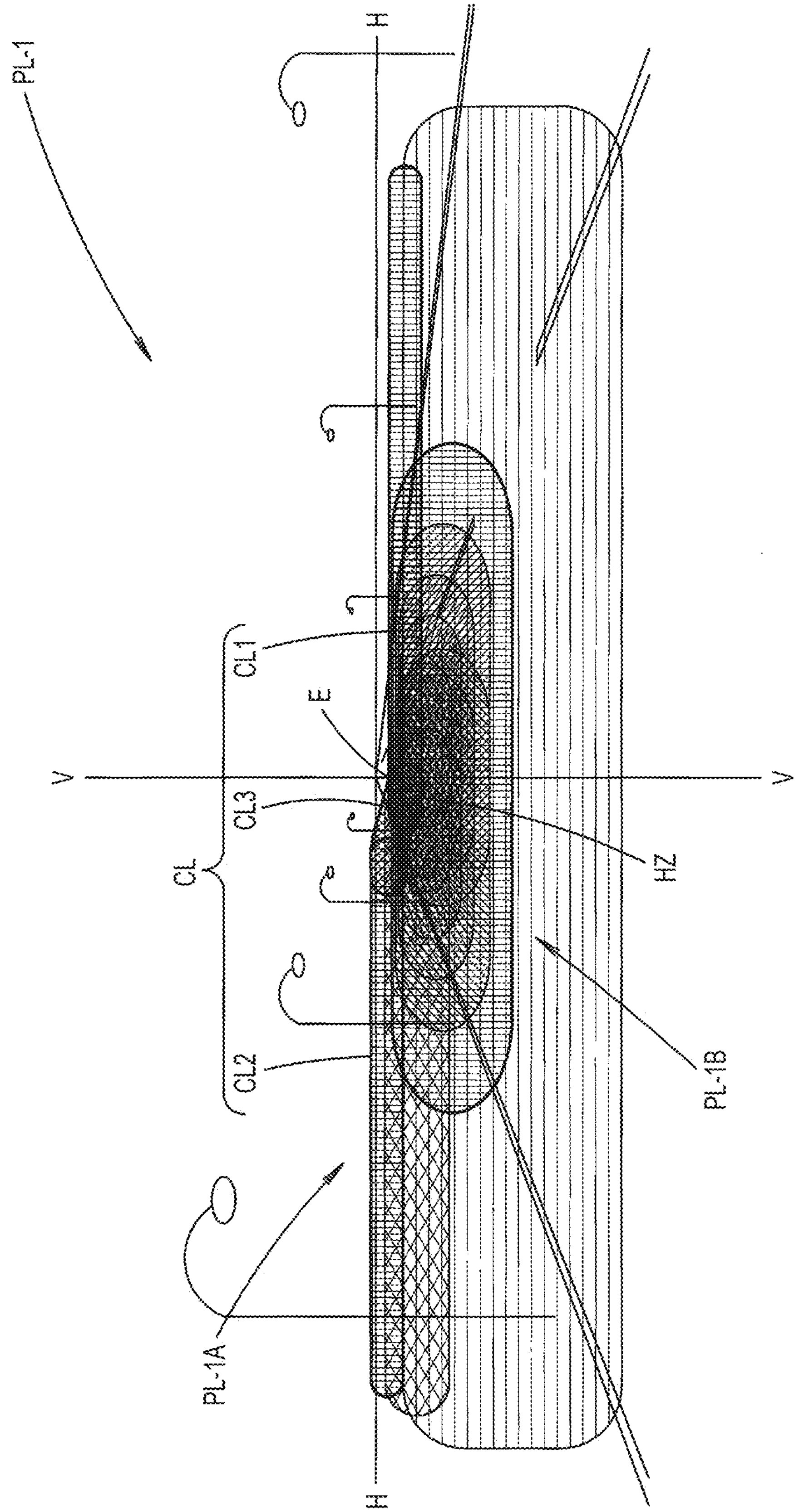
FIG. 10 is a perspective view showing a low beam light distribution pattern formed by radiated light from the vehicle lamp.

FIG. 10 is a perspective view showing a low beam light distribution pattern PL-1 formed on a virtual vertical screen placed 25 m ahead of the lamp by radiated light from the vehicle lamp 10.

The low beam light distribution pattern PL-1 is a low beam light distribution pattern of left light distribution, and an upper end portion thereof is formed with a stepped cutoff line CL.

The stepped cutoff line CL has a shape in which a lower cutoff line CL1 and an upper cutoff line CL2, offset vertically and extending horizontally, are connected via a slope portion CL3. In this case, the stepped cutoff line CL is formed such that the lower cutoff line CL1 is positioned on the opposite lane side with respect to a V-V line, which is a vertical line passing through an H-V vanishing point in the forward-facing direction of the lamp, and the slope portion CL3 and the upper cutoff line CL2 are positioned on the own lane side. The upper cutoff line CL2 is positioned slightly above an H-H line, which is a horizontal line passing through H-V.

In the low beam light distribution pattern PL-1, an elbow point E, which is an intersection of the lower cutoff line CL1 and the slope portion CL3, is located about 0.5 to 0.6° below H-V, and the slope portion CL3 extends obliquely in the upper left direction from the elbow point E at an inclination angle of 15° with respect to the horizontal direction. In the low beam light distribution pattern PL-1, a high-intensity region HZ is formed near the lower left of the elbow point E.

The low beam light distribution pattern PL-1 is formed as a combined light distribution pattern in which a first light distribution pattern PL-1A formed by radiated light from the first lamp unit 20 and a second light distribution pattern PL-1B formed by radiated light from the second lamp unit 40 are superimposed.

Figure 11:
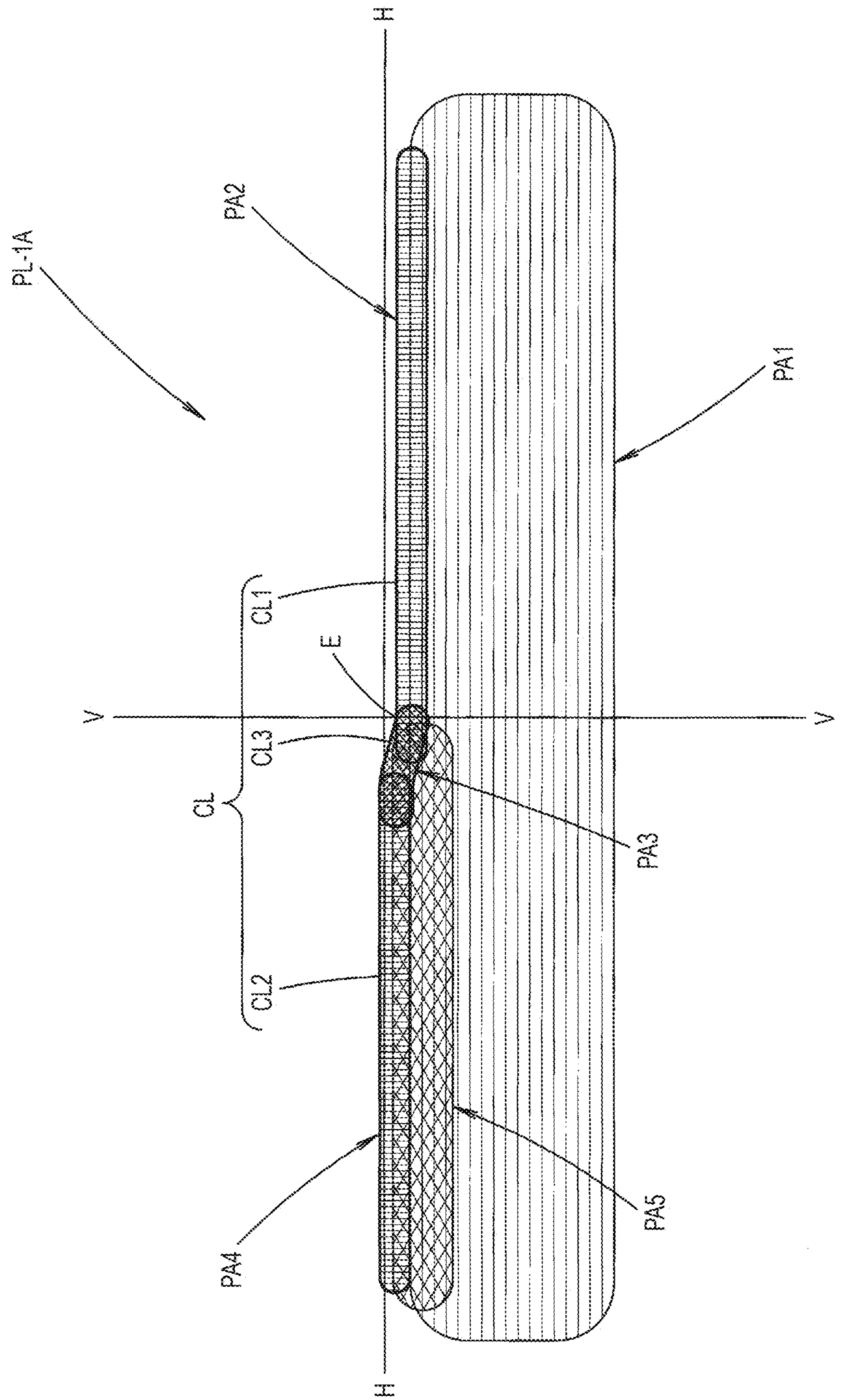
FIG. 11 is a view showing a first light distribution pattern formed by radiated light from the first lamp unit.

FIG. 11 is a view showing the first light distribution pattern PL-1A.

As shown in FIG. 11, the first light distribution pattern PL-1A is formed as a combined light distribution pattern in which five light distribution patterns PA1, PA2, PA3, PA4, and PA5 are superimposed.

The light distribution pattern PA1 is a light distribution pattern formed by light emitted from the emission region 30*a*1 on the front surface 30*a* of the lens 30, and is formed as a horizontally long light distribution pattern widely expanding in the left-right direction with a relatively large vertical width below the H-H line. The light distribution pattern PA1 is designed to form a wide diffusion area of the low beam light distribution pattern PL-1.

The light distribution pattern PA2 is a light distribution pattern formed by light emitted from the emission region 30*a*2 on the front surface 30*a* of the lens 30, and is formed as a horizontally long bright light distribution pattern expanding rightward from the vicinity of the V-V line with a narrow vertical width in the vicinity below the H-H line. The light distribution pattern PA2 is designed to form the lower cutoff line CL1 of the low beam light distribution pattern PL-1 by its upper end edge.

The formation of such a light distribution pattern PA2 is due to the fact that an opening angle of the light-emitting surface 22*a* of the light-emitting element 22 from the outer peripheral edge portion in the outer periphery-side region 34*b*2 of the peripheral region 34 becomes small, and therefore, the light distribution pattern formed by the light emitted from the emission region 30*a*2 located on the front side of the lamp is likely to be small and bright.

The light distribution pattern PA3 is a light distribution pattern formed by light emitted from the emission region 30*a*3 on the front surface 30*a* of the lens 30, and is formed as a small and bright light distribution pattern extending obliquely upward to the left with a narrow vertical width in the vicinity below the H-V. The light distribution pattern PA3 is designed to form the slope portion CL3 and a right end portion of the upper cutoff line CL2 of the low beam light distribution pattern PL-1 by its upper end edge. The formation process of the light distribution pattern PA3 will be described below.

The light distribution pattern PA4 is a light distribution pattern formed by light emitted from the emission region 30*a*4 on the front surface 30*a* of the lens 50, and is formed as a horizontally long bright light distribution pattern expanding leftward from the vicinity of the left of the V-V line with a narrow vertical width substantially along the H-H line. The light distribution pattern PA4 is designed to form the upper cutoff line CL2 of the low beam light distribution pattern PL-1 by its upper end edge. In this case, the light distribution pattern PA4 is formed so that a right end portion thereof smoothly connects to and overlaps the light distribution pattern PA3.

As in the light distribution pattern PA2, the formation of such a light distribution pattern PA4 is due to the fact that an opening angle of the light-emitting surface 22*a* of the light-emitting element 22 from the outer peripheral edge portion in the outer periphery-side region 34*b*2 of the peripheral region 34 becomes small, and therefore, the light distribution pattern formed by the light emitted from the emission region 30*a*4 located on the front side of the lamp is likely to be small and bright.

The light distribution pattern PA5 is a light distribution pattern formed by light emitted from the emission region 30*a*5 on the front surface 30*a* of the lens 30 and is formed as a horizontally long, relatively bright light distribution pattern expanding leftward from the vicinity of the left side of the V-V line with a relatively narrow vertical width, spanning both the light distribution pattern PA4 and the light distribution pattern PA1, with its right end portion overlapping the light distribution pattern PA3.

Figure 12:
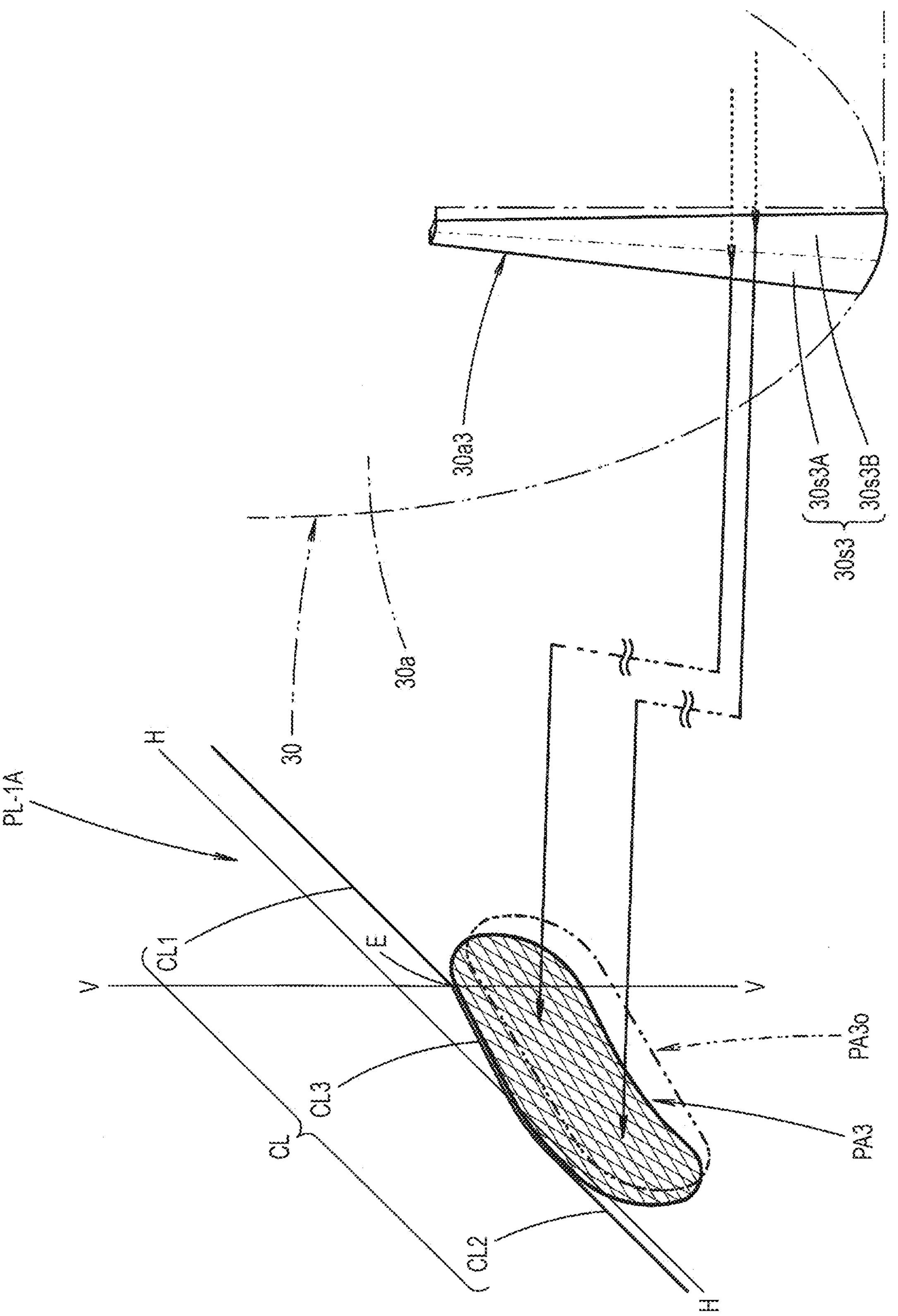
FIG. 12 is a view for illustrating a formation process of part of the first light distribution pattern.

FIG. 12 is a view for illustrating the formation process of the light distribution pattern PA3, and shows a part of the front surface 30*a* of the lens 30 and a part of the first light distribution pattern PL-1A in perspective view, respectively.

As shown in FIG. 12, the light distribution pattern PA3 formed by the light emitted from the lens element 30*s*3 constituting the emission region 30*a*3 on the front surface 30*a* of the lens 30 is formed so that its upper end edge extends from the slope portion CL3 to the right end portion of the upper cutoff line CL2 of the low beam light distribution pattern PL-1, as described above.

On the other hand, a light distribution pattern PA3*o* indicated by a two-dot chain line in FIG. 12 is a light distribution pattern formed if the lens element 30*s*3 is not present in the emission region 30*a*3, and is formed to extend obliquely upward to the left in the vicinity below the slope portion CL3. The light distribution pattern PA3*o* has an upper end edge formed as a clear light-dark boundary line. This is because the light-emitting element 22 is arranged with the lower end edge of the light-emitting surface 22*a* positioned on the optical axis Ax of the lens 30.

Since the lens element 30*s*3 is formed in the emission region 30*a*3, the light distribution pattern PA3*o* changes like the light distribution pattern PA3. This is because the lens element 30*s*3 forms the free-form curved surface whose curvature of the convex curved surface gradually changes from the right half 30*s*3A to the left half 30*s*3B, thereby slightly deflecting upward the parallel light arriving at the front surface 30*a* of the lens 30 and then gradually changing the emission direction from the right half 30*s*3A to the left half 30*s*3B.

In addition, since the emission region 30*a*3 is configured by the single lens element 30*s*3 and has no steps on its surface, a light pool that causes glare is not unintentionally formed in a space above the slope portion CL3 as part of the light distribution pattern PA3.

Figure 13:
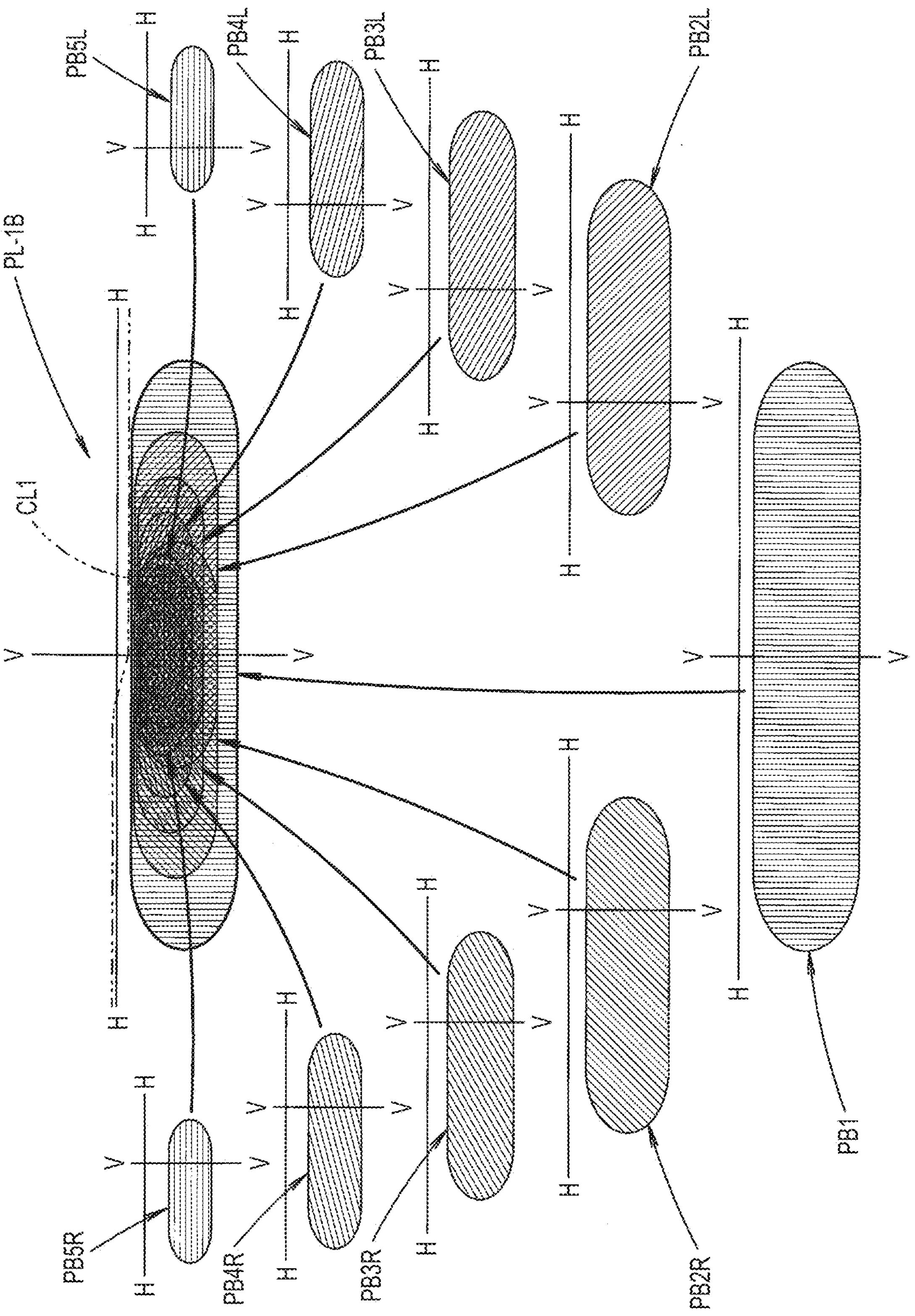
FIG. 13 is a view showing a second light distribution pattern formed by radiated light from the second lamp unit.

FIG. 13 is a view showing the second light distribution pattern PL-1B.

As shown in FIG. 13, the second light distribution pattern PL-1B is formed as a combined light distribution pattern in which nine light distribution patterns PB1, PB2L, PB2R, PB3L, PB3R, PB4L, PB4R, PB5L, and PB5R are superimposed.

The light distribution pattern PB1 is a light distribution pattern formed by light emitted from the emission region 50*a*1 on the front surface 50*a* of the lens 50 and is formed as a horizontally long light distribution pattern evenly expanding to both the left and right sides, centered on the V-V line below the H-H line.

The pair of left and right light distribution patterns PB2L and PB2R is light distribution patterns formed by light emitted from the pair of left and right emission regions 50*a*2L and 50*a*2R on the front surface 50*a* of the lens 50 and is horizontally long light distribution patterns smaller than the light distribution pattern PB1 and formed in a bilaterally symmetrical positional relationship, with their center positions offset from the V-V line.

The pair of left and right light distribution patterns PB3L and PB3R is light distribution patterns formed by light emitted from the pair of left and right emission regions 50*a*3L and 50*a*3R on the front surface 50*a* of the lens 50 and is horizontally long light distribution patterns smaller than the light distribution patterns PB2L and PB2R and formed in a bilaterally symmetrical positional relationship, with their center positions offset from the V-V line.

The pair of left and right light distribution patterns PB4L and PB4R is light distribution patterns formed by light emitted from the pair of left and right emission regions 50*a*4L and 50*a*4R on the front surface 50*a* of the lens 50 and is horizontally long light distribution patterns smaller than the light distribution patterns PB3L and PB3R and formed in a bilaterally symmetrical positional relationship, with their center positions offset from the V-V line.

The pair of left and right light distribution patterns PB5L and PB5R is light distribution patterns formed by light emitted from the pair of left and right emission regions 50*a*5L and 50*a*5R on the front surface 50*a* of the lens 50 and is horizontally long light distribution patterns smaller than the light distribution patterns PB4L and PB4R and formed in a bilaterally symmetrical positional relationship, with their center positions offset from the V-V line.

The fact that each of the four pairs of left and right light distribution patterns PB2L to PB5R is formed in a bilaterally symmetrical positional relationship with their center positions offset from the V-V line is due to the horizontal cross-sectional shapes of the plurality of lens elements 50*s*2L to 50*s*5R forming the convex curve C3 as an envelope line, as shown in FIG. 5.

For this reason, the second light distribution pattern PL-1B is formed as a light distribution pattern having a light intensity distribution in which the light intensity gradually decreases from the V-V line toward both the left and right, thereby effectively suppressing the occurrence of light distribution unevenness.

The second light distribution pattern PL-1B is formed so that the positions of the upper end edges of the nine light distribution patterns PB1 to PB5R substantially align in the vicinity below the cutoff line CL1. This is achieved by appropriately adjusting the vertical inclination angles of the plurality of lens elements 50*s*1 to 50*s*5R constituting the nine emission regions 50*a*1 to 50*a*5R.

As shown in FIG. 10, the low beam light distribution pattern PL-1 is formed as a combined light distribution pattern of the first light distribution pattern PL-1A and the second light distribution pattern PL-1B, so the high-intensity area HZ formed near the lower left of the elbow point E becomes bright.

Next, the operational effects of the present embodiment will be described.

The vehicle lamp 10 according to the present embodiment is configured to form the low beam light distribution pattern PL having the stepped cutoff line CL by radiating light emitted from the light-emitting elements 22 and 42 (light sources) of the first and second lamp units 20 and 40 toward the front of the lamp through the lenses 30 and 50. On the rear surfaces 34*b* and 54*b* of the peripheral regions 34 and 54 located around the central regions 32 and 52 centered on the optical axis Ax extending in the front-rear direction of the lamp in each of the lenses 30 and 50, the plurality of total reflection prism elements 34*s*1, 34*s*2, 54*s*1, and 54*s*2, which allow light emitted from the light-emitting elements 22 and 42 to be incident and then totally reflected toward the front of the lamp, are formed in a state of being aligned in a concentric circular form centered on the optical axis Ax. Therefore, the light emitted from the light-emitting elements 22 and 42 can be used as forward-radiated light over a wide area.

In addition, the rear surfaces 34*b* and 54*b* of the peripheral regions 34 and 54 are divided into the inner periphery-side regions 34*b*1 and 54*b*1 and the outer periphery-side regions 34*b*2 and 54*b*2. In the inner periphery-side regions 34*b*1 and 54*b*1, the plurality of total reflection prism elements 34*s*1 and 54*s*1 form the first annular concave curved surface C1 centered on the optical axis Ax as an envelope surface, so the light emitted from the light-emitting elements 22 and 42 incident on the inner periphery-side regions 34*b*1 and 54*b*1 can be totally reflected toward the front of the lamp as light with approximately uniform brightness by the plurality of total reflection prism elements 34*s*1 and 54*s*1. Further, in the outer periphery-side regions 34*b*2 and 54*b*2, the plurality of total reflection prism elements 34*s*2 and 54*s*2 form the second annular concave curved surface C2 centered on the optical axis Ax as an envelope surface, so light emitted from the light-emitting elements 22 and 42 incident on the outer periphery-side regions 34*b*2 and 54*b*2 can also be totally reflected toward the front of the lamp as light with approximately uniform brightness by the plurality of total reflection prism elements 34*s*2 and 54*s*2.

Furthermore, the plurality of total reflection prism elements 34*s*1, 34*s*2, 54*s*1, and 54*s*2 form the first and second annular concave curved surfaces C1 and C2 set dually as envelope surfaces, ensuring that the sizes of the total reflection prism elements 34*s*1 and 54*s*1 formed in the outer peripheral edge portions of the inner periphery-side regions 34*b*1 and 54*b*1, as well as the total reflection prism elements 34*s*2 and 54*s*2 formed in the outer peripheral edge portions of the outer periphery-side regions 34*b*2 and 54*b*2, do not become excessively large. Accordingly, when forming the lenses 30 and 50, it becomes possible to precisely form the plurality of total reflection prism elements 34*s*1, 34*s*2, 54*s*1, and 54*s*2, thereby enabling light distribution control to be performed with high precision.

As such, according to the present embodiment, in the vehicle lamp 10 configured to radiate light emitted from the light-emitting elements 22 and 42 of the first and second lamp units 20 and 40 toward the front of the lamp through the lenses 30 and 50, light distribution control by the lenses 30 and 50 can be performed with high precision while sufficiently securing an amount of light emitted from the outer peripheral edge portions of the lenses 30 and 50.

In addition, as in the present embodiment, the plurality of total reflection prism elements 34*s*1, 34*s*2, 54*s*1, and 54*s*2 form the first and second annular concave curved surfaces C1 and C2 set dually as envelope surfaces, ensuring that the peripheral regions 34 and 54 of the lenses 30 and 50 can be made thinner compared to a case where a single annular concave curved surface is formed as an envelope surface.

It is noted that, in the lenses 30 and 50 of the present embodiment, the central regions 32 and 52 are formed thicker than the peripheral regions 34 and 54. When gates for injection molding the lenses 30 and 50 are arranged in the central regions 32 and 52, it becomes possible to easily mold the lenses 30 and 50.

In the present embodiment, each of the plurality of total reflection prism elements 34*s*1 and 54*s*1 formed in the inner periphery-side regions 34*b*1 and 54*b*1 on the rear surfaces 34*b* and 54*b* of the peripheral regions 34, 54 is configured to totally reflect light emitted from the first virtual point light source S1 located on the rear side of the lamp relative to the light-emitting elements 22 and 42 as parallel light directed toward the forward-facing direction of the lamp, within the plane including the optical axis Ax, and each of the plurality of total reflection prism elements 34*s*2 and 54*s*2 formed in the outer periphery-side regions 34*b*2 and 54*b*2 is configured to totally reflect light emitted from the second virtual point light source S2 located on the rear side of the lamp relative to the light-emitting elements 22 and 42 and on the front side of the lamp relative to the first virtual point light source S1 as parallel light directed toward the forward-facing direction of the lamp, within the plane including the optical axis Ax. As a result, the following effects can be obtained.

That is, although the light-emitting surfaces 22*a* and 42*a* of the light-emitting elements 22 and 42 have a certain size, the light emitted from the light-emitting elements 22 and 42 can be totally reflected as substantially parallel light directed toward the forward-facing direction of the lamp by the plurality of total reflection prism elements 34*s*1 and 54*s*1 in the inner periphery-side regions 34*b*1 and 54*b*1, and can also be totally reflected as substantially parallel light directed toward the forward-facing direction of the lamp by the plurality of total reflection prism elements 34$s$2 and 54$s$2 in the outer periphery-side regions 34$b$2 and 54$b$2.

In this case, the first virtual point light source S1 is located on an opposite side to the incidence regions, in the inner periphery-side regions 34$b$1 and 54$b$1, of light emitted from the first virtual point light source S1 with respect to the optical axis Ax, and the second virtual point light source S2 is located on an opposite side to the incidence regions, in the outer periphery-side regions 34$b$2 and 54$b$2, of light emitted from the second virtual point light source S2 with respect to the optical axis Ax. Therefore, the following effects can be obtained.

That is, the light emitted from the light-emitting surfaces 22$a$ and 42$a$ of the light-emitting elements 22 and 42 having a certain size can be totally reflected with high precision as substantially parallel light directed toward the forward-facing direction of the lamp by the plurality of total reflection prism elements 34$s$1 and 54$s$1 in the inner periphery-side regions 34$b$1 and 54$b$1, and further, can be totally reflected with high precision as substantially parallel light directed toward the forward-facing direction of the lamp by the plurality of total reflection prism elements 34$s$2 and 54$s$2 in the outer periphery-side regions 34$b$2 and 54$b$2.

In the present embodiment, since the light sources of the first and second lamp units 20 and 40 include the light-emitting elements 22 and 42 arranged with the light-emitting surfaces 22$a$ and 42$a$ facing toward the front of the lamp, it becomes possible to easily form the low beam light distribution pattern PL-1 having the stepped cutoff line CL by radiated light from the vehicle lamp 10.

In this case, in the present embodiment, the stepped cutoff line CL of the low beam light distribution pattern PL-1 is formed by the first light distribution pattern PL-1A formed by radiated light from the first lamp unit 20, the front surface 50$a$ of the lens 50 in the second lamp unit 40 is divided into the nine emission regions 50$a$1, 50$a$2L, 50$a$2R, 50$a$3L, 50$a$3R, 50$a$4L, 50$a$4R, 50$a$5L, and 50$a$5R extending in the vertical direction and is formed with the plurality of lens elements 50$s$1, 50$s$2L, 50$s$2R, 50$s$3L, 50$s$3R, 50$s$4L, 50$s$4R, 50$s$5L, and 50$s$5R, and the plurality of lens elements are configured such that the horizontal cross-sectional shape including the optical axis Ax forms the convex curve C3 centered on the optical axis Ax as an envelope line. Therefore, the following effects can be obtained.

That is, the second light distribution pattern PL-1B formed by radiated light from the second lamp unit 40 is formed as a combined light distribution pattern of the nine light distribution patterns PB1, PB2L, PB2R, PB3L, PB3R, PB4L, PB4R, PB5L, and PB5R formed by light emitted from the nine emission regions 50$a$1 to 50$a$5R. The light distribution patterns are formed to vary in their sizes and formation positions. Therefore, the second light distribution pattern PL-1B can be formed as a light distribution pattern with suppressed light unevenness.

In the above embodiment, the light-emitting surface 22$a$ of the light-emitting element 22 has been described as having an outer shape of about 1×1 mm. A light-emitting surface with other shapes can also be used.

In the above embodiment, the rear surface 32$b$ of the central region 32 of the lens 30 of the first lamp unit 20 has been described as having a single convex lens surface. Other configurations (e.g., a configuration formed as a Fresnel lens shape) can also be adopted.

In the above embodiment, both the lenses 30 and 50 of the first and second lamp units 20 and 40 have been described as having a circular outer shape when viewed from the front of the lamp. A configuration having other outer shapes can also be adopted.

In the above embodiment, the lenses 30 and 50 have been described as being configured as injection-molded products. Other configurations (e.g., those configured as compression-molded products) can also be adopted.

In the above embodiment, the low beam light distribution pattern PL-1 for left light distribution having the stepped cutoff line CL has been described as being formed by radiated light from the vehicle lamp 10. A configuration that forms other light distribution patterns can also be adopted.

Next, modified examples of the above embodiment will be described.

Figure 14A:
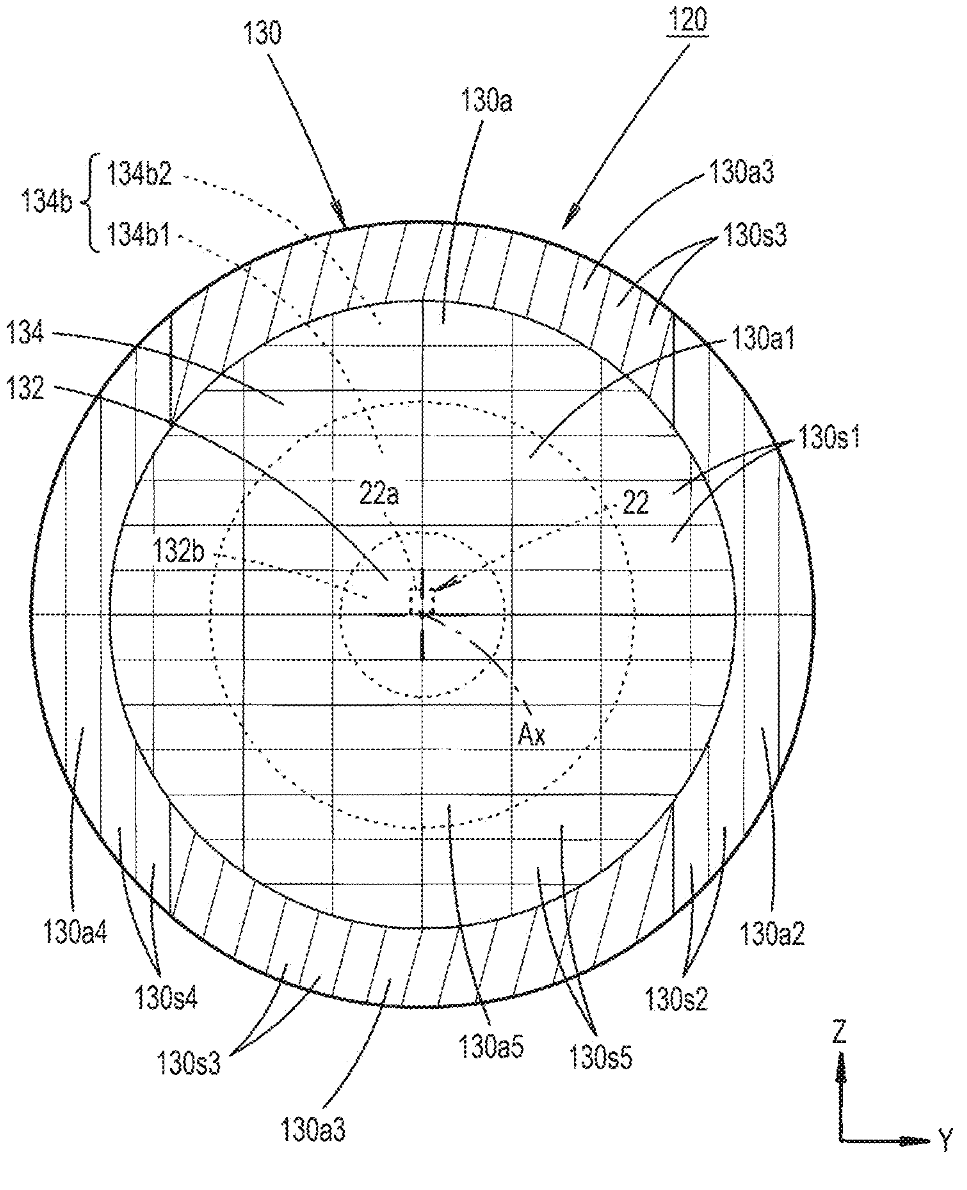
FIG. 14A is a view similar to FIG. 3A, showing a modified example of the first embodiment.
Figure 14B:
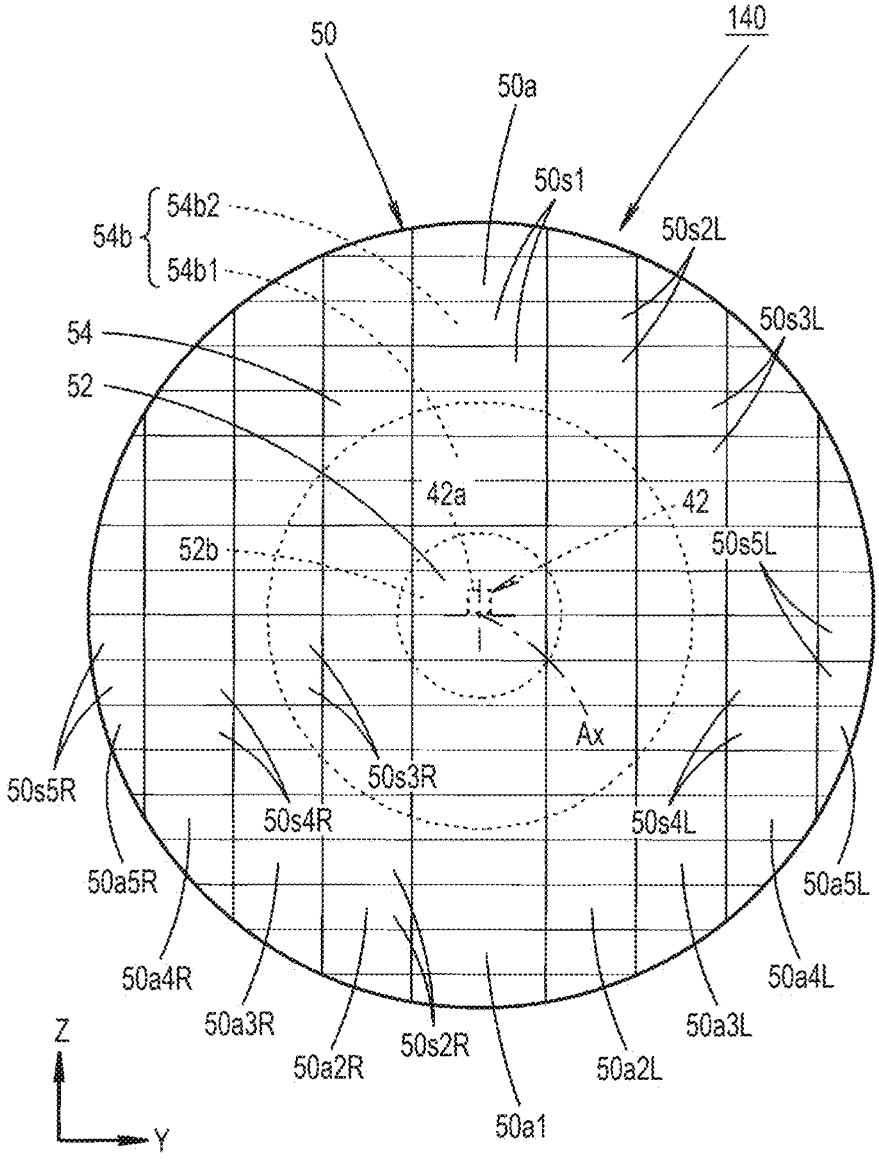
FIG. 14B is a view similar to FIG. 3B, showing the modified example of the first embodiment.

FIG. 14A is a view similar to FIG. 3A, showing a first lamp unit 120 of a vehicle lamp according to the present modified example. FIG. 14B is a view similar to FIG. 3B, showing a second lamp unit 140 of the vehicle lamp according to the present modified example.

As shown in FIG. 14B, also in the present modified example, the configuration of the second lamp unit 140 is similar to the above embodiment. As shown in FIG. 14A, a configuration of a lens 130 of the first lamp unit 120 is partially different from that in the above embodiment That is, as shown in FIG. 14A, the lens 130 of the present modified example also has a central region 132 and a peripheral region 134, the configurations of rear surfaces 132$b$ and 134$b$ are similar to those of the above embodiment, and the rear surface 134$b$ of the peripheral region 134 is divided into an inner periphery-side region 134$b$1 and an outer periphery-side region 134$b$2.

In addition, a front surface 130$a$ of the lens 130 of the present modified example is divided into five emission regions 130$a$1, 130$a$2, 130$a$3, 130$a$4, and 130$a$5. Specifically, the front surface 130$a$ of the lens 130 is largely divided into two concentric regions centered on the optical axis Ax, and a pair of upper and lower emission regions 130$a$1 and 130$a$5 is arranged on an inner periphery side, while a pair of left and right emission regions 130$a$2 and 130$a$4 and a pair of upper and lower emission regions 130$a$3 are arranged on an outer periphery side.

The emission region 130$a$1 located at the upper part of the inner periphery side is divided into a shape of vertical and horizontal grids, which are horizontally long, as in the emission region 30$a$1 of the lens 30 of the first lamp unit 20 in the above embodiment, and a convex curved lens element 130$s$1 is assigned to each grid. Each lens element 130$s$1 is configured to emit light from the light-emitting element 22, arriving as parallel light from the rear surfaces 132$b$ and 134$b$ of the lens 130, toward the front of the lamp while deflecting the light downward and then widely diffusing the deflected light in the left-right direction.

The pair of left and right emission areas 130$a$2 and 130$a$4 is divided into two parts vertically and also into vertical stripes, and convex lens elements 130$s$2 and 130$s$4 are assigned to the striped regions, respectively.

Each of the lens elements 130$s$2 constituting the emission region 130$a$2 located on the left is configured to emit light from the light-emitting element 22, arriving as parallel light from the rear surface 134$b$ of the lens 130, toward the front of the lamp while slightly deflecting light downward and then widely diffusing the deflected light in the right direction.

Each of the lens elements 130$s$4 constituting the emission region 130$a$4 located on the right is configured to emit light from the light-emitting element 22, arriving as parallel light from the rear surface 134$b$ of the lens 130, toward the front of the lamp while slightly deflecting light upward and then widely diffusing the deflected light in the left direction.

The pair of upper and lower emission regions 130$a$3 is divided into oblique vertical stripes, and a convex curved lens element 130$s$3 is assigned to each striped region. In this case, each lens element 130$s$3 is formed to extend in a direction inclined at an angle of 15° to the left (the right when viewed from the front of the lamp) with respect to the vertical direction, and is configured to emit light from the light-emitting element 22, arriving as parallel light from the rear surface 134$b$ of the lens 130, toward the front of the lamp while slightly deflecting light upward and then slightly deflecting and diffusing the light in a direction orthogonal to the 15° inclined direction.

The emission region 130$a$5 located at the lower part of the inner periphery side is divided into vertical stripes, as in the emission region 30$a$5 of the lens 30 of the first lamp unit 20 in the above embodiment, and a convex curved lens element 130$s$5 is assigned to each striped region. Each lens element 130$s$5 is configured to emit light from the light-emitting element 22, arriving as parallel light from the rear surfaces 132$b$ and 134$b$ of the lens 130, toward the front of the lamp while slightly deflecting the light downward and then widely diffusing the deflected light in the left direction.

Figure 15:
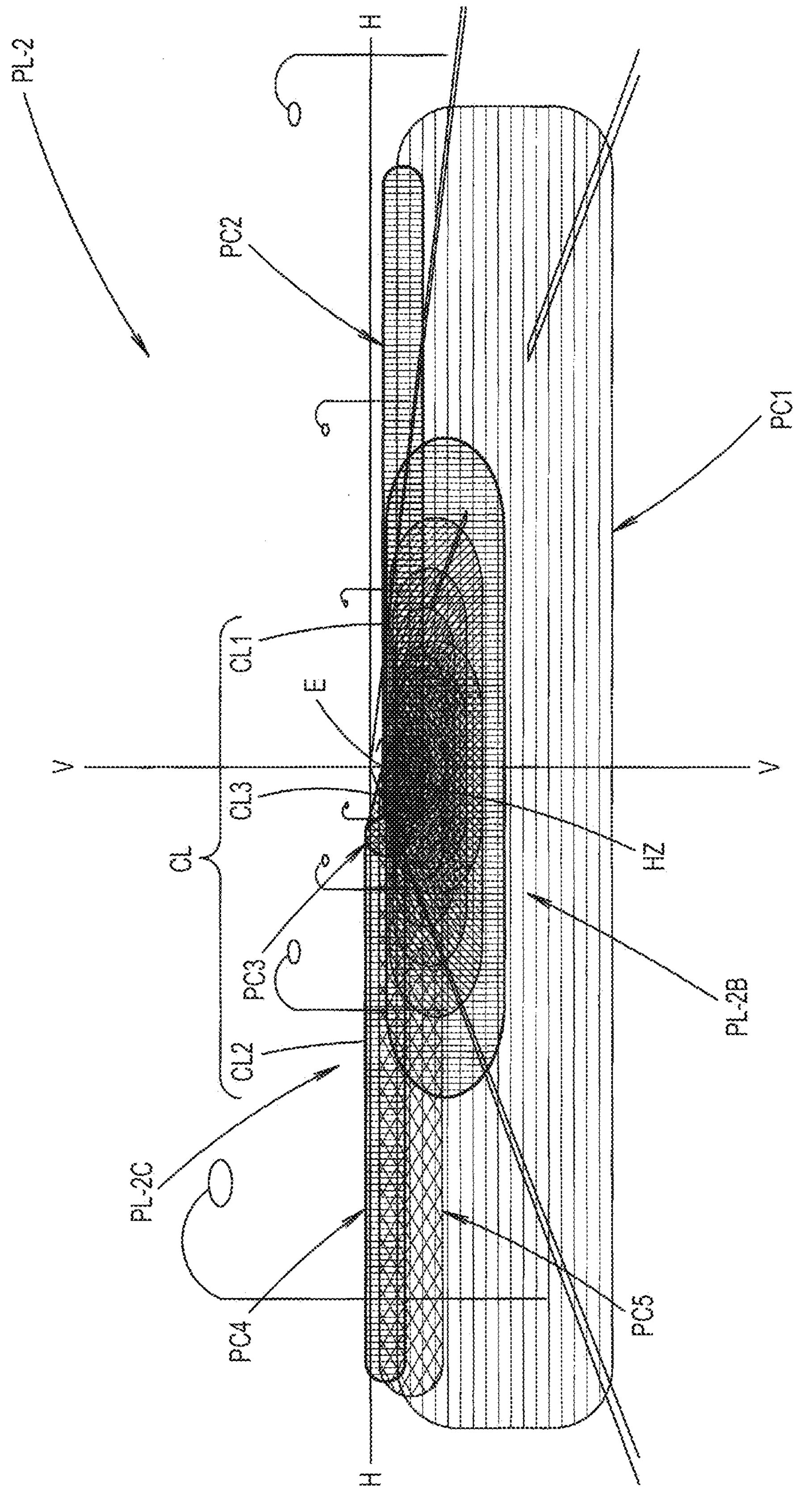
FIG. 15 is a view similar to FIG. 10, showing an operation of the modified example.

FIG. 15 is a perspective view showing a low beam light distribution pattern PL-2 formed on the virtual vertical screen by radiated light from the vehicle lamp according to the present modified example.

The low beam light distribution pattern PL-2 is formed as a combined light distribution pattern in which a first light distribution pattern PL-2C formed by radiated light from the first lamp unit 120 and a second light distribution pattern PL-2B formed by radiated light from the second lamp unit 140 are superimposed.

The second light distribution pattern PL-2B is similar to the second light distribution pattern PL-1B (see FIG. 13) formed by radiated light from the second lamp unit 40 of the above embodiment.

On the other hand, the first light distribution pattern PL-2C is formed as a combined light distribution pattern in which five light distribution patterns PC1, PC2, PC3, PC4, and PC5 are superimposed.

The light distribution pattern PC1 is a light distribution pattern formed by light emitted from the light emission region 130$a$1 of the front surface 130$a$ of the lens 130, and is formed as a horizontally long light distribution pattern widely expanding in the left-right direction with a relatively large vertical width below the H-H line. The light distribution pattern PC1 is designed to form a wide diffusion area of the low beam light distribution pattern PL-2.

The light distribution pattern PC2 is a light distribution pattern formed by light emitted from the emission region 130$a$2 on the front surface 130$a$ of the lens 130, and is formed as a horizontally long bright light distribution pattern expanding rightward from the vicinity of the V-V line with a narrow vertical width in the vicinity below the H-H line. The light distribution pattern PC2 is designed to form the lower cutoff line CL1 of the low beam light distribution pattern PL-2 by its upper end edge.

The light distribution pattern PC3 is a light distribution pattern formed by light emitted from the pair of upper and lower emission regions 130$a$3 on the front surface 130$a$ of the lens 130, and is formed as a small and bright light distribution pattern extending obliquely upward to the left with a narrow vertical width in the vicinity below the H-V. The light distribution pattern PC3 is designed to form the slope portion CL3 of the low beam light distribution pattern PL-2 by its upper end edge.

The light distribution pattern PC4 is a light distribution pattern formed by light emitted from the emission region 130$a$4 on the front surface 130$a$ of the lens 130, and is formed as a horizontally long bright light distribution pattern expanding leftward from the vicinity of the left of the V-V line with a narrow vertical width substantially along the H-H line. The light distribution pattern PC4 is designed to form the upper cutoff line CL2 of the low beam light distribution pattern PL-2 by its upper end edge. In this case, the light distribution pattern PC4 is formed with its right end portion overlapping the light distribution pattern PC3.

The light distribution pattern PC5 is a light distribution pattern formed by light emitted from the emission region 130$a$5 on the front surface 130$a$ of the lens 130 and is formed as a horizontally long, relatively bright light distribution pattern expanding leftward from the vicinity of the left side of the V-V line with a relatively narrow vertical width, spanning both the light distribution pattern PC4 and the light distribution pattern PC1, with its right end portion overlapping the light distribution pattern PC3.

Even when the configuration of the present modified example is adopted, the effects substantially similar to those of the above embodiment can be obtained.

In addition, by adopting the configuration of the present modified example, it becomes possible to easily secure sufficient brightness near the stepped cutoff line CL of the low beam light distribution pattern PL-2.

It is noted that the numerical values shown as specifications in the above embodiment and the modified example are only examples and may be set to other values as appropriate.

In addition, the present disclosure is not limited to the configurations described in the above embodiment and the modified example thereof, and configurations with various other modifications can also be adopted.

Second Embodiment

Hereinafter, a second embodiment of the present disclosure will be described with reference to the drawings.

Figure 16:
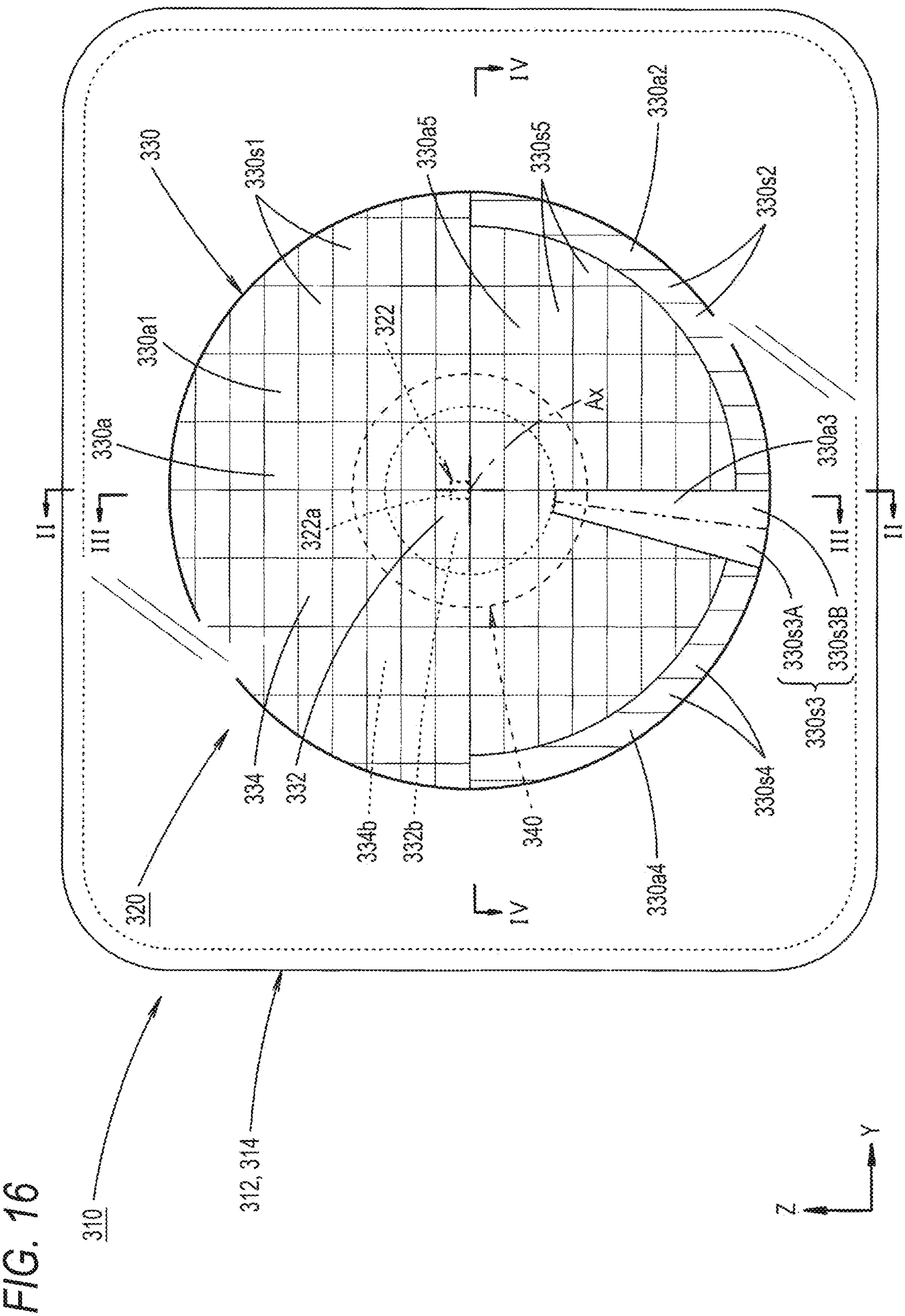
FIG. 16 is a front view showing a vehicle lamp according to a second embodiment of the present disclosure.
Figure 17:
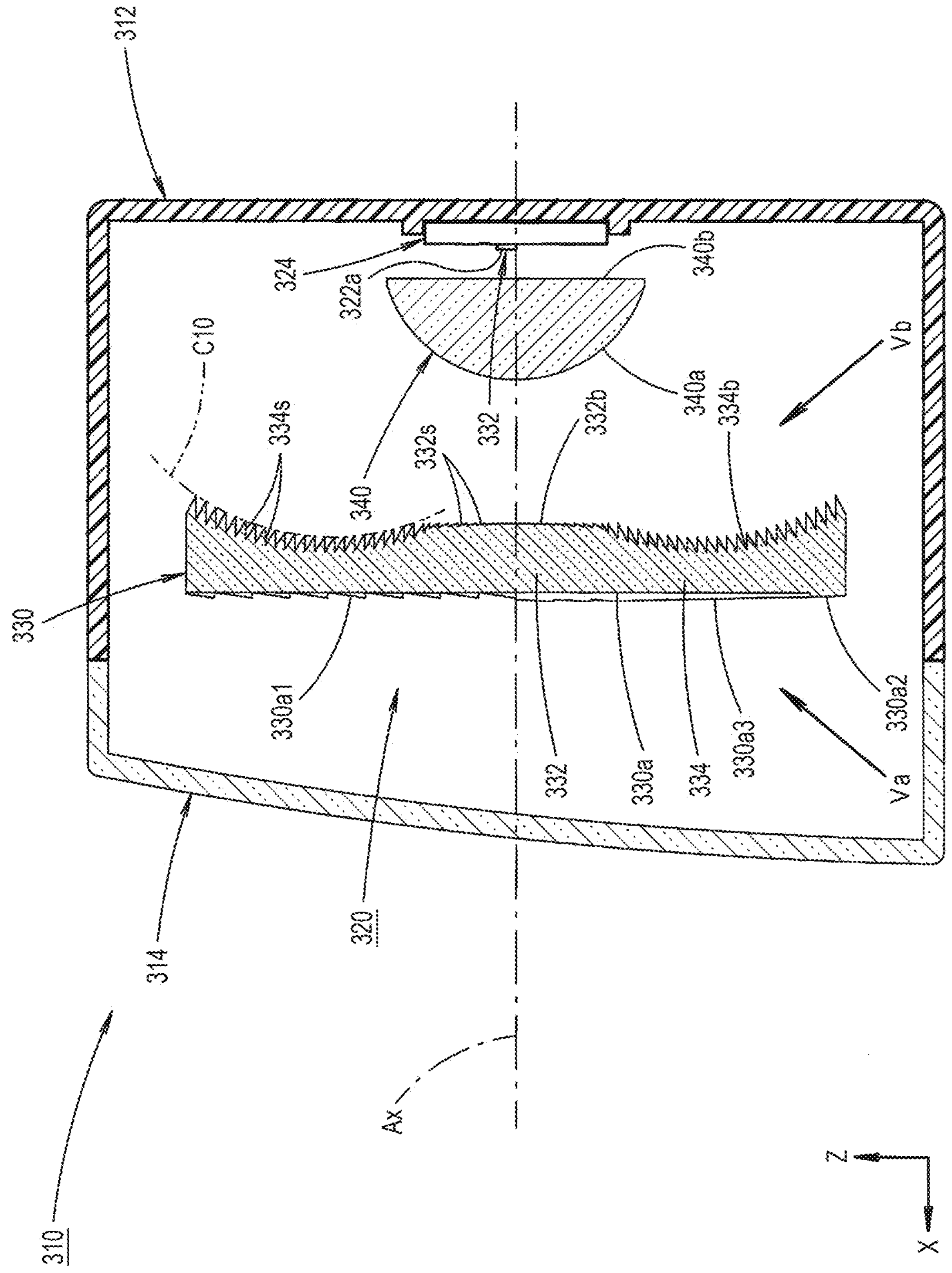
FIG. 17 is a cross-sectional view taken along line II-II of FIG. 16.

FIG. 16 is a front view showing a vehicle lamp 310 according to an embodiment of the present disclosure. FIG. 17 is a cross-sectional view taken along line II-II of FIG. 16.

In FIGS. 16 and 17, a direction indicated by X is "front of the lamp," a direction indicated by Y is a "left direction" (or "right direction" when viewed from the front of the lamp) orthogonal to the "front of the lamp," and a direction indicated by Z is "upper direction." The same applies to the drawings other than FIGS. 16 and 17.

As shown in FIGS. 16 and 17, a vehicle lamp 310 according to the present embodiment is a headlamp arranged at a front end portion of a vehicle and includes a lamp unit 320 and 320 incorporated in a lamp chamber formed by a lamp body 312 and a transparent light-transmitting cover 314 attached to a front end opening portion thereof. The vehicle lamp 310 is configured to form a low beam light distribution pattern (which will be described below) by radiated light from the lamp unit 320.

The lamp unit 320 includes a light-emitting element 322 and a lens 330 arranged on a front side of the lamp relative to the light-emitting element, and is configured to radiate light emitted from the light-emitting element 322 toward the front of the lamp through the lens 330. In addition, the lamp unit 320 includes a condenser lens 340 arranged between the light-emitting element 322 and the lens 330, allowing light emitted from the light-emitting element 322 to be incident on the lens 330 in a condensed state.

The light-emitting element 322 is supported on the lamp body 312 via a substrate 324, and the lens 330 and the condenser lens 340 are each supported on the lamp body 312 via an attachment structure (not shown).

Next, the specific configuration of the lamp unit 320 will be described.

Figure 18:
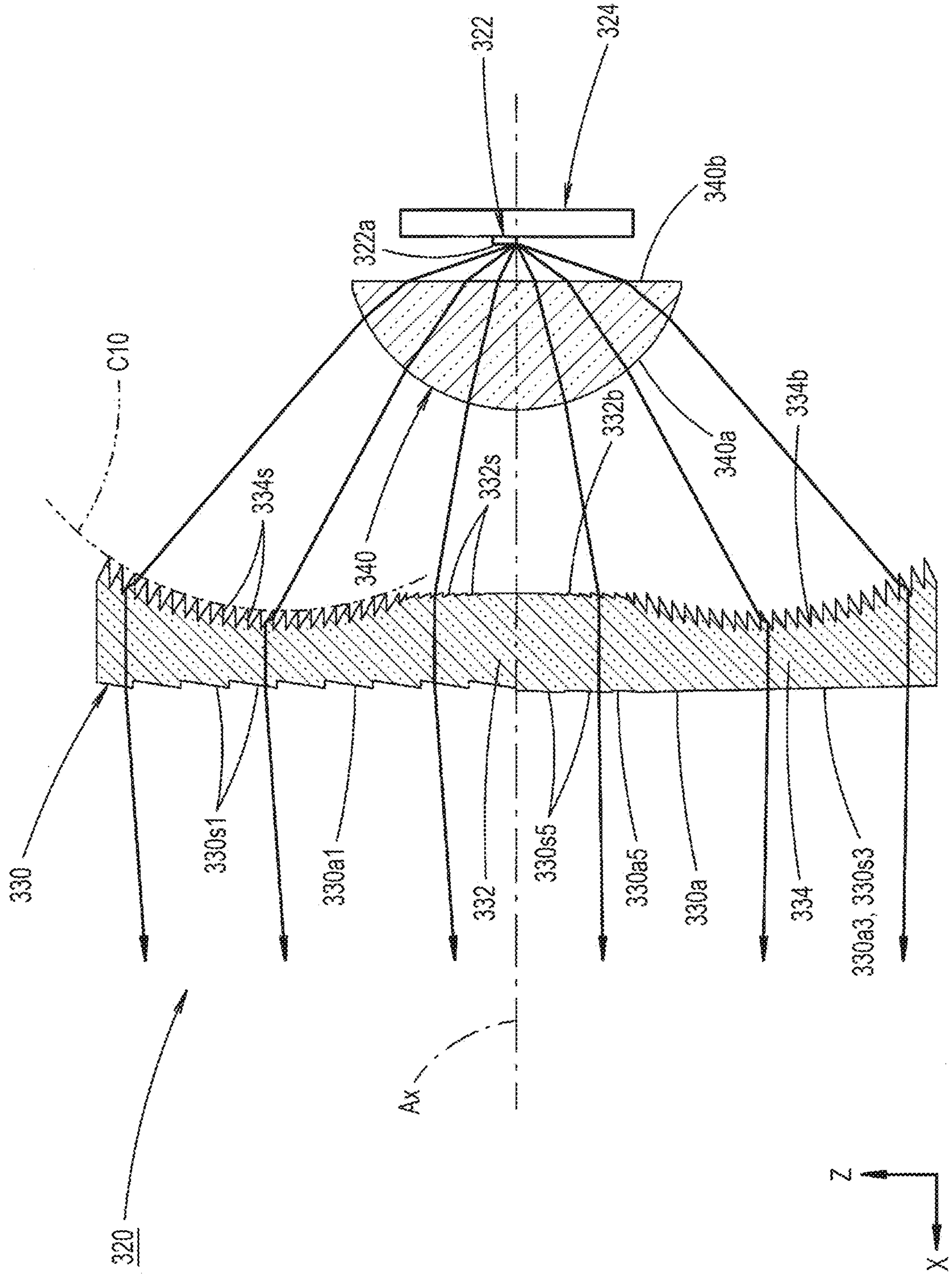
FIG. 18 is a cross-sectional view taken along line III-III of FIG. 16.
Figure 19:
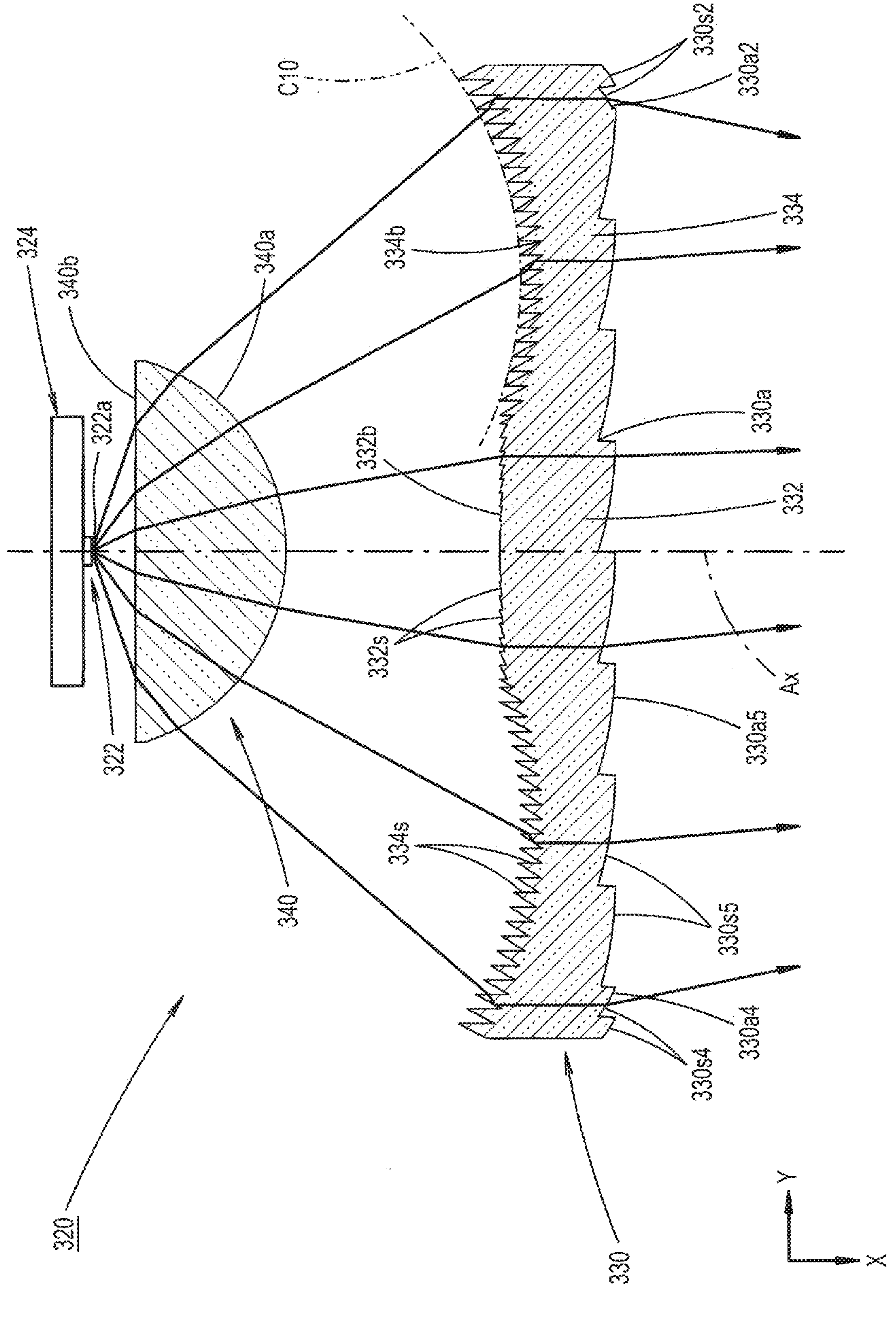
FIG. 19 is a cross-sectional view taken along line IV-IV of FIG. 16.
Figure 20A:
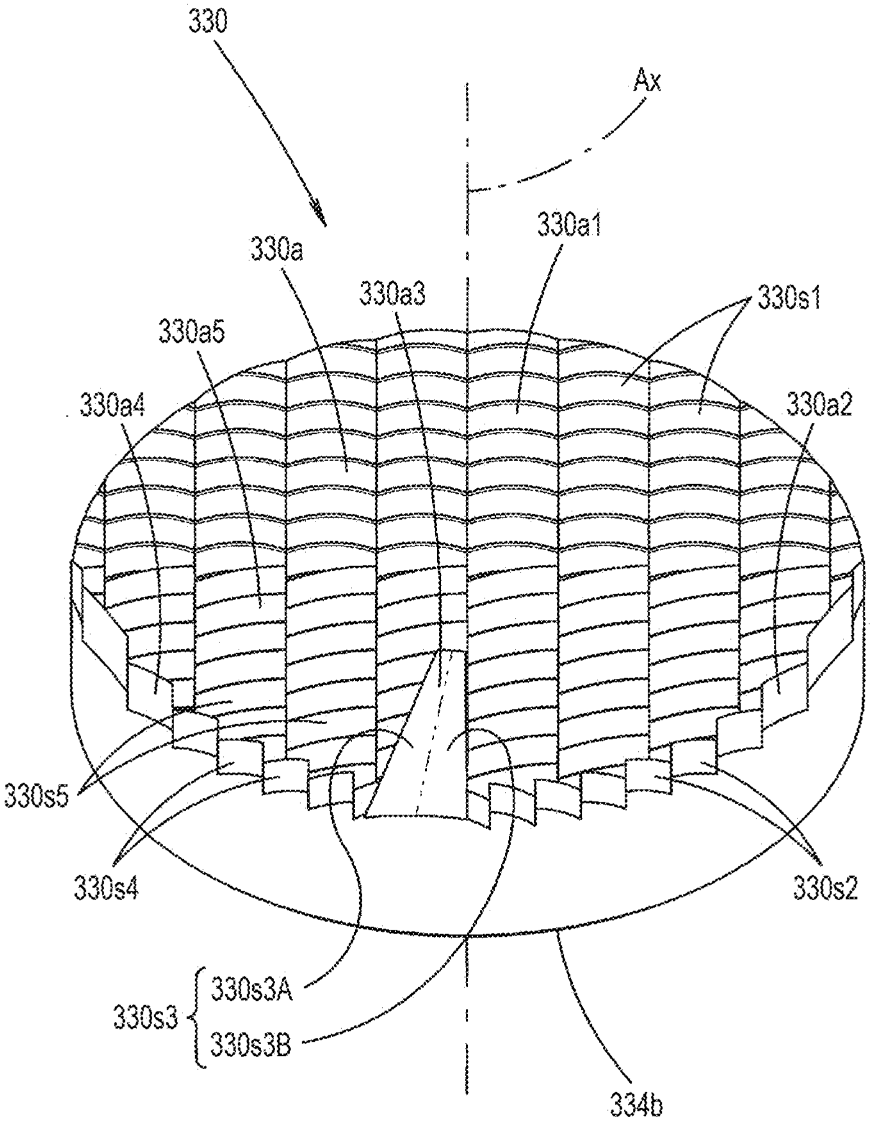
FIG. 20A is a view as viewed in a direction of arrow Va of FIG. 17.
Figure 20B:
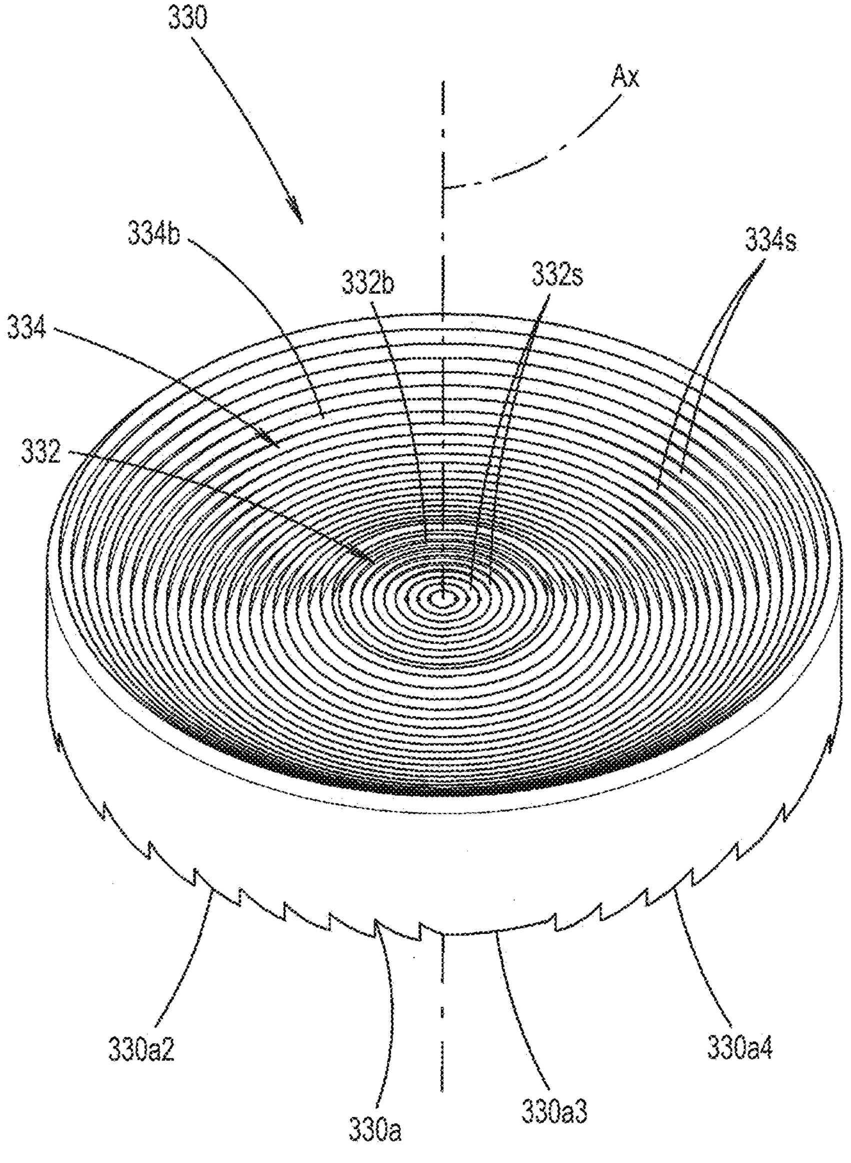
FIG. 20B is a view as viewed in a direction of arrow Vb of FIG. 17.

FIG. 18 is a cross-sectional view taken along line III-III of FIG. 16, and FIG. 19 is a cross-sectional view taken along line IV-IV of FIG. 16. FIG. 20A is a view as viewed in a direction of arrow Va of FIG. 17, and FIG. 20B is a view as viewed in a direction of arrow Vb of FIG. 17.

As shown in FIGS. 16 to 20B, the lens 330 has an optical axis Ax extending in the front-rear direction of the lamp, and has a circular outer shape centered on the optical axis Ax when viewed from the front of the lamp. An outer dimension of the lens 330 is set to a value of 50 mm or less (e.g., about 35 mm).

The light-emitting element 322 is a white light-emitting diode and is arranged with a light-emitting surface 322*a* facing the front of the lamp (specifically, in the forward-facing direction of the lamp). The light-emitting surface 322*a* of the light-emitting element 322 has a rectangular outer shape (specifically, a square of about 1×1 mm). The light-emitting element 322 is arranged in a state where a center position in the left-right direction at a lower end edge of the light-emitting surface 322*a* (hereinafter, referred to as a "reference position") is positioned on the optical axis Ax of the lens 330.

The condenser lens 340 is a plano-convex lens made of transparent resin, with a front surface 340*a* formed into a convex curved shape and a rear surface 340*b* formed into a flat surface shape. Its external dimension is set to a value of about 12 to 16 mm (e.g., about 14 mm). The condenser lens 340 is arranged on the optical axis Ax with being close to a front side of the light-emitting element 322 (specifically, with the rear surface 340*b* of the condenser lens 340 being about 1 to 2 mm away from the light-emitting surface 322*a* of the light-emitting element 322). The condenser lens 340 is configured to refract light emitted from the light-emitting element 322 in a direction close to the optical axis Ax and then allow the refracted light to be incident on the lens 330.

The lens 330 is an injection-molded product made of transparent resin and has a central region 332 centered on the optical axis Ax and a peripheral region 334 located around the central region 332.

A rear surface 332*b* of the central region 332 includes a Fresnel lens in which a plurality of lens elements 332*s* are arranged concentrically around the optical axis Ax, thereby allowing light from the light-emitting element 322, arriving through the condenser lens 340, to be incident on the lens 330 while being refracted in a direction close to the optical axis Ax. Specifically, the rear surface 332*b* of the central region 332 is designed to guide light emitted from the reference position of the light-emitting element 322 to the front surface 330*a* of the lens 330 as parallel light directed toward the forward-facing direction of the lamp, in each lens element 332*s*.

A plurality of total reflection prism elements 334*s* are formed on a rear surface 334*b* of the peripheral region 334 in a state of being aligned in a concentric circular form centered on the optical axis Ax. Each of the plurality of total reflection prism elements 334*s* is a Fresnel lens-type total reflection prism and is configured to allow light from the light-emitting element 322, arriving through the condenser lens 340, to be incident and then totally reflected toward the front of the lamp. Specifically, each of the plurality of total reflection prism elements 334*s* is designed to allow light emitted from the reference position of the light-emitting element 322 to be incident while being refracted in a direction away from the optical axis Ax and then to be guided to the front surface 330*a* of the lens 330 as parallel light directed toward the forward-facing direction of the lamp.

A boundary position between the central region 332 and the peripheral region 334 is defined by a circle with a radius of 4 to 6 mm (e.g., a radius of about 5 mm) centered on the optical axis Ax.

As shown in FIGS. 18 and 19, the plurality of total reflection prism elements 334*s* formed on the rear surface 334*b* of the peripheral region 334 form an annular concave curved surface C10 (a cross-sectional shape is indicated by a two-dot chain line in the drawing) centered on the optical axis Ax as an envelope surface.

In this case, in the rear surface 334*b* of the peripheral region 334, a pitch of the plurality of total reflection prism elements 334*s* and a curvature of the annular concave curved surface C10 are set such that the light emitted from the light-emitting element 322 is incident approximately equally on each of the plurality of total reflection prism elements 334*s*.

As a result, the plurality of total reflection prism elements 334*s* have a cross-sectional shape in which the total reflection prism elements 334*s* located closer to an outer peripheral edge of the rear surface 334*b* of the peripheral region 334 are larger than the total reflection prism elements 334*s* located closer to an inner peripheral edge.

The lens 330 is arranged in the front-rear direction of the lamp so that light from the light-emitting element 322 emitted from the outer peripheral edge of the front surface 340*a* of the condenser lens 340 is incident on the outer peripheral edge of the rear surface 334*b* in the peripheral region 334.

As shown in FIGS. 16 to 20B, the front surface 330*a* of the lens 330 includes a plurality of lens elements (which will be described below) formed on a vertical plane orthogonal to the optical axis Ax.

The front surface 330*a* of the lens 330 is divided into five emission regions 330*a*1, 330*a*2, 330*a*3, 330*a*4, and 330*a*5.

The emission region 330*a*1 is a semicircular region located in an upper half of the front surface 330*a*, the emission regions 330*a*2 and 330*a*4 are semicircular arc-shaped regions extending in a band shape along an outer peripheral edge of the lower half of the front surface 330*a*, the emission region 330*a*3 is a region having a vertically long outer shape expanding downward in a fan shape in a lower region of the front surface 330*a*, and the emission region 330*a*5 is a remaining region in the lower half of the front surface 330*a*.

The emission region 330*a*1 is divided into a shape of vertical and horizontal grids, each of which is horizontally long (e.g., about 2×4 mm), with a convex curved lens element 330*s*1 assigned to each grid. Each lens element 330*s*1 is configured to emit light from the light-emitting element 322, arriving as parallel light from the rear surfaces 332*b* and 334*b* of the lens 330, toward the front of the lamp while deflecting the light downward and then widely diffusing the deflected light in the left-right direction.

The emission regions 330*a*2 and 330*a*4 are divided into a shape of vertical stripes (e.g., with a horizontal width of about 2 mm) with each of convex curve-shaped lens elements 330*s*2 and 330*s*4 assigned to each vertical striped region.

Each of the lens elements 330_s_2 constituting the emission region 330_a_2 located on the left side of the emission region 330_a_3 (on the right side when viewed from the front of the lamp) is configured to emit light from the light-emitting element 322, arriving as parallel light from the rear surface 334_b_ of the lens 330, toward the front of the lamp while slightly deflecting the light downward and then widely diffusing the deflected light in the right direction.

Each of the lens elements 330_s_4 constituting the emission region 330_a_4 located on the right side of the emission region 330_a_3 is configured to emit light from the light-emitting element 322, arriving as parallel light from the rear surface 334_b_ of the lens 330, toward the front of the lamp while slightly deflecting the light upward and then widely diffusing the deflected light in the left direction.

The emission region 330_a_3 has a left side edge (a right edge when viewed from the front of the lamp) configured by a straight line extending in a direction directly downward from the optical axis Ax, and a right side edge configured by a straight line extending in a direction inclined to the right with respect to the direction directly downward from the optical axis Ax (specifically, a direction inclined at an angle of about 15° to the right from the direction directly downward). An upper end edge of the emission region 330_a_3 is configured by an arc centered on the optical axis Ax. The arc is located on a slightly outer periphery side with respect to the boundary position between the central region 332 and the peripheral region 334 of the lens 330. In addition, a lower end edge of the emission region 330_a_3 is configured by an outer peripheral edge of the front surface 330_a_.

The emission area 330_a_3 is configured by a single lens element 330_s_3. The lens element 330_s_3 has a surface shape with a convex free-form curved surface. That is, the surface of the lens element 330_s_3 has a free-form surface whose curvature of the convex curved surface gradually changes from a right half 330_s_3A to a left half 330_s_3B. The lens element 330_s_3 is configured to emit light from the light-emitting element 322, arriving as parallel light from the rear surface 334_b_ of the lens 330, toward the front of the lamp while deflecting the light upward and then gradually changing an emission direction thereof from the right half 330_s_3A to the left half 330_s_3B.

Similarly to the emission region 330_a_1, the emission region 330_a_5 is divided into a shape of vertical stripes with a convex curved lens element 33085 assigned to each striped region. Each lens element 330_s_5 is configured to emit light from the light-emitting element 322, arriving as parallel light from the rear surfaces 332_b_ and 334_b_ of the lens 330, toward the front of the lamp while slightly deflecting the light downward and then widely diffusing the deflected light in the left direction, As shown in FIGS. 18 and 19, in the lens 330, the central region 332 has a substantially constant thickness of about 3 to 4 mm, but the peripheral region 334 has a thinner thickness than the central region 332 in a middle portion thereof and a thicker thickness of about 5 to 6 mm in an outer peripheral edge portion.

Figure 21:
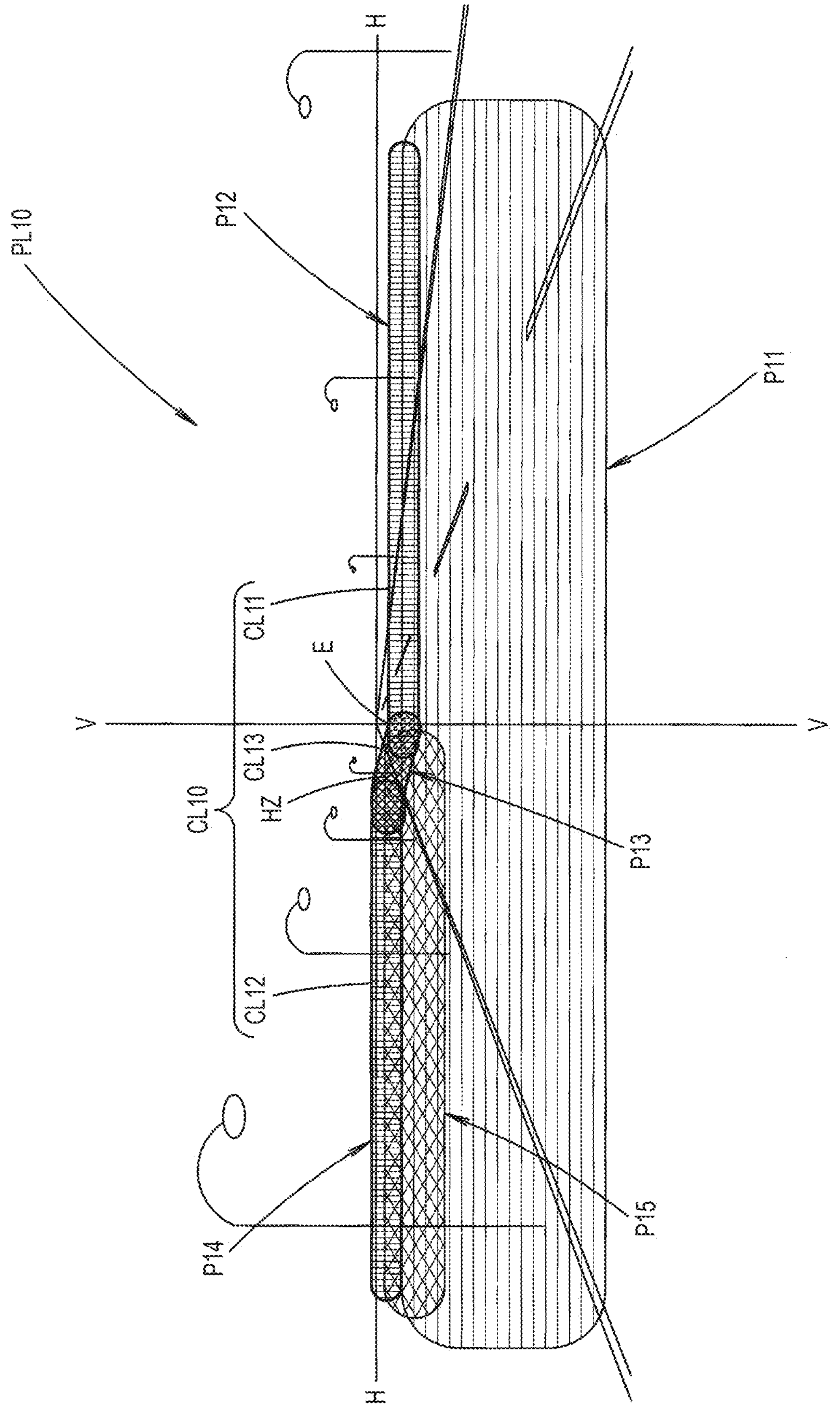
FIG. 21 is a perspective view showing a low beam light distribution pattern formed by radiated light from the vehicle lamp.

FIG. 21 is a perspective view showing a low beam light distribution pattern PL10 formed on a virtual vertical screen placed 25 m ahead of the lamp by radiated light from the vehicle lamp 310.

The low beam light distribution pattern PL10 is a low beam light distribution pattern of left light distribution, and an upper end portion thereof is formed with a stepped cutoff line CL10.

The stepped cutoff line CL10 has a shape in which a lower cutoff line CL11 and an upper cutoff line CL12, offset vertically and extending horizontally, are connected via a slope portion CL13. In this case, the stepped cutoff line CL is formed such that the lower cutoff line CL11 is positioned on the opposite lane side with respect to a V-V line, which is a vertical line passing through an H-V vanishing point in the forward-facing direction of the lamp, and the slope portion CL13 and the upper cutoff line CL12 are positioned on the own lane side. The upper cutoff line CL 12 is positioned slightly above a line H-H, which is a horizontal line passing through H-V.

In the low beam light distribution pattern PL10, an elbow point E, which is an intersection of the lower cutoff line CL11 and the slope portion CL13, is located about 0.5 to 0.6° below H-V, and the slope portion CL13 extends obliquely in the upper left direction from the elbow point E at an inclination angle of 15° with respect to the horizontal direction. In the low beam light distribution pattern PL10, a high-intensity region HZ is formed near the lower left of the elbow point E.

The low beam light distribution pattern PL10 is formed as a combined light distribution pattern in which five light distribution patterns P11, P12, P13, P14, and P15 are superimposed.

The light distribution pattern P11 is a light distribution pattern formed by light emitted from the light emission region 330_a_1 of the front surface 330_a_ of the lens 330, and is formed as a horizontally long light distribution pattern widely expanding in the left-right direction with a relatively large vertical width below the H-H line. The light distribution pattern P11 is designed to form a wide diffusion area of the low beam light distribution pattern PL10.

The light distribution pattern P12 is a light distribution pattern formed by light emitted from the emission region 330_a_2 on the front surface 330_a_ of the lens 330, and is formed as a horizontally long bright light distribution pattern expanding rightward from the vicinity of the V-V line with a narrow vertical width in the vicinity below the H-H line. The light distribution pattern P12 is designed to form the lower cutoff line CL11 of the low beam light distribution pattern PL10 by its upper end edge.

The formation of such a light distribution pattern P12 is due to the fact that an opening angle of the light-emitting surface 322_a_ of the light-emitting element 322 from the outer peripheral edge portion in the outer periphery-side region of the peripheral region 334 becomes small, and therefore, the light distribution pattern formed by the light emitted from the emission region 330_a_2 located on the front side of the lamp is likely to be small and bright.

The light distribution pattern P13 is a light distribution pattern formed by light emitted from the emission region 330_a_3 on the front surface 330_a_ of the lens 330, and is formed as a small and bright light distribution pattern extending obliquely upward to the left with a narrow vertical width in the vicinity below the H-V. The light distribution pattern P13 is designed to form the slope portion CL13 and a right end portion of the upper cutoff line CL12 of the low beam light distribution pattern PL10 by its upper end edge. The formation process of the light distribution pattern P13 will be described below.

The light distribution pattern P14 is a light distribution pattern formed by light emitted from the emission region 330_a_4 on the front surface 330_a_ of the lens 330, and is formed as a horizontally long bright light distribution pattern expanding leftward from the vicinity of the left of the V-V line with a narrow vertical width substantially along the H-H line. The light distribution pattern P14 is designed to form the upper cutoff line CL12 of the low beam light distribution pattern PL10 by its upper end edge. At this time, the light distribution pattern P14 is formed so that a right end portion thereof smoothly connects to and overlaps the light distribution pattern P13.

As in the light distribution pattern P12, the formation of such a light distribution pattern P14 is due to the fact that an opening angle of the light-emitting surface 322a of the light-emitting element 322 from the outer peripheral edge portion in the outer periphery-side region of the peripheral region 334 becomes small, and therefore, the light distribution pattern formed by the light emitted from the emission region 330a4 located on the front side of the lamp is likely to be small and bright.

The light distribution pattern P15 is a light distribution pattern formed by light emitted from the emission region 330a5 on the front surface 330a of the lens 330 and is formed as a horizontally long, relatively bright light distribution pattern expanding leftward from the vicinity of the left side of the V-V line with a relatively narrow vertical width, spanning both the light distribution pattern P14 and the light distribution pattern P11, with its right end portion overlapping the light distribution pattern P13.

Figure 22:
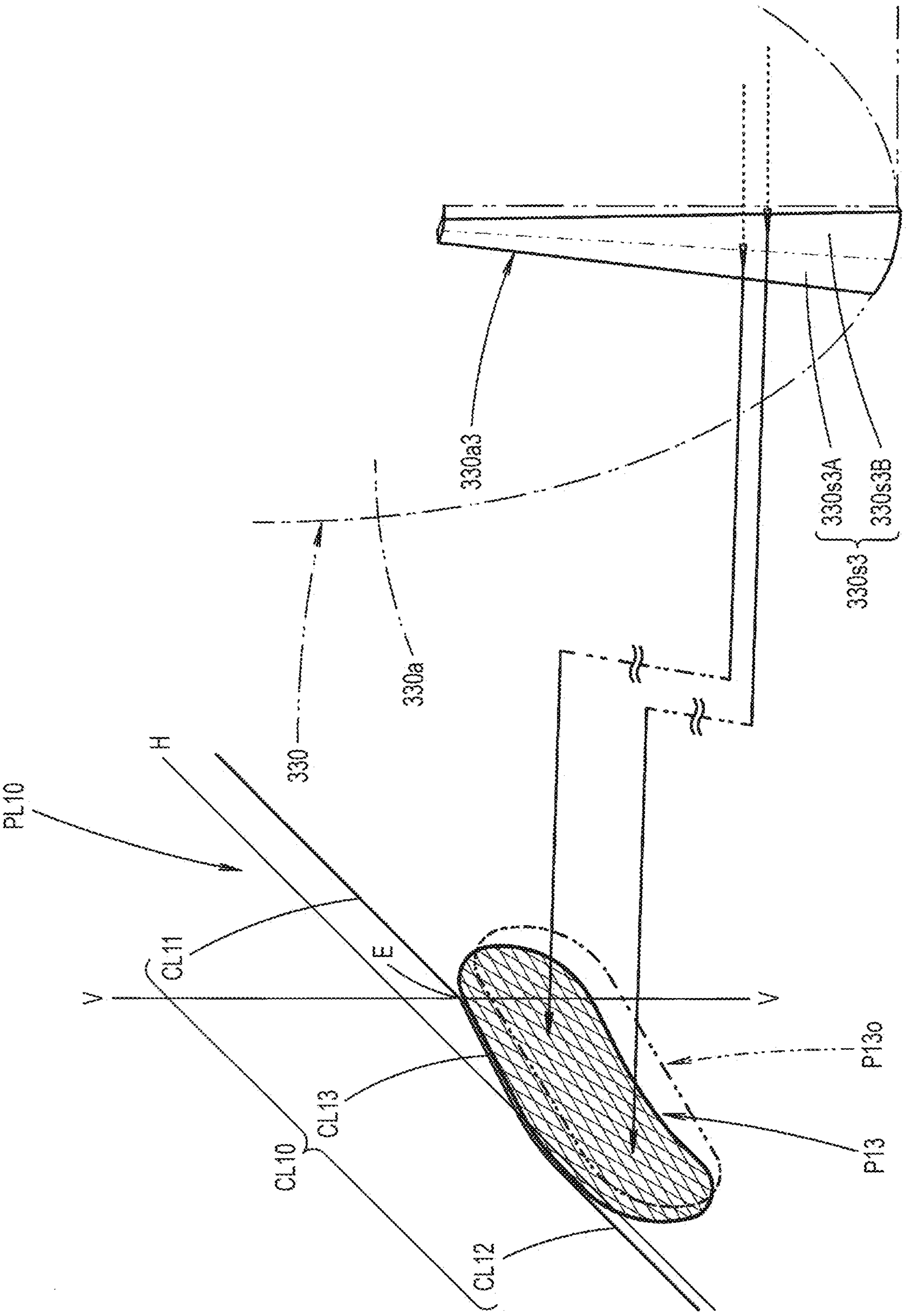
FIG. 22 is a view for illustrating a formation process of part of the low beam light distribution pattern.

FIG. 22 is a view for illustrating the formation process of the light distribution pattern P13, and shows a part of the front surface 330a of the lens 330 and a part of the first light distribution pattern PL10 in perspective view, respectively.

As shown in FIG. 22, the light distribution pattern P13 formed by the light emitted from the lens element 330s3 constituting the emission region 330a3 on the front surface 330a of the lens 330 is formed so that its upper end edge extends from the slope portion CL13 to the right end portion of the upper cutoff line CL12 of the low beam light distribution pattern PL10, as described above.

On the other hand, a light distribution pattern P130 indicated by a two-dot chain line in FIG. 22 is a light distribution pattern formed if the lens element 330s3 is not present in the emission region 330a3, and is formed to extend obliquely upward to the left in the vicinity below the slope portion CL13. The light distribution pattern P130 is formed with an upper end edge as a clear light-dark boundary line. This is because the light-emitting element 322 is arranged with the lower end edge of the light-emitting surface 322a positioned on the optical axis Ax of the lens 330.

Since the lens element 330s3 is formed in the emission region 330a3, the light distribution pattern P130 changes like the light distribution pattern P13. This is because the lens element 330s3 forms the free-form curved surface whose curvature of the convex curved surface gradually changes from the right half 330s3A to the left half 330s3B, thereby slightly deflecting upward the parallel light arriving at the front surface 330a of the lens 330 and then gradually changing the emission direction from the right half 330s3A to the left half 330s3B.

In addition, since the emission region 330a3 is configured by the single lens element 330s3 and has no steps on its surface, a light pool that causes glare is not unintentionally formed in a space above the slope portion CL13 as part of the light distribution pattern P13.

Figure 23A:
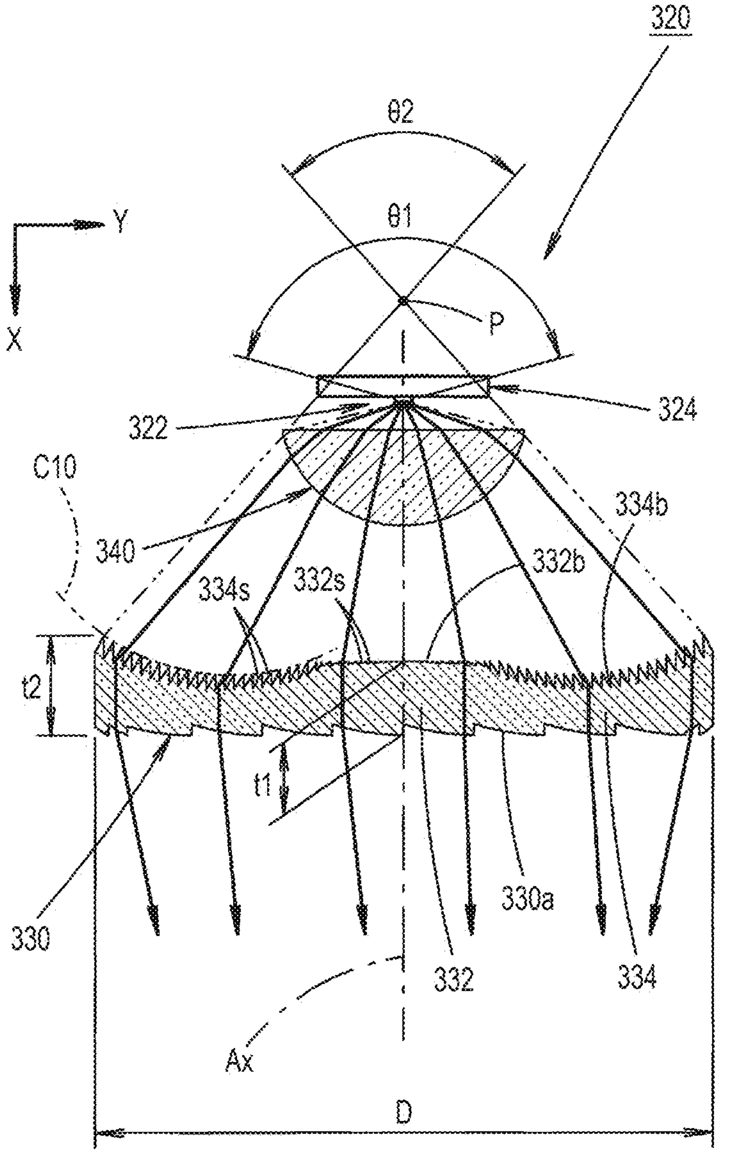
FIG. 23A is a view for illustrating an operation of the second embodiment, and is a view similar to FIG. 19.
Figure 23B:
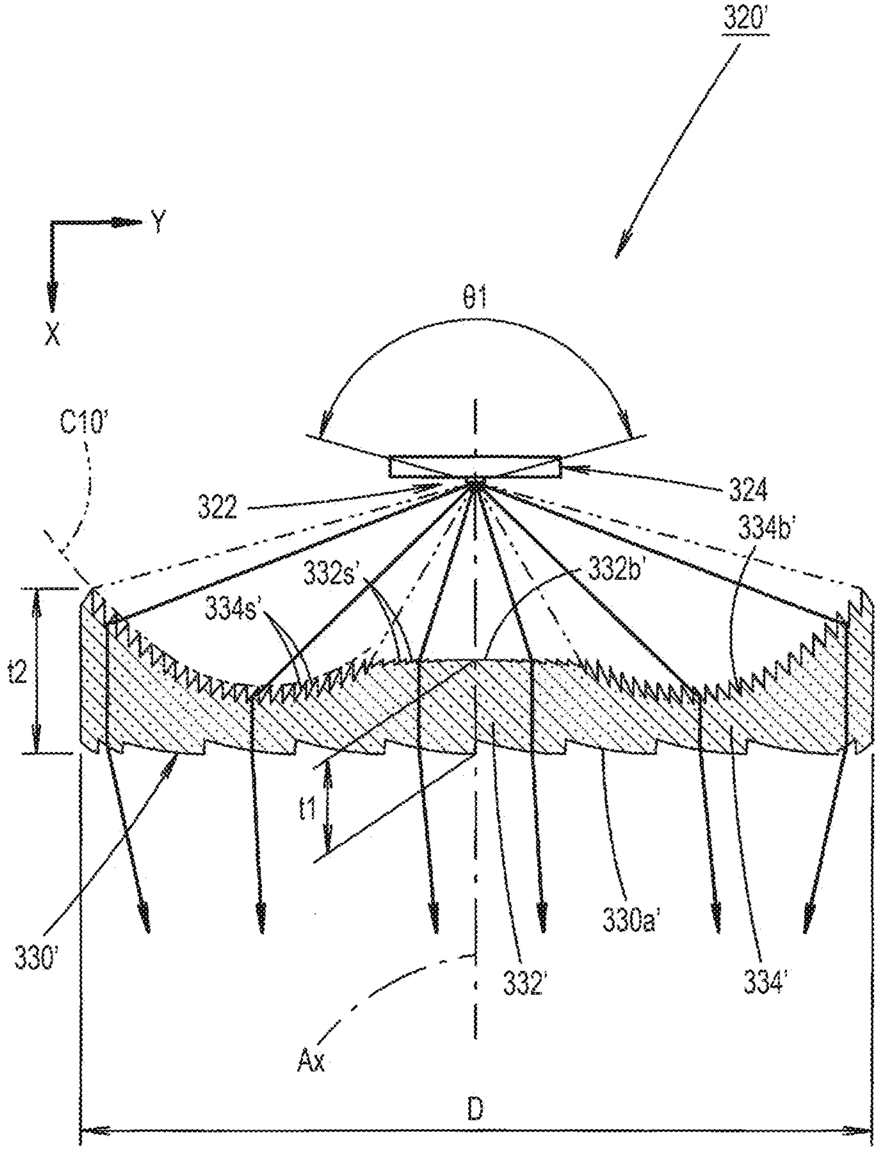
FIG. 23B is a view similar to FIG. 23A, showing a comparative example of the second embodiment.

FIG. 23A is a view for illustrating an operation of the present embodiment and is a view similar to FIG. 19. FIG. 23B is a view similar to FIG. 23A showing a comparative example of the present embodiment.

As shown in FIG. 23A, in the lamp unit 320, light emitted from the light-emitting element 322 is deflected toward a direction close to the optical axis Ax and then allowed to be incident on the lens 330 by the condenser lens 340. In this case, as indicated by the two-dot chain line in the drawing, a maximum radiation angle $\theta 1$ when light is incident on the condenser lens 340 from the reference position of the light-emitting element 322 becomes a considerably large value, but a maximum radiation angle $\theta 2$ when light is incident on the lens 330 becomes a considerably smaller value than the maximum radiation angle $\theta 1$ (specifically, a value of about $\theta 2=\frac{1}{2}\times\theta 1$).

By setting the maximum radiation angle $\theta 2$ to a small value in this manner, the curvature of the annular concave curved surface C10 (i.e., an envelope surface when the plurality of total reflection prism elements 334s are formed on the rear surface 334b of the peripheral region 334 of the lens 330) also becomes a relatively small value. For this reason, a maximum thickness t2 of the peripheral region 334 is about 1.5 times a maximum thickness t1 of the central region 332, and thus does not become excessively large.

On the other hand, as shown in FIG. 23B, a lamp unit 320' according to a comparative example of the present embodiment includes a light-emitting element 322 and a substrate 324 similar to those of the lamp unit 320, but does not include a condenser lens 340 as in the lamp unit 320, and is configured such that light emitted from the light-emitting element 322 is directly incident on a lens 330'. That is, the configuration of the lens 330' is different from that of the lens 330 of the lamp unit 320.

In the lamp unit 320', the light emitted from the light-emitting element 322 is radiated toward the front of the lamp through the lens 330', thereby forming a light distribution pattern substantially similar to the low beam light distribution pattern PL10 shown in FIG. 21.

To achieve this, as with the lens 330, the lens 330' includes a central region 332' and a peripheral region 334', a plurality of lens elements 332s' are formed in a Fresnel lens shape on the rear surface 332b' of the central region 332', while a plurality of total reflection prism elements 334s' are formed on the rear surface 334b' of the peripheral region 334' in a state of being aligned in a concentric circular form. The lens 330' is designed to guide light emitted from the reference position of the light-emitting element 322 to a front surface 330a as parallel light directed toward the forward-facing direction of the lamp. It is noted that the configuration of the front surface 330a' of the lens 330' is similar to that of the lens 330.

In the lamp unit 320', the light emitted from the light-emitting element 322 is configured to be directly incident on the lens 330'. At this time, the maximum radiation angle $\theta 1$ when the light emitted from the reference position of the light-emitting element 322 enters the lens 330' is set to the same value as the maximum radiation angle $\theta 1$ shown in FIG. 23A (i.e., the maximum radiation angle when the light emitted from the reference position of the light-emitting element 322 enters the condenser lens 340 in the lamp unit 320).

Accordingly, a curvature of an annular concave curved surface C10' of the lens 330' (i.e., the envelope surface when a plurality of total reflection prism elements 334s' are formed on the rear surface 334b' of the peripheral region 334') is set to a relatively large value. For this reason, the maximum thickness 12 of the peripheral region 334' is a considerably large value, about twice the maximum thickness t1 of the central region 332'.

To make a light distribution of a low beam light distribution pattern formed by radiated light from the lamp unit 320' similar to the light distribution of the low beam light distribution pattern PL10 shown in FIG. 21, it is necessary to make an optical path length from the light-emitting element 322 to the lens 330' close to an optical path length from the light-emitting element 322 to the lens 330 in the lamp unit 320. For this reason, in the lamp unit 320', an outer diameter D of the lens 330' is set to a value significantly larger than an outer diameter D of the lens 330.

Comparing the lamp unit 320 and the lamp unit 320', the use efficiency of the light emitted from the light-emitting element 322 is similar, but the light intensity distribution of the light arriving at the lenses 330 and 330' is more uniform in the lamp unit 320. This is because, in the lamp unit 320, the light arriving at the lens 330 is treated as light from a virtual point light source at point P on the optical axis Ax located on the rear side of the lamp with respect to the reference position of the light-emitting element 322, and as a result, the apparent maximum radiation angle θ2 becomes smaller (i.e., θ2<θ1).

Next, the operational effects of the present embodiment will be described.

The vehicle lamp 310 according to the present embodiment is configured to form the low beam light distribution pattern PL10 having the stepped cutoff line CL10 by radiating light emitted from the light-emitting element 322 (light sources) of the lamp unit 320 toward the front of the lamp through the lens 330. However, on the rear surface 334*b* of the peripheral region 334 located around the central region 332 centered on the optical axis Ax extending in the front-rear direction of the lamp in the lens 330, the plurality of total reflection prism elements 334*s*, which allow light emitted from the light-emitting elements 322 to be incident and then totally reflected toward the front of the lamp, are formed in a state of being aligned in a concentric circular form centered on the optical axis Ax. Therefore, the light emitted from the light-emitting element 322 can be used as forward-radiated light over a wide area.

In this case, since the plurality of total reflection prism elements 334*s* form the annular concave curved surface C10 centered on the optical axis as an envelope surface, a sufficient amount of light can be obtained even for light emitted from the light-emitting element 322 toward the outer peripheral edge portion of the lens 330.

In addition, the condenser lens 340, which allows light emitted from the light-emitting element 322 to be incident on the lens 330 in a condensed state, is arranged between the light-emitting element 322 and the lens 330. Therefore, the opening angle of the light emitted from the light-emitting element 322, arriving at the outer peripheral edge portion of the peripheral region 334 of the lens 330, with respect to the optical axis Ax (i.e., a half value of the maximum radiation angle θ2) can be reduced. Accordingly, it is possible to prevent the intensity of reflected light from the plurality of total reflection prism elements 334*s* from becoming uneven depending on the radial position, thereby enabling light distribution control by the lens 330 to be performed with high precision.

As such, according to the present embodiment, in the vehicle lamp 310 configured to radiate light emitted from the light-emitting element 322 toward the front of the lamp through the lens 330, light distribution control by the lens 330 can be performed with high precision while sufficiently securing an amount of light emitted from the outer peripheral edge portion of the lens 330

Furthermore, as in the present embodiment, configuring the light emitted from the light-emitting element 322 to be incident on the lens 330 in a state of being condensed by the condenser lens 340 enables the maximum thickness t2 of the peripheral region 334 not to be significantly larger than the maximum thickness t1 of the central region 332.

Accordingly, compared to a configuration where the light emitted from the light-emitting element 322 is allowed to be directly incident on the lens 330', as in the lamp unit 320' shown in FIG. 23B, the lens 330 can be made thinner and its moldability can be enhanced. Further, the lens 330 can form the low beam light distribution pattern PL10 with high precision even though it is smaller than the lens 330'.

The condenser lens 340 of the present embodiment is configured as a plano-convex lens with the front surface 340*a* formed in a convex curved surface shape and the rear surface 340*b* formed in a flat surface shape, allowing light emitted from the light-emitting element 322 to be incident over a wide area and used as forward-radiated light.

In addition, the lens 330 of the present embodiment includes the front surface 330*a* divided into five emission regions 330*a*1, 330*a*2, 330*a*3, 330*a*4, 330*a*5, and the respective emission regions are formed with the plurality of lens elements 330*s*1, 330*s*2, 330*s*3, 330*s*4, and 330*s*5 to control the emission of light arriving from the plurality of total reflection prism elements 334*s*, resulting in a further enhanced degree of freedom of light distribution control.

In the present embodiment, since the light source of the lamp unit 320 includes the light-emitting element 322 arranged with the light-emitting surface 322*a* facing toward the front of the lamp, it becomes possible to easily form the low beam light distribution pattern PL10 having the stepped cutoff line CL by radiated light from the vehicle lamp 310.

In the above embodiment, the light-emitting surface 322*a* of the light-emitting element 322 has been described as having an outer shape of about 1×1 mm. A light-emitting surface with other shapes can also be used.

In the above embodiment, the rear surface 332*b* of the central region 332 of the lens 330 of the lamp unit 320 has been described as being formed in a Fresnel lens shape. Other configurations (e.g., a configuration formed with a single convex lens surface) can also be adopted.

In the above embodiment, the lens 330 of the lamp unit 320 has been described as having a circular outer shape when viewed from the front of the lamp. A configuration having other outer shapes can also be adopted.

In the above embodiment, the lens 330 has been described as being configured as an injection-molded product. Other configurations (e.g., those configured as compression-molded products) can also be adopted.

In the above embodiment, the low beam light distribution pattern PL10 for left light distribution having the stepped cutoff line CL10 has been described as being formed by radiated light from the vehicle lamp 310. A configuration that forms other light distribution patterns can also be adopted.

Next, modified examples of the above embodiment will be described.

Figure 24:
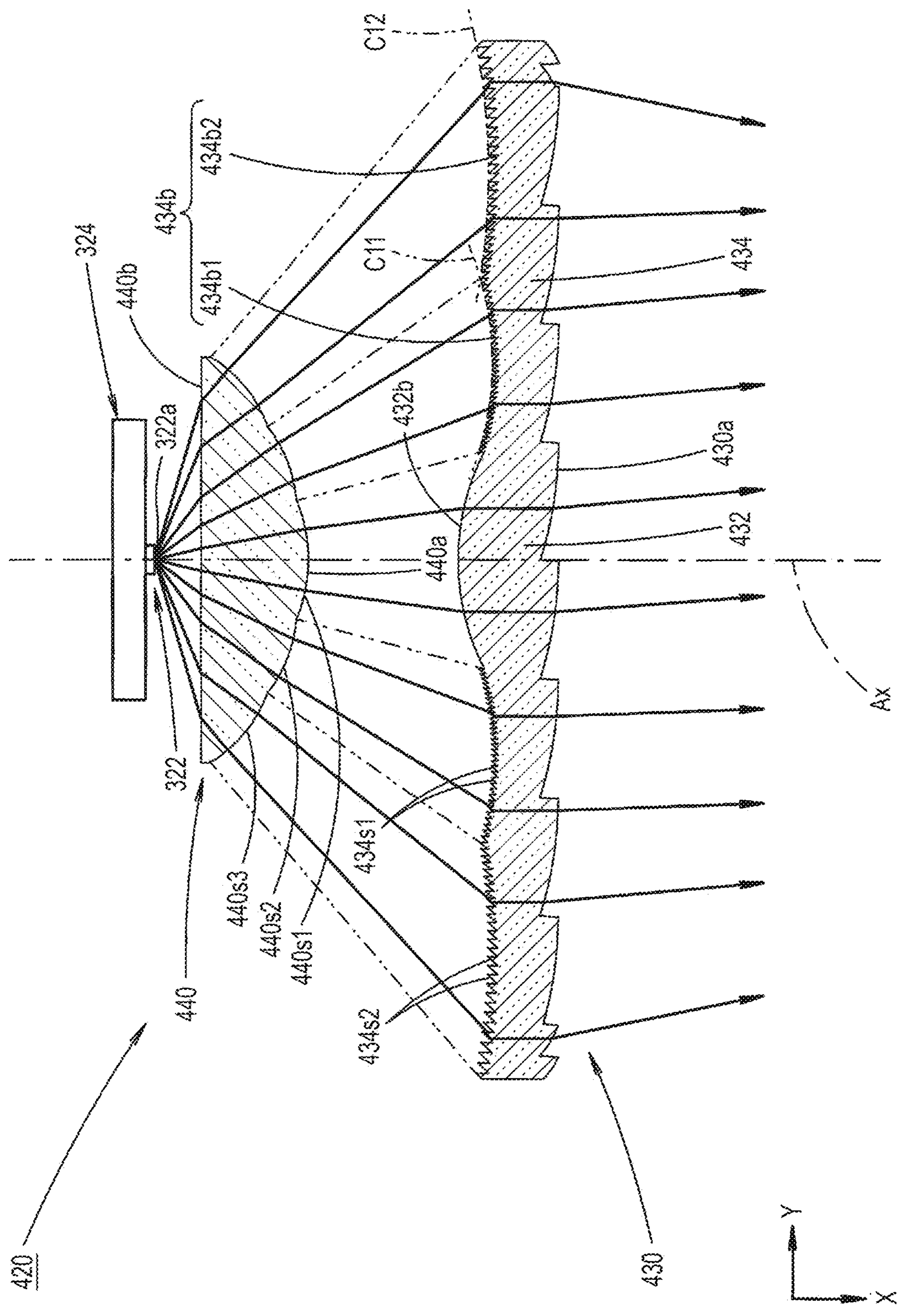
FIG. 24 is a view similar to FIG. 19, showing a modified example of the second embodiment.

FIG. 24 is a view similar to FIG. 19, showing a lamp unit 420 of the vehicle lamp according to the present modified example.

As shown in FIG. 24, also in the lamp unit 420 of the present modified example, light emitted from the light-emitting element 322 is radiated toward the front of the lamp through a lens 430 arranged on the front side of the lamp, and a condenser lens 440, which allows the light emitted from the light-emitting element 322 to be incident on the lens 430 in a condensed state, is arranged between the light-emitting element and the lens. The configurations of the lens 430 and the condenser lens 440 are partially different from those of the above embodiment.

That is, the lens 430 of the present modified example also includes a central region 432 centered on the optical axis Ax extending in the front-rear direction of the lamp and a peripheral region 434 located around the central region, and rear surfaces 432*b* and 434*b* of the central region 432 and the peripheral region 434 are configured to guide light emitted from the reference position of the light-emitting element 322 to a front surface 430*a* of the lens 430 as parallel light directed toward the forward-facing direction of the lamp. The specific configuration is different from that of the above embodiment.

That is, the rear surface 432*b* of the central region 432 is configured as a single convex lens surface.

On the other hand, the rear surface 434*b* of the peripheral region 434 is divided into an inner periphery-side region 434*b*1 and an outer periphery-side region 434*b*2, each formed with a plurality of total reflection prism elements 434*s*1 and 434*s*2 aligned in a concentric circular form centered on the optical axis Ax, respectively.

Specifically, in the inner periphery-side region 434*b*1, a plurality of total reflection prism elements 434*s*1 form a first annular concave curved surface C11 centered on the optical axis Ax as an envelope surface, and in the outer periphery-side region 434*b*2, a plurality of total reflection prism elements 434*s*2 form a second annular concave curved surface C12 centered on the optical axis Ax as an envelope surface.

The first annular concave curved surface C11 is formed such that inner and outer peripheral edges of the inner periphery-side region 434*b*1 are substantially at the same position with respect to the front-rear direction of the lamp. In addition, the second annular concave curved surface C12 is formed such that inner and outer peripheral edges of the outer periphery-side region 434*b*2 are substantially at the same position with respect to the front-rear direction of the lamp.

In this case, in the inner periphery-side region 434*b*1, a pitch of the plurality of total reflection prism elements 434*s*1 and a curvature of the first annular concave curved surface C11 are set such that light emitted from the light-emitting element 322 is incident approximately evenly on each of the plurality of total reflection prism elements 434*s*1, and in the outer periphery-side region 434*b*2, a pitch of the plurality of total reflection prism elements 434*s*2 and a curvature of the second annular concave curved surface C12 are set such that light emitted from the light-emitting element 322 is incident approximately evenly on each of the plurality of total reflection prism elements 434*s*2.

As a result, the plurality of total reflection prism elements 434*s*1 formed in the inner periphery-side region 434*b*1 have a cross-sectional shape in which the total reflection prism elements 434*s*1 located closer to the outer peripheral edge of the inner periphery-side region 434*b*1 are larger than the total reflection prism elements 434*s*1 located closer to the inner peripheral edge. In addition, the plurality of total reflection prism elements 434*s*2 formed in the outer periphery-side region 434*b*2 also have a cross-sectional shape in which the total reflection prism elements 434*s*2 located closer to the outer peripheral edge of the outer periphery-side region 434*b*2 are larger than the total reflection prism elements 434*s*2 located closer to the inner peripheral edge.

The plurality of total reflection prism elements 434*s*2 formed in the outer periphery-side region 434*b*2 have a larger cross-sectional shape as a whole than the plurality of total reflection prism elements 434*s*1 formed in the inner periphery-side region 434*b*1. Since the plurality of total reflection prism elements 434*s*1 and 434*s*2 form the first and second annular concave curved surfaces C11 and C12 set dually as envelope surfaces, even the total reflection prism element 434*s*2 located closer to the outer peripheral edge of the outer periphery-side region 434*b*2 does not become large in its cross-sectional shape.

It is noted that in the lens 430 of the present modified example, the configuration of the front surface 430*a* is similar to that of the above embodiment.

The condenser lens 440 of the present modified example is configured as a plano-convex lens made of transparent resin with the front surface 440*a* formed in a convex curved surface shape and the rear surface 440*b* formed in a flat surface shape, as in the condenser lens 340 of the above embodiment. The specific surface shape of the front surface 440*a* is different from that of the above embodiment.

That is, the front surface 440*a* of the condenser lens 440 includes three condenser lens elements 440*s*1, 440*s*2, and 440*s*3 formed in a state of being aligned in a concentric circular form around the optical axis Ax on a virtual spherical surface centered at a point on the optical axis Ax.

The condenser lens element 440*s*1 located at the center is formed in a spherical surface shape centered on the optical axis Ax, the condenser lens element 440*s*2 adjacent to the condenser lens element 440*s*1 has an arc-shaped cross-section and is formed in an annular shape centered on the optical axis Ax, and the condenser lens element 440*s*3 adjacent to the condenser lens element 440*s*2 also has an arc-shaped cross-section and is formed in an annular shape centered on the optical axis Ax.

The condenser lens element 440*s*1 is configured to deflect and emit light emitted from the light-emitting element 322 toward a direction close to the optical axis Ax. In addition, the condenser lens element 440*s*2 is configured to deflect and emit light from the light-emitting element 322 in a direction slightly inclined with respect to the optical axis Ax. In addition, the condenser lens element 440*s*3 is configured to deflect and emit light from the light-emitting element 322 in a direction significantly inclined with respect to the optical axis Ax. In this case, the condenser lens element 440*s*1 is formed with a curvature that causes light emitted from the light-emitting element 322 to be incident on the rear surface 432*b* of the central region 432 of the lens 430, the condenser lens element 440*s*2 is formed with a curvature that causes light emitted from the light-emitting element 322 to be incident on the rear surface 434*b*1 of the inner periphery-side region 434*b*1 in the peripheral region 434 of the lens 430, and the condenser lens element 440*s*3 is formed with a curvature that causes light emitted from the light-emitting element 322 to be incident on the rear surface 434*b*2 of the outer periphery-side region 434*b*2 in the peripheral region 434 of the lens 430.

That is, the curvature of the surface shape of the condenser lens 440 constituting each of the three condenser lens elements 440*s*1, 440*s*2, and 440*s*3 is set so that the light emitted from each of the condenser lens elements 440*s*1, 440*s*2, and 440*s*3 arrives at the lens 430 within three regions divided by two-dot chain lines in FIG. 24

Even in the case where the configuration of the present modified example is adopted, as with the above embodiment, light distribution control by the lens 430 can be performed with high precision while sufficiently securing an amount of light emitted from the outer peripheral edge portion of the lens 430.

In addition, adopting the configuration of the present modified example enables the region where light emitted from the light-emitting element 322 is incident on the lens 430 through the condenser lens 440 to be appropriately set by the surface shape of each of the three condenser lens elements 440*s*1, 440*s*2, and 440*s*3, resulting in an enhanced degree of freedom of light distribution control by the lens 430.

In addition, in the present modified example, as a configuration of the peripheral region 434 of the lens 430, the rear surface 434*b* is divided into the inner periphery-side region 434*b*1 and the outer periphery-side region 434*b*2, and the plurality of total reflection prism elements 434*s*1 and 434*s*2 form the first and second annular concave curved surfaces C11 and C12 set dually as envelope surfaces, ensuring that the sizes of the total reflection prism element 434*s*1 formed in the outer peripheral edge portion of the inner periphery-side region 434*b*1, as well as the total reflection prism element 434*s*2 formed in the outer peripheral edge portion of the outer periphery-side region 434*b*2, do not become excessively large. Accordingly, when forming the lens 430, it becomes possible to precisely form the plurality of total reflection prism elements 434*s*1 and 434*s*2, thereby enabling light distribution control to be performed with high precision. In addition, the peripheral region 434 of the lens 430 can be made thinner.

It is noted that, in the above modified example, the configuration of the front surface 440*a* of the condenser lens 440 has been described as having three condenser lens elements 440*s*1, 440*s*2, and 440*s*3 formed on a virtual spherical surface. A configuration in which two or four or more condenser lens elements are formed can also be adopted.

In addition, instead of the lamp unit 420 of the above modified example, it is also possible to adopt a configuration in which the condenser lens 440 of the above modified example and the lens 330 of the above embodiment are combined, or a configuration in which the condenser lens 340 of the above embodiment and the lens 430 of the above modified example are combined.

It is noted that the numerical values shown as specifications in the above embodiment and the modified example are only examples and may be set to other values as appropriate.

In addition, the present disclosure is not limited to the configurations described in the above embodiment and the modified example thereof, and configurations with various other modifications can also be adopted.

Third Embodiment

Hereinafter, a third embodiment of the present disclosure will be described with reference to the drawings.

Figure 25:
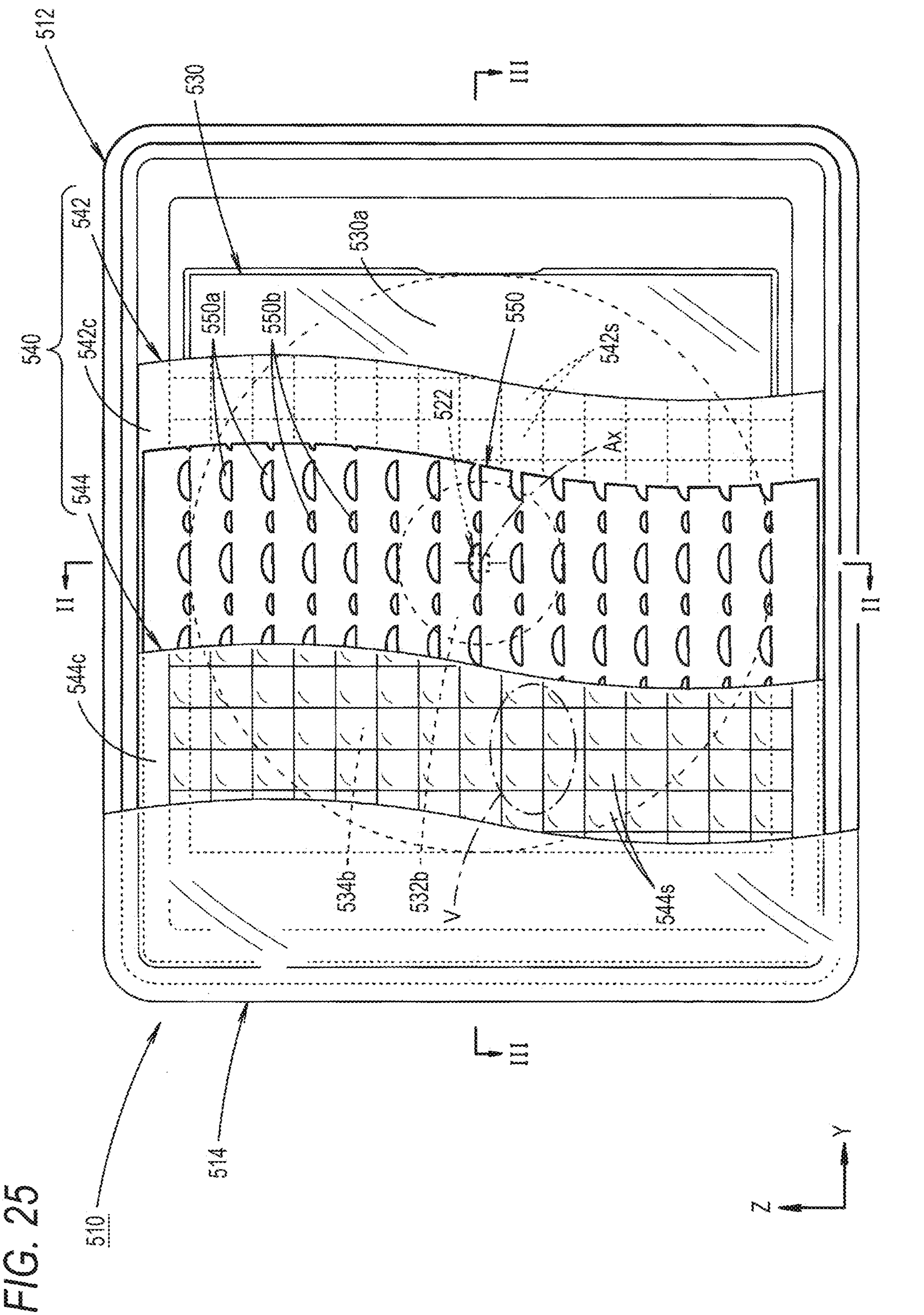
FIG. 25 is a front view showing a vehicle lamp according to a third embodiment of the present disclosure.
Figure 26:
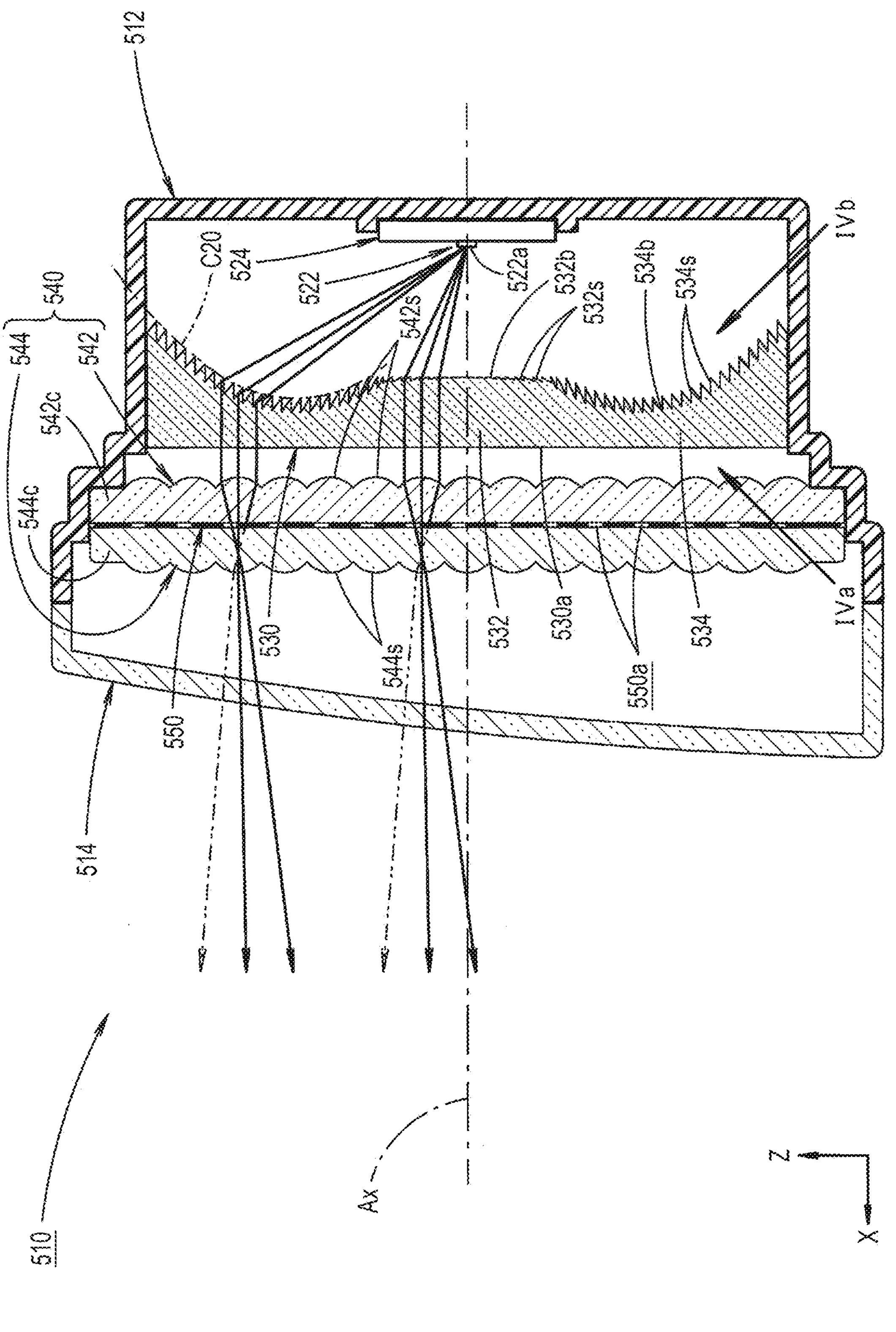
FIG. 26 is a cross-sectional view taken along line II-II of FIG. 25.
Figure 27:
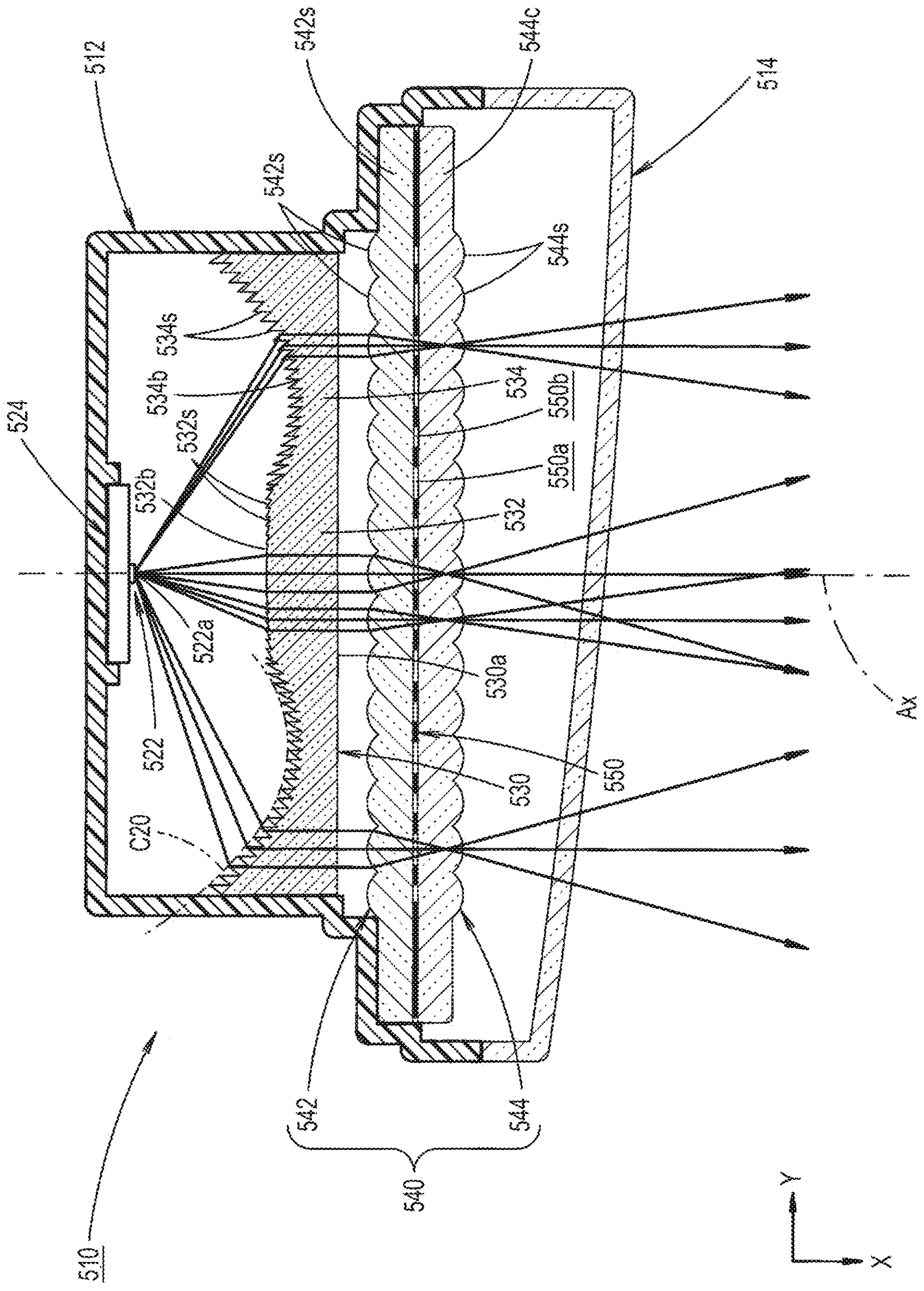
FIG. 27 is a cross-sectional view taken along line III-III of FIG. 25.

FIG. 25 is a front view showing a vehicle lamp 510 according to the third embodiment of the present disclosure. FIG. 26 is a cross-sectional view taken along line II-II of FIG. 25, and FIG. 27 is a cross-sectional view taken along line III-III of FIG. 25. It is noted that, in FIG. 25, some of the components are shown in a partially cutaway view.

In FIGS. 25 to 27, a direction indicated by X is "front of the lamp ("front" of a vehicle)," a direction indicated by Y is a "left direction" ("left direction" of a vehicle, but "right direction" when viewed from the front of the lamp) orthogonal to the "front," and a direction indicated by Z is "upper direction." The same applies to the drawings other than FIGS. 25 to 27.

As shown in FIGS. 25 to 27, a vehicle lamp 510 according to the present embodiment is a headlamp provided at a right front end portion of a vehicle, and includes a light-emitting element 522 as a light source, a collimator lens 530 having an optical axis Ax extending in the front-rear direction of the lamp, a microlens array 540, and a light-shielding sheet 550 accommodated within a lamp chamber formed by a lamp body 512 and a light-transmitting cover 514.

The vehicle lamp 510 is configured to form a low beam light distribution pattern (which will be described below) by allowing light emitted from the light-emitting element 522 to be incident on the microlens array 540 as parallel light via the collimator lens 530 and then radiating the light toward the front of the lamp through the microlens array 540.

The light-emitting element 522 is a white light-emitting diode, and is arranged with its light-emitting surface 522*a* facing the front of the lamp (specifically, toward the forward-facing direction of the lamp). The light-emitting surface 522*a* of the light-emitting element 522 has a rectangular outer shape (specifically, a square of about 1×1 mm). The light-emitting element 522 is arranged with its light-emitting center (i.e., the center position of the light-emitting surface 522*a*) positioned on the optical axis Ax.

Next, the specific configuration of the collimator lens 530 will be described.

Figure 28A:
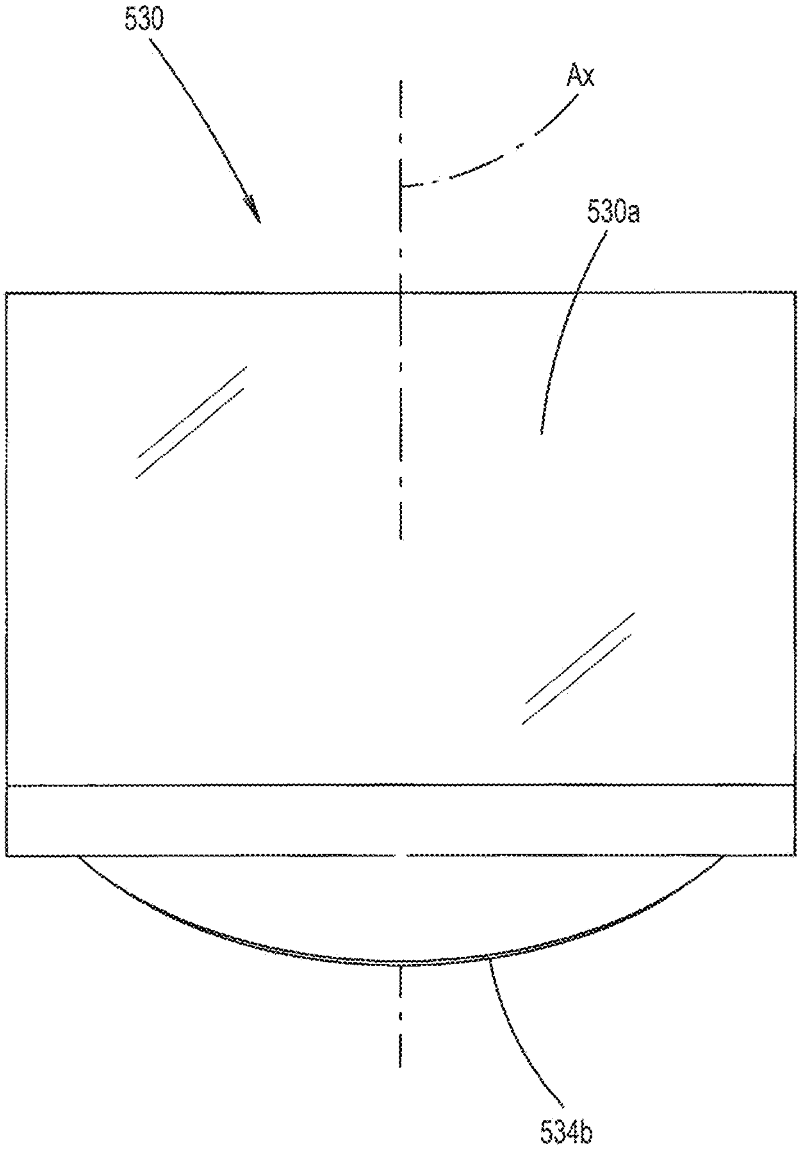
FIG. 28A is a view as viewed in a direction of arrow IVa of FIG. 26.
Figure 28B:
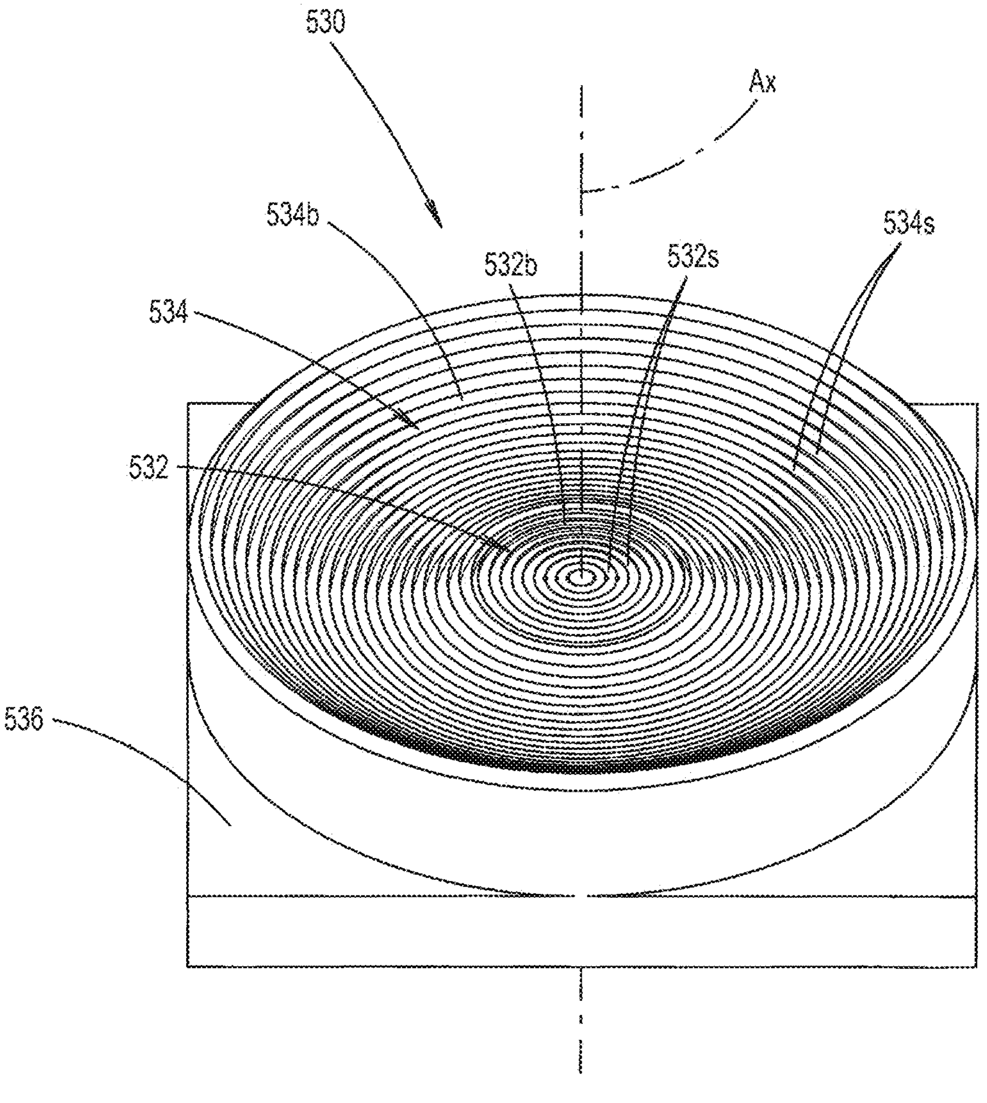
FIG. 28B is a view as viewed in a direction of arrow IVb of FIG. 26.

FIG. 28A is a view as viewed in a direction of arrow IVa of FIG. 26, and FIG. 28B is a view as viewed in a direction of arrow IVb of FIG. 26.

As shown in FIGS. 28A and 28B, the collimator lens 530 is an injection-molded product made of transparent resin and includes a central region 532 centered on the optical axis Ax, a peripheral region 534 located around the central region 532, and a flange portion 536 located around the peripheral region 534. The central region 532 and the peripheral region 534 have a circular outer shape centered on the optical axis Ax when viewed from the front of the lamp, and the flange portion 536 has a rectangular outer shape (specifically, a square shape with one side of 50 mm or less (e.g., about 35 mm)) circumscribed around the peripheral region 534 when viewed from the front of the lamp.

A rear surface 532*b* of the central region 532 is configured as a Fresnel lens in which a plurality of prism elements 532*s* are arranged concentrically around the optical axis Ax, thereby allowing light emitted from the light-emitting element 522 to be incident on the collimator lens 530 while being refracted in a direction close to the optical axis Ax. Specifically, the rear surface 532*b* of the central region 532 is designed to guide light emitted from the light-emitting center of the light-emitting element 522 to the front surface 530*a* of the collimator lens 530 as parallel light directed toward the forward-facing direction of the lamp, in each prism element 532*s*.

A plurality of total reflection prism elements 534*s* are formed on the rear surface 534*b* of the peripheral region 534 in a state of being aligned in a concentric circular form centered on the optical axis Ax. Each of the plurality of total reflection prism elements 534*s* is a Fresnel lens-type total reflection prism and is configured to allow light emitted from the light-emitting element 522 to be incident and then totally reflected toward the front of the lamp. Specifically, each of the plurality of total reflection prism elements 534*s* is designed to allow light emitted from the light-emitting center of the light-emitting element 522 to be incident while being refracted in a direction away from the optical axis Ax and then to be guided to the front surface 530*a* of the collimator lens 530 as parallel light directed toward the forward-facing direction of the lamp.

A boundary position between the central region 532 and the peripheral region 534 is defined by a circle with a radius of 4 to 6 mm (e.g., a radius of about 5 mm) centered on the optical axis Ax.

As shown in FIGS. 26 and 27, the plurality of total reflection prism elements 534*s* formed on the rear surface

534*b* of the peripheral region 534 form an annular concave curved surface C20 (a cross-sectional shape is indicated by a two-dot chain line in the drawing) centered on the optical axis Ax as an envelope surface.

In this case, in the rear surface 534*b* of the peripheral region 534, a pitch of the plurality of total reflection prism elements 534*s* and a curvature of the annular concave curved surface C20 are set such that the light emitted from the light-emitting element 522 is incident approximately equally on each of the plurality of total reflection prism elements 534*s*.

As a result, the plurality of total reflection prism elements 534*s* have a cross-sectional shape in which the total reflection prism elements 534*s* located closer to an outer peripheral edge of the rear surface 534*b* of the peripheral region 534 are larger than the total reflection prism elements 534*s* located closer to an inner peripheral edge.

As shown in FIGS. 25 to 28B, the front surface 530*a* of the collimator lens 530 is configured as a plane extending along a vertical plane orthogonal to the optical axis Ax. The collimator lens 530 is arranged with its front surface 530*a* close to the microlens array 540.

As shown in FIGS. 26 and 27, in the collimator lens 530, the central region 532 has a substantially constant thickness of about 3 to 4 mm, and the peripheral region 534 has a thinner thickness than the central region 532 in a middle portion thereof and a thicker thickness of about 6 to 8 mm in an outer peripheral edge portion.

As shown in FIGS. 28A and 28B, the flange portion 536 of the collimator lens 530 is thinner than the central region 532 and is formed to extend in a flat plate shape flush with the front surface 530*a*. The collimator lens 530 is supported on the lamp body 512 at the flange portion 536.

Next, the specific configuration of the microlens array 540 will be described.

As shown in FIGS. 25 to 27, the microlens array 540 includes a rear lens array 542 and a front lens array 544 located on a front side of the lamp relative to the rear lens array 542.

A front surface of the rear lens array 542 is configured as a plane extending along a vertical plane orthogonal to the front-rear direction of the lamp, and a rear surface thereof is formed with a plurality of condenser lens portions 542*s* for condensing light emitted from the light-emitting element 522. The plurality of condenser lens portions 542*s* are all convex curved fish-eye lenses and have an optical axis Ax1 extending in the front-rear direction of the lamp.

The plurality of condenser lens portions 542*s* are assigned to a plurality of segments divided into a shape of vertical and horizontal grids, respectively. Each segment has a rectangular (e.g., square) outer shape with one side length of about 2 to 3 mm (e.g., about 2.5 mm).

On the other hand, a rear surface of the front lens array 544 is configured as a plane extending along a vertical plane orthogonal to the front-rear direction of the lamp, and a rear surface thereof is formed with a plurality of projection lens portions 544*s* for projecting each of a plurality of light source images formed by the plurality of condenser lens portions 542*s*. The plurality of projection lens portions 544*s* are all convex curved fish-eye lenses and are assigned to a plurality of segments divided into a shape of vertical and horizontal grids with the same size as each of the plurality of condenser lens portions 542*s*, respectively. In this case, each optical axis Ax1 of the plurality of projection lens portions 544*s* is set to be coaxial with each optical axis Ax1 of the plurality of condenser lens portions 542*s*.

The rear lens array 542 has a horizontally long rectangular outer shape when viewed from the front of the lamp, and an outer peripheral edge region 542*c* surrounding a portion where the plurality of condenser lens portions 542*s* are formed is formed in a flat plate shape.

On the other hand, the front lens array 544 also has the same outer shape as the rear lens array 542 when viewed from the front of the lamp, and an outer peripheral edge region 544*c* surrounding a portion where the plurality of projection lens portions 544*s* are formed is formed in a flat plate shape.

Between the rear lens array 542 and the front lens array 544, the light-shielding sheet 550 is arranged to define respective shapes of the plurality of light source images formed by the plurality of condenser lens portions 542*s*.

The light-shielding sheet 550 includes a light-shielding plate (e.g., a metal plate having a plate thickness of about 0.1 to 0.5 mm) having substantially the same outer shape as the rear lens array 542 and the front lens array 544. The light-shielding sheet 550 is formed with a plurality of light-transmitting portions 550*a* and 550*b*. In this case, the plurality of light-transmitting portions 550*a* and 550*b* are arranged in a shape of vertical and horizontal grids so as to correspond to each of the plurality of projection lens portions 544*s* in the front lens array 544, and the plurality of light-transmitting portions 550*a* and the plurality of light-transmitting portions 550*b* are arranged in a single vertical row, alternating in the left-right direction.

Figure 29:
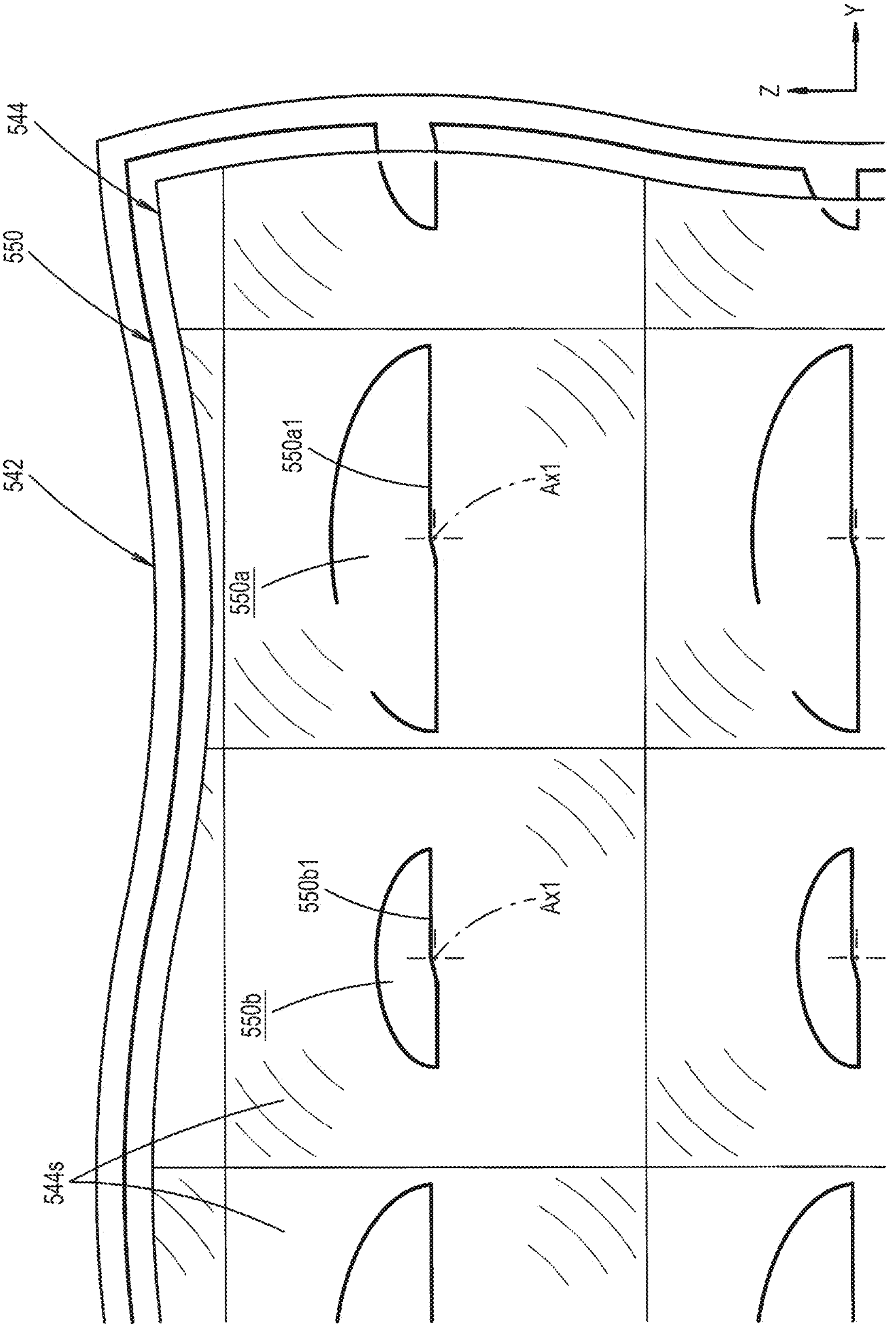
FIG. 29 is a detailed view of portion V of FIG. 25.

FIG. 29 is a detailed view of portion V of FIG. 25.

As shown in FIG. 29, the plurality of light-transmitting portions 550*a* and 550*b* are formed with different opening shapes as opening portions penetrating the light-shielding sheet 550.

That is, each of the plurality of light-transmitting portions 550*a* has an opening shape of substantially the same shape as an upper half of a horizontally long oval shape. A lower end edge 550*a*1 of the light-transmitting portion 550*a* is formed to extend in the left-right direction with vertical offset along a vertical plane orthogonal to the optical axis Ax1 at a position of a rear focus of the projection lens portion 544*s*. Specifically, the lower end edge 550*a*1 has a left side portion relative to the optical axis Ax1 (right side portion when viewed from the front of the lamp) extending horizontally at a slightly higher position than the optical axis Ax1, and a right side portion relative to the optical axis Ax1 extending horizontally at a slightly lower position than the optical axis Ax1, and a left end portion of the right side portion extends obliquely upward to the left, connecting to the left side portion relative to the optical axis Ax1.

In addition, each of the plurality of light-transmitting portions 550*b* has an opening shape of substantially the same shape as the upper half of a horizontally long oval shape, but is set to a considerably smaller opening shape than that of the light-transmitting portion 550*a*. A lower end edge 550*b*1 of the light-transmitting portion 550*b* has the same shape as the lower end edge 550*a*1 of the light-transmitting portion 550*a*.

The light-shielding sheet 550 is fixed to the rear lens array 542 and the front lens array 544 by means of adhesion or the like. The microlens array 540 is supported on the lamp body 512 in the outer peripheral edge region 542*c* of the rear lens array 542.

Figure 30:
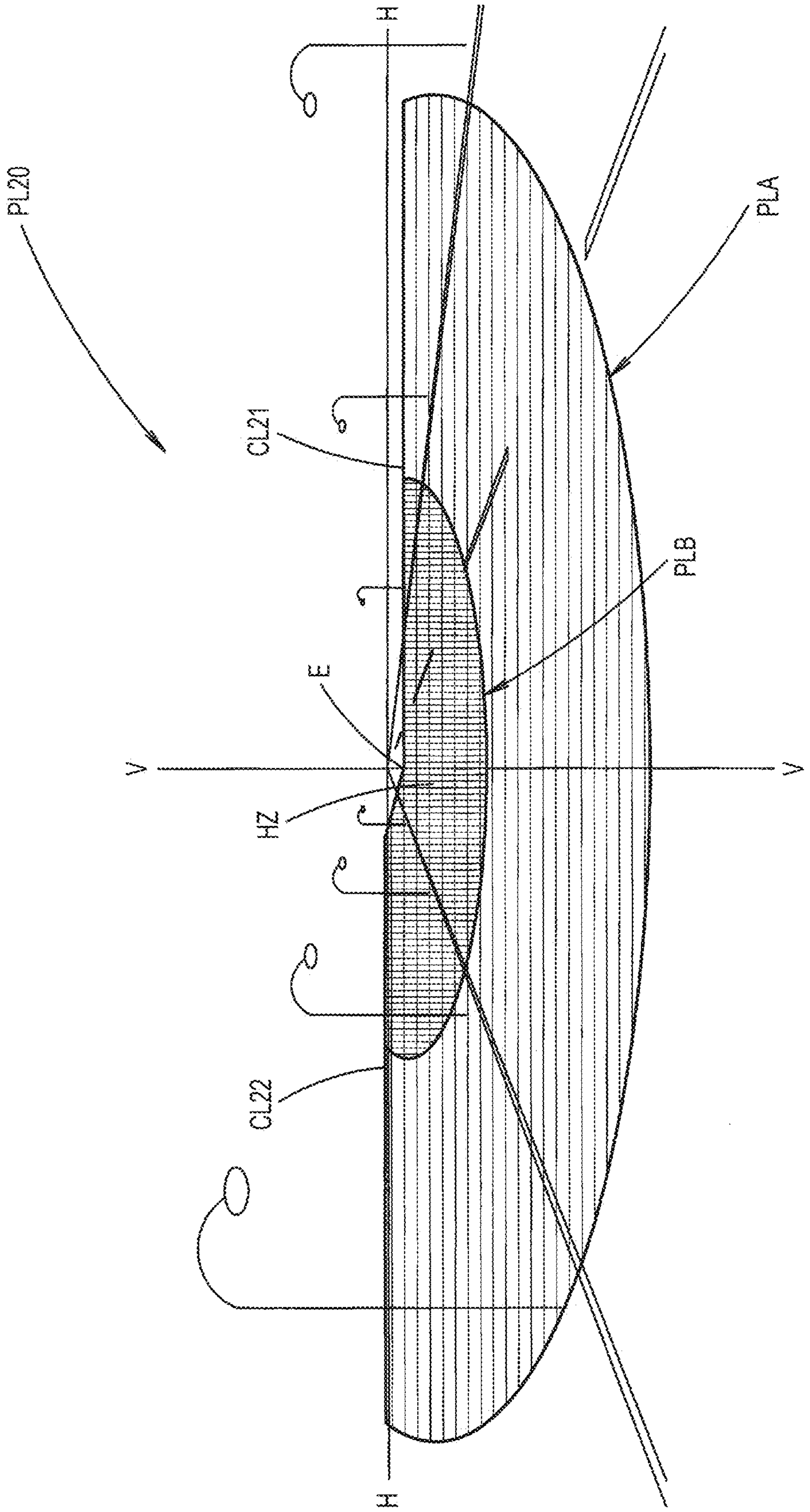
FIG. 30 is a perspective view showing a light distribution pattern formed by radiated light from the vehicle lamp.
Figure 31:
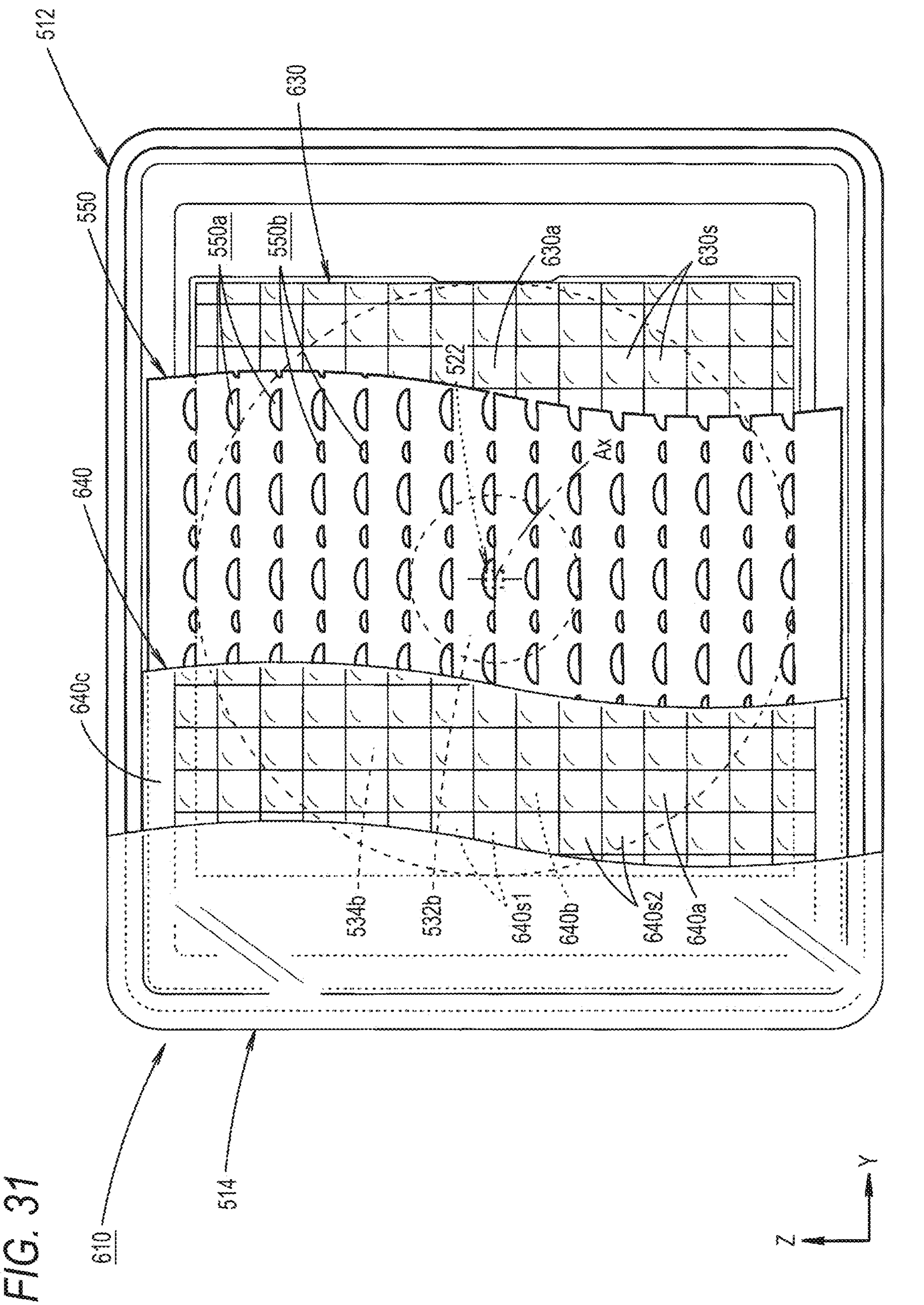
FIG. 31 is a view similar to FIG. 25, showing a first modified example of the third embodiment.
Figure 32:
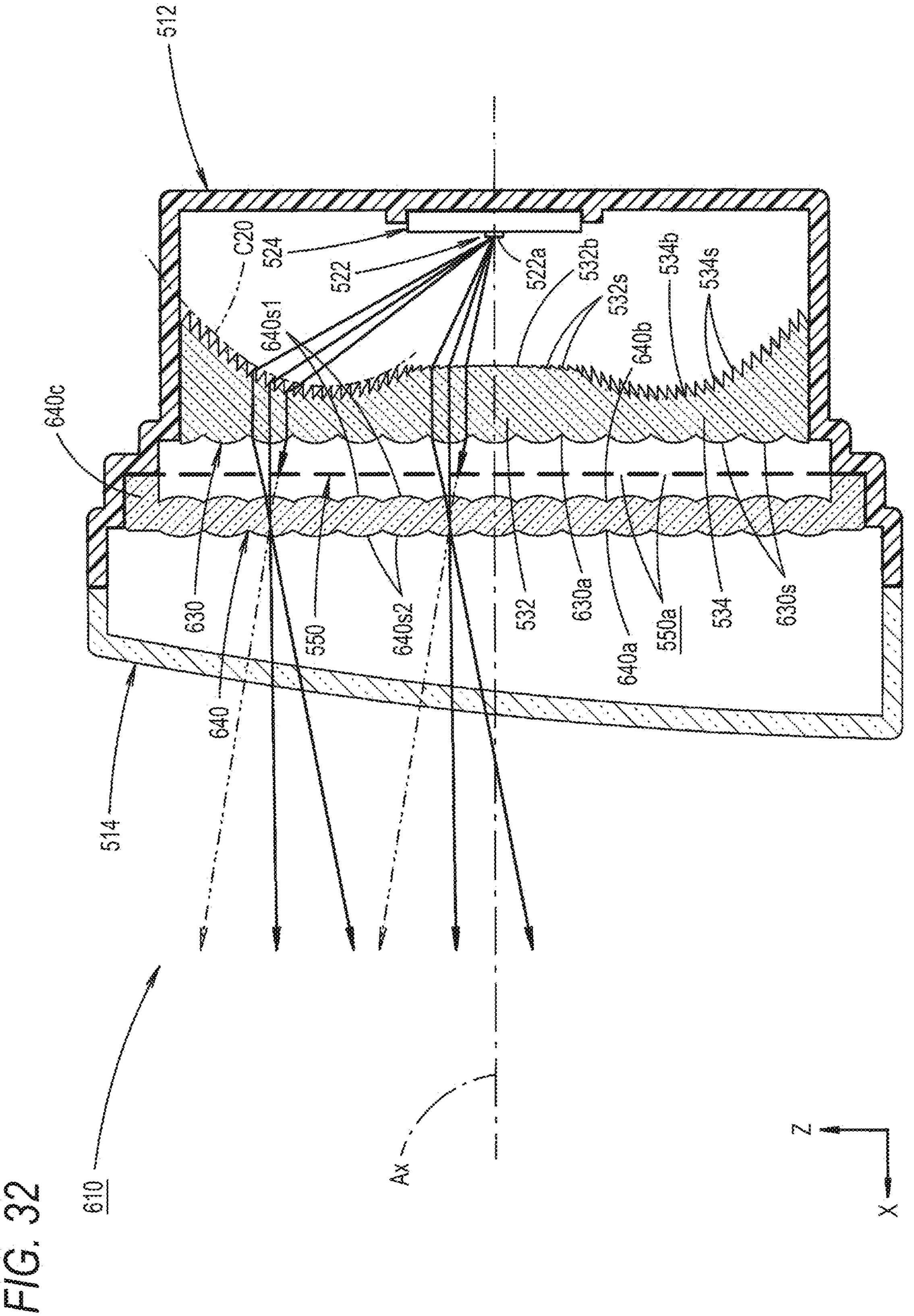
FIG. 32 is a view similar to FIG. 26, showing the first modified example.
Figure 33:
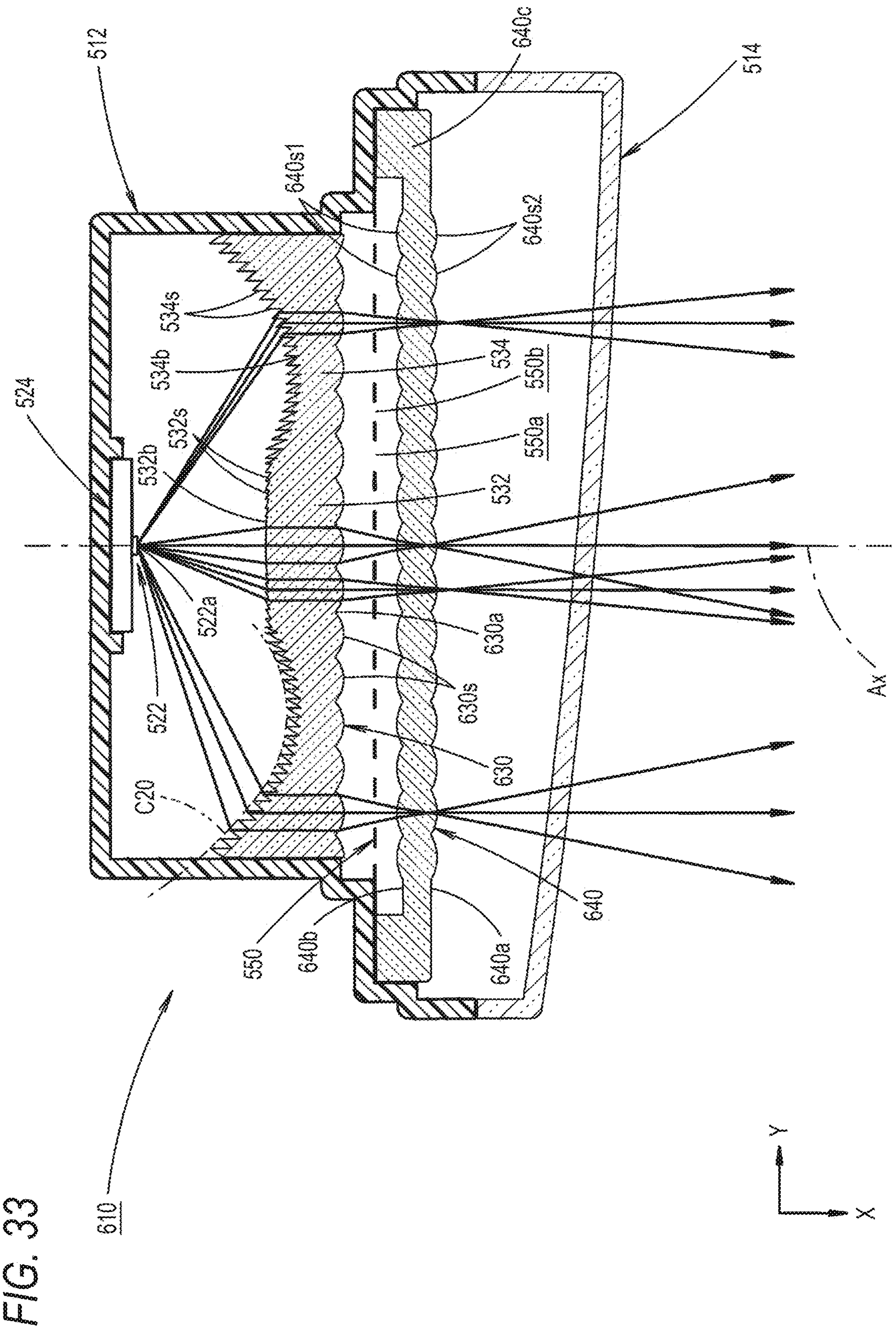
FIG. 33 is a view similar to FIG. 27, showing the first modified example.
Figure 34A:
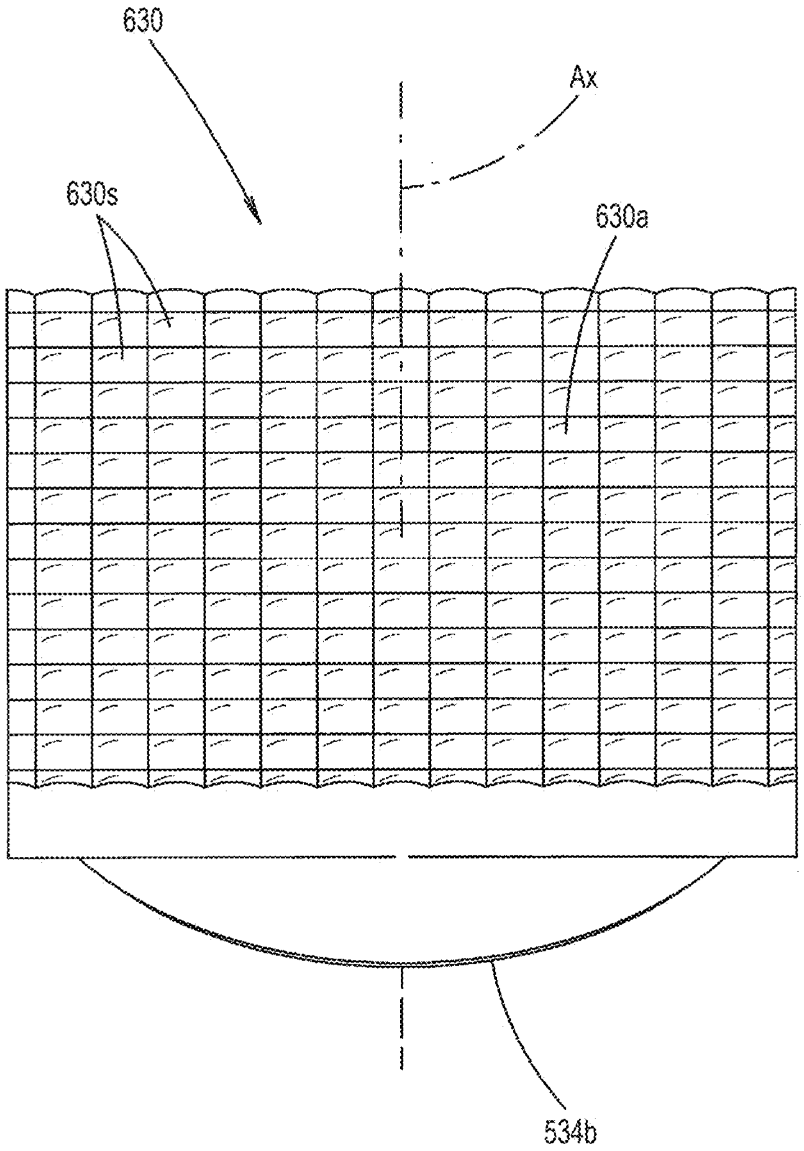
FIG. 34A is a view similar to FIG. 28A, showing the first modified example.
Figure 34B:
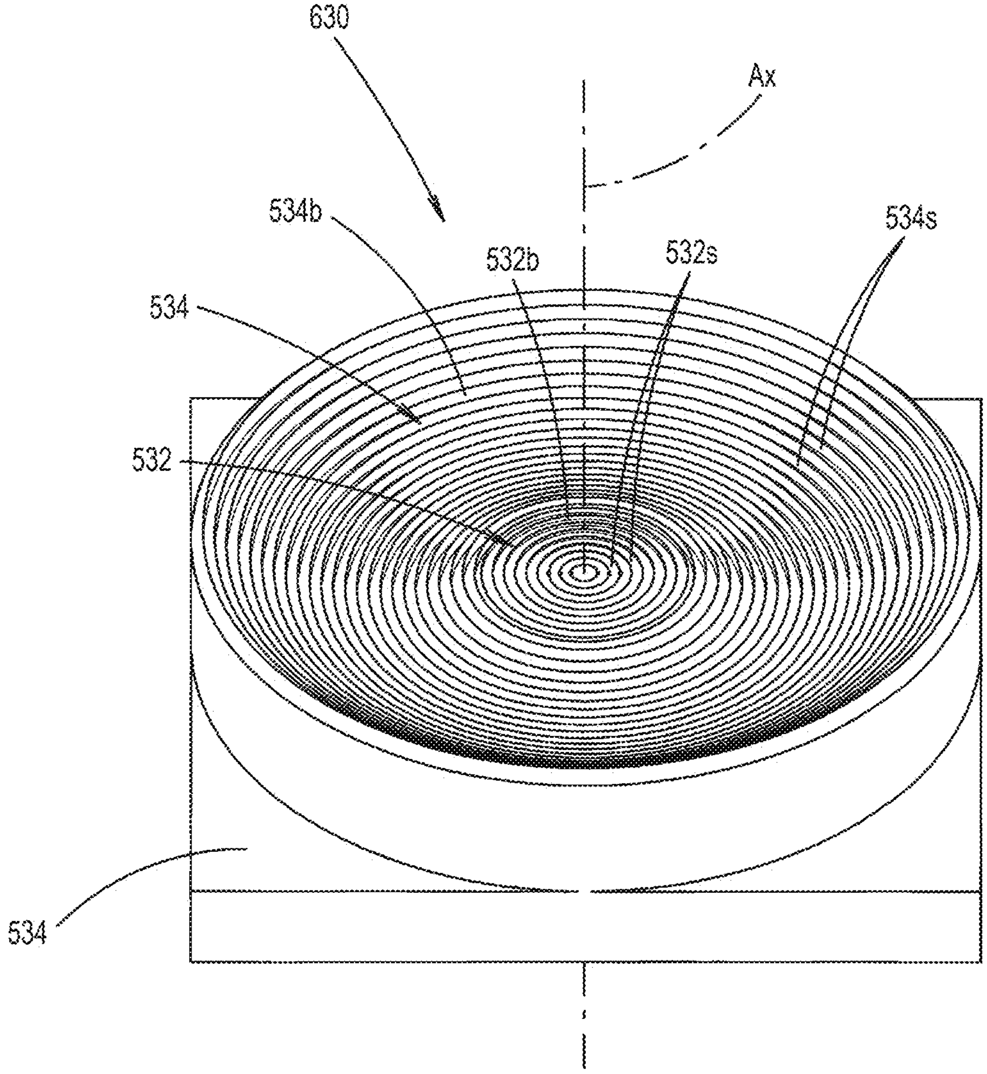
FIG. 34B is a view similar to FIG. 28B, showing the first modified example.

FIG. 30 is a perspective view showing a light distribution pattern formed on a virtual vertical screen placed 25 m ahead of the lamp by radiated light from the vehicle lamp 510.

The light distribution pattern shown in FIG. 30 is a low beam light distribution pattern PL20 for left light distribution and has vertically offset cutoff lines CL21 and CL22 at its upper end edge. As for the cutoff lines CL21 and CL22, an opposite lane side portion on the right side with respect to a V-V line passing vertically through an H-V vanishing point in the forward-facing direction of the lamp is formed as the lower cutoff line CL21, and an own lane side portion on the left side with respect to the V-V line is formed as the upper cutoff line CL22, which steps up from the lower cutoff line CL21 via a slope portion.

In the low beam light distribution pattern PL20, the elbow point E, which is an intersection of the lower cutoff line CL21 and the V-V line, is located about 0.5 to 0.6° below the H-V.

The low beam light distribution pattern PL20 is formed as a combined light distribution pattern of two large and small light distribution patterns PLA and PLB.

The larger light distribution pattern PLA is a light distribution pattern formed by light emitted from the plurality of light-emitting elements 522 that has passed through the plurality of light-transmitting portions 550*a*. In addition, the smaller light distribution pattern PLB is a light distribution pattern formed by light emitted from the plurality of light-emitting elements 522 that has passed through the plurality of light-transmitting portions 550*b*.

In the low beam light distribution pattern PL20, a diffusion area is formed by the light distribution pattern PLA, and a high-intensity area HZ is formed near the elbow point E by the light distribution pattern PLB.

Next, the operations of the present embodiment will be described.

The vehicle lamp 510 according to the present embodiment is configured such that light emitted from the light-emitting element 522 (light source), which is incident on the microlens array 540 as parallel light via the collimator lens 530, is condensed by the plurality of condenser lens portions 542*s* constituting the rear lens array 542 of the microlens array 540, and each of the plurality of light source images formed in this manner is projected by the plurality of projection lens portions 544*s* constituting the front lens array 544 of the microlens array 540. Therefore, it becomes possible to easily form the low beam light distribution pattern PL20 (a necessary light distribution pattern) in an arbitrary shape.

In addition, in the collimator lens 530, the plurality of total reflection prism elements 532*s*, which allow light emitted from the light-emitting element 522 to be incident and then totally reflected toward the front of the lamp, are formed in a state of being aligned in a concentric circular form centered on the optical axis Ax on the rear surface 532*b* of the peripheral region 534 located around the central region 532 centered on the optical axis Ax extending in the front-rear direction of the lamp. Therefore, the light emitted from the light-emitting element 522 can be used as forward-radiated light over a wide area while suppressing the depth dimension of the vehicle light 510.

Furthermore, since the plurality of total reflection prism elements 532*s* form the annular concave curved surface C20 centered on the optical axis as an envelope surface, a sufficient amount of light can be obtained even for light emitted from the light-emitting element 522 toward the outer peripheral edge portion of the lens 530. Accordingly, the light emitted from the light-emitting element 522 can be allowed to be incident on each of the plurality of condenser lens portions 542*s* as parallel light with approximately uniform brightness, thereby enabling formation of the low beam light distribution pattern PL20 with reduced light distribution unevenness.

According to the present embodiment, in the vehicle lamp 510 including the microlens array 540, a light distribution pattern with reduced light distribution unevenness can be formed while reducing the depth dimension.

In this case, in the present embodiment, the light-shielding sheet 550 including the plurality of light-transmitting portions 550*a* and 550*b* for defining the respective outer shapes of the plurality of light source images is arranged between the rear lens array 542 and the front lens array 544 constituting the microlens array 540, allowing the light distribution patterns PLA and PLB corresponding to the respective sizes and outer shapes of the plurality of light-transmitting portions 550*a* and 550*b* to be formed, thereby enabling the low beam light distribution pattern PL20 to be formed with an arbitrary light distribution.

In addition, in the present embodiment, since the light source of the lamp unit 510 includes the light-emitting element 522 arranged with the light-emitting surface 522*a* facing toward the front of the lamp, it becomes possible to easily form the low beam light distribution pattern PL20 having the stepped cutoff lines CL21 and CL22 by radiated light from the vehicle lamp 510.

In the above embodiment, the light-emitting surface 522*a* of the light-emitting element 522 has been described as having an outer shape of about 1×1 mm. A light-emitting surface with other shapes can also be used.

In the above embodiment, the rear surface 532*b* of the central region 532 of the lens 530 of the lamp unit 320 has been described as being formed in a Fresnel lens shape. Other configurations (e.g., a configuration formed with a single convex lens surface) can also be adopted.

In the above embodiment, the collimator lens 530 has been described as having a circular outer shape when viewed from the front of the lamp. A configuration having other outer shapes can also be adopted.

In the above embodiment, the collimator lens 530 has been described as being configured as an injection-molded product. Other configurations (e.g., those configured as compression-molded products) can also be adopted.

In the above embodiment, the condenser lens portions 542*s* of the rear lens array 542 and the projection lens portions 544*s* of the front lens array 544 in the microlens array 540 have been described as being assigned to each of the plurality of segments divided into a shape of vertical and horizontal grids. A division other than the shape of vertical and horizontal grids (for example, a division into a shape of oblique grids or a honeycomb shape) can also be adopted.

In the above embodiment, the light-shielding sheet 550 has been described as a light-shielding plate with the plurality of light-transmitting portions 550*a* and 550*b* formed as the plurality of opening portions. Alternatives can also be adopted, such as a transparent sheet on which a light-shielding process has been applied to a surface of a region surrounding the plurality of light-transmitting portions 550*a* and 550*b*, a light-shielding film on which a light-shielding process has been applied to a region surrounding the plurality of light-transmitting portions 550*a* and 550*b* on the front surface of the rear lens array 542 or the rear surface of the front lens array 544, or the like.

In the above embodiment, the plurality of light-transmitting portions 550*a* and 550*b* formed in the light-shielding sheet 550 have been described as being arranged in a single vertical row, alternating in the left-right direction. A configuration in which a plurality of types of light-transmitting portions are formed can also be adopted as an alternative arrangement.

In the above embodiment, the formation of the low beam light distribution pattern PL20 as the necessary light distribution pattern has been described. A configuration where a light distribution pattern (e.g., a light distribution pattern for road drawing) is formed can also be adopted.

Next, modified examples of the above embodiment will be described.

First, a first modified example of the above embodiment will be described.

FIGS. 31 to 34B are views similar to FIGS. 25 to 28B, showing a vehicle lamp 610 according to the present modified example.

As shown in FIGS. 31 to 34B, the basic configuration of the vehicle lamp 610 according to the present modified example is similar to that of the above embodiment. The configurations of a collimator lens 630 and a microlens array 640 are partially different from those of the above embodiment.

That is, the collimator lens 630 of the present modified example has a configuration where the collimator lens 530 and the rear lens array 542 of the microlens array 540 of the above embodiment are formed integrally.

Specifically, the collimator lens 630 of the present modified example has a plurality of condenser lens portions 630*s* formed on its front surface 630*a* and is thus configured to perform a function as the rear lens array 542 of the microlens array 540 of the above embodiment. The plurality of condenser lens portions 630*s* are all convex curved fish-eye lenses and are assigned to a plurality of segments divided into a shape of vertical and horizontal grids with the same size as each of the plurality of condenser lens portions 542*s* formed on the rear lens array 542 of the microlens array 540 of the above embodiment, respectively.

In addition, the microlens array 640 of the present modified example is configured to perform the function as the front lens array 544 in the microlens array 540 of the above embodiment. That is, the microlens array 640 includes the plurality of projection lens portions 640*s*2 formed on the front surface 640*a* and the plurality of condenser lens portions 640*s*1 formed on the rear surface 640*b*. The plurality of condenser lens portions 640*s*1 and the plurality of projection lens portions 640*s*2 are assigned to each of a plurality of segments divided into a shape of vertical and horizontal grids with the same size as each of the plurality of condenser lens portions 630*s* formed on the front surface 630*a* of the collimator lens 630.

The microlens array 640 has an outer peripheral edge region 640*c* formed in a flat plate shape, and is formed to become thicker toward the rear side of the lamp.

In the present modified example, a light-shielding sheet 550 having a configuration similar to that of the above embodiment is arranged between the collimator lens 630 and the microlens array 640. The light-shielding sheet 550 is fixed to the outer peripheral edge region 640*c* of the microlens array 640 at its outer peripheral edge portion by means of adhesion or the like. The microlens array 640 is supported on the lamp body 512 in its outer peripheral edge region 640*c*.

In the vehicle lamp 610 according to the present modified example, light emitted from the light-emitting element 522 is allowed to be incident on the collimator lens 630 to become parallel light, and then condensed by the plurality of condenser lens portions 630*s* formed on the front surface 630*a* and the plurality of condenser lens portions 640*s*1 formed on the rear surface 640*b* of the microlens array 640, and each of the plurality of light source images formed in this manner is projected by the plurality of projection lens portions 640*s*2 formed on the front surface 640*a* of the microlens array 640. Therefore, the effects similar to those of the above embodiment can be achieved.

In addition, since the collimator lens 630 of the present modified example has the configuration where the collimator lens 530 and the rear lens array 542 of the microlens array 540 of the above embodiment are integrally formed, the depth dimension of the vehicle lamp 610 can be further reduced, and the cost of the vehicle lamp 610 can be reduced by reducing the number of components.

Next, a second modified example of the above embodiment will be described.

Figure 35:
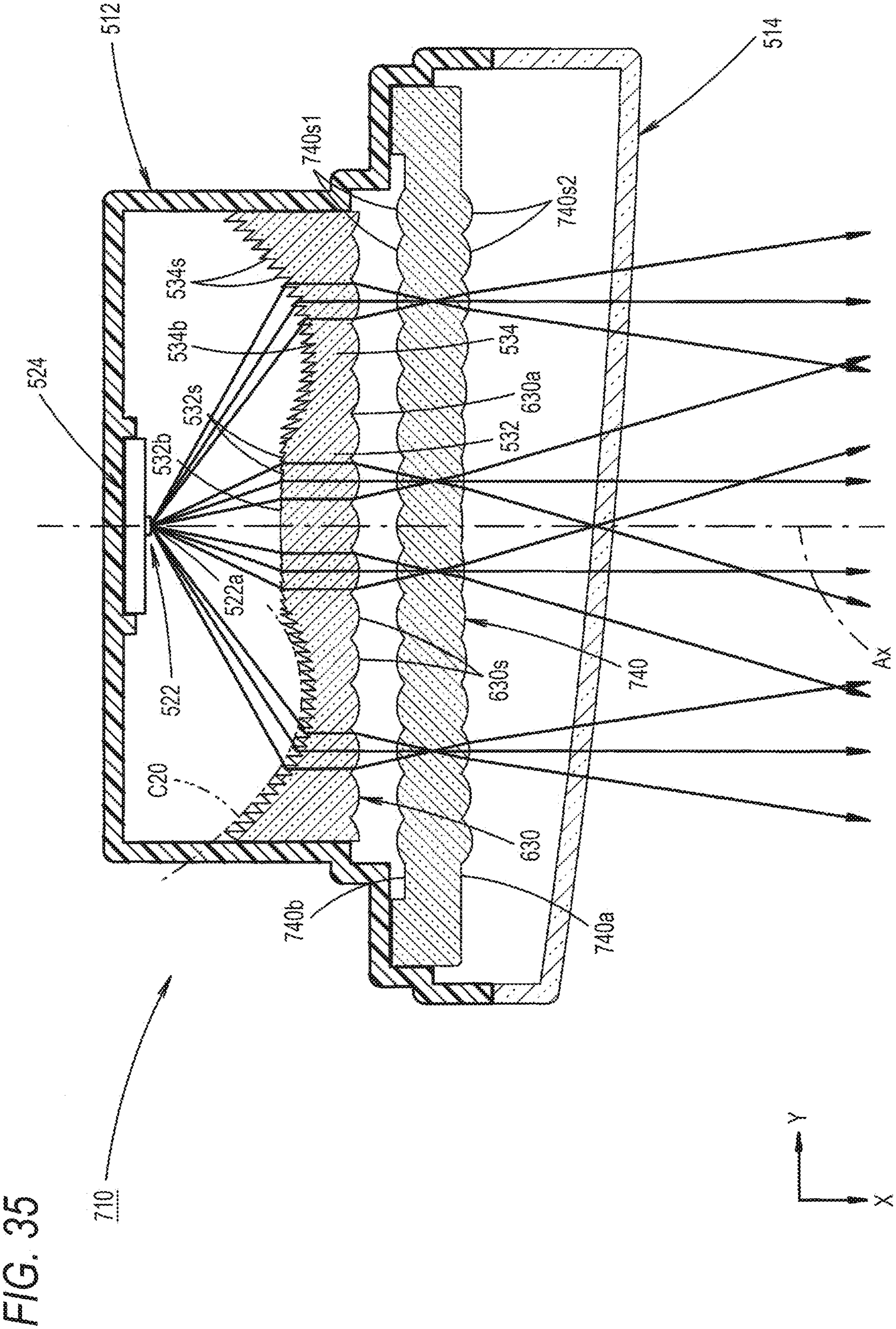
FIG. 35 is a view similar to FIG. 27, showing a second modified example of the third embodiment.

FIG. 35 is a view similar to FIG. 27, showing a vehicle lamp 710 according to the present modified example.

As shown in FIG. 35, the basic configuration of the vehicle lamp 710 according to the present modified example is similar to that of the first modified example. Unlike the vehicle lamp 610 according to the first modified example, the light-shielding sheet 550 is not provided, and the configuration of a microlens array 740 is partially different from that of the first modified example.

That is, the microlens array 740 of the present modified example also includes a plurality of condenser lens portions 740*s*1 formed on a rear surface 740*b* and a plurality of projection lens portions 740*s*2 formed on a front surface 740*a*. The plurality of projection lens portions 740*s*2 are formed such that the farther they are from the optical axis Ax of the collimator lens 630, the greater the curvature of the horizontal cross-sectional shape of the convex curved surface constituting their surface shape. On the other hand, regarding the vertical cross-sectional shape of the convex curved surface constituting the surface shape of each of the plurality of projection lens portions 740*s*2, the curvature thereof is set to a substantially constant value.

That is, the focal length of the plurality of projection lens portions 740*s*2 within the vertical plane has a substantially constant value, and the focal length within the horizontal plane becomes shorter as they are positioned farther from the optical axis Ax.

Accordingly, the light emitted from the microlens array 740 becomes light that expands widely in the left-right direction in the projection lens portion 740*s*2 located close to the optical axis Ax, and becomes light that expands narrowly in the left-right direction in the projection lens portion 740*s*2 located farther from the optical axis Ax.

Figure 36:
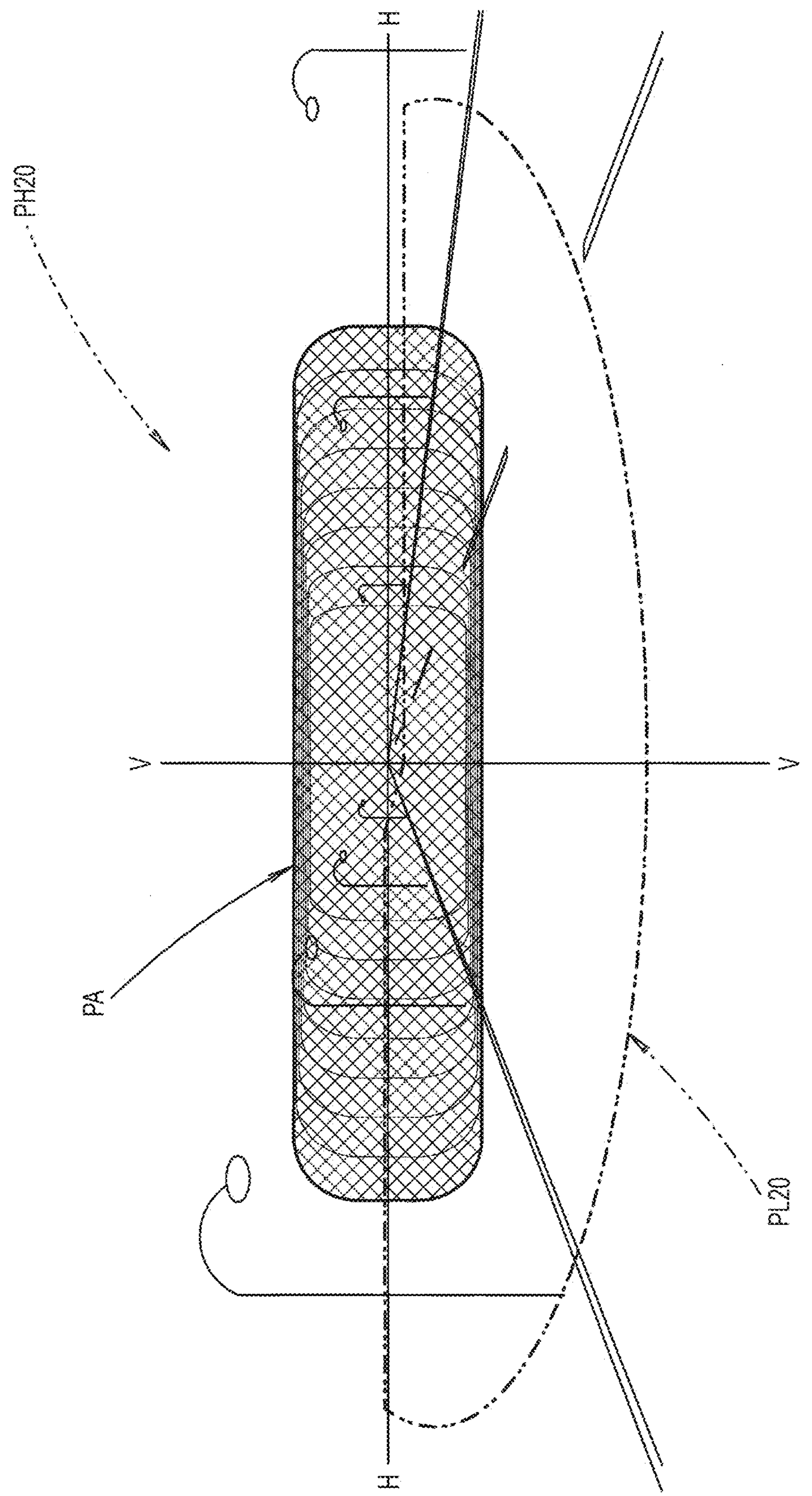
FIG. 36 is a perspective view showing a light distribution pattern formed by radiated light from a vehicle lamp according to the second modified example.

FIG. 36 is a perspective view showing a light distribution pattern formed on a virtual vertical screen placed 25 m ahead of the lamp by radiated light from the vehicle lamp 710.

The light distribution pattern shown in FIG. 36 is an additional light distribution pattern PA that is additionally formed for the low beam light distribution pattern PL20 when forming a high beam light distribution pattern PH20.

As shown in FIG. 36, the additional light distribution pattern PA is formed as a horizontally long light distribution pattern expanding to both the left and right from the V-V line centered on the H-V. In this case, the additional light distribution pattern PA is formed by superimposing a plurality of light distribution patterns with different left and right diffusion angles. This is because the focal lengths of the plurality of projection lens portions 740*s*2 constituting the front surface 740*a* of the microlens array 740 are substantially constant within the vertical plane, and become shorter as they are located farther from the optical axis Ax within the horizontal plane Even with the configuration of the present modified example, a light distribution pattern with reduced light distribution unevenness can be formed while reducing the depth dimension of the vehicle lamp 710.

In addition, as in the present modified example, appropriately adjusting the value of the focal length for each of the plurality of projection lens portions 740*s*2 can increase the degree of freedom of the light distribution of the additional light distribution pattern PA formed as a combined light distribution pattern of a plurality of light distribution patterns.

It is noted that the numerical values shown as specifications in the above embodiment and the modified example are only examples and may be set to other values as appropriate.

In addition, the present disclosure is not limited to the configurations described in the above embodiment and the modified example thereof, and configurations with various other modifications can also be adopted.

Fourth Embodiment

Hereinafter, a fourth embodiment of the present disclosure will be described with reference to the drawings.

Figure 37:
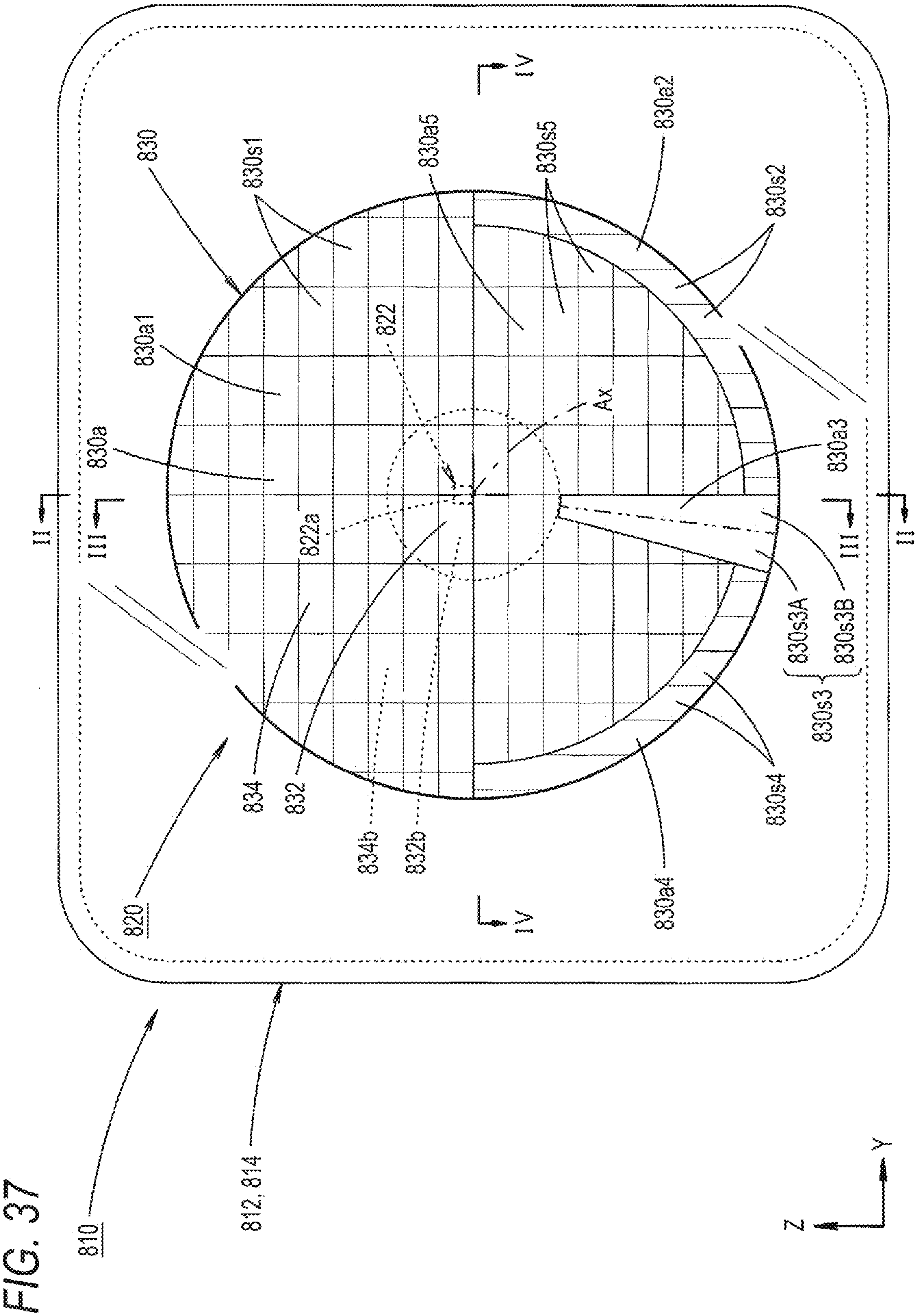
FIG. 37 is a front view showing a vehicle lamp according to a fourth embodiment of the present disclosure.
Figure 38:
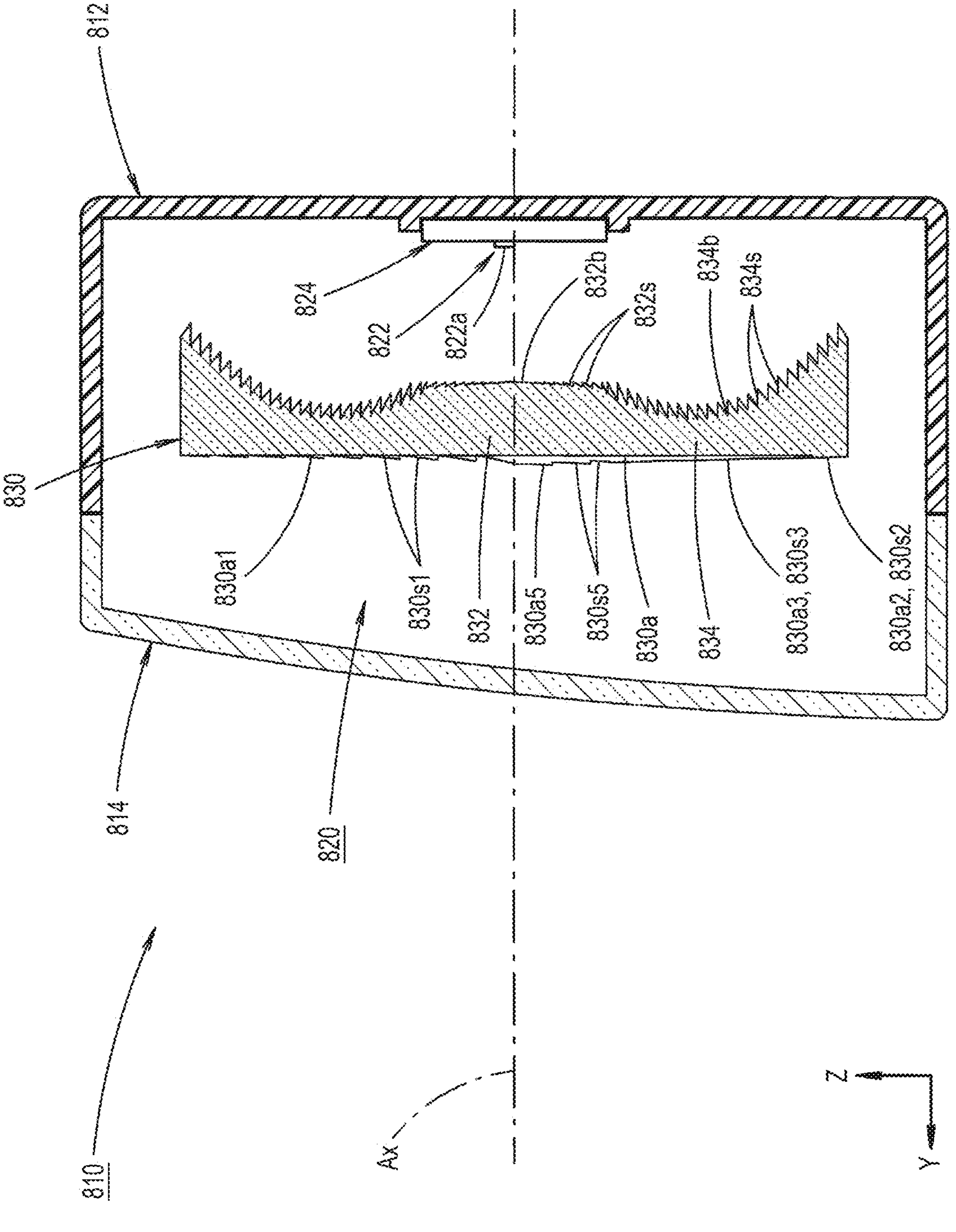
FIG. 38 is a cross-sectional view taken along line II-II of FIG. 37.

FIG. 37 is a front view showing a vehicle lamp 810 according to the fourth embodiment of the present disclosure. FIG. 38 is a cross-sectional view taken along line II-II of FIG. 37.

In FIGS. 37 and 38, a direction indicated by X is "front of the lamp," a direction indicated by Y is a "left direction" (or "right direction" when viewed from the front of the lamp) orthogonal to the "front of the lamp," and a direction indicated by Z is "upper direction." The same applies to the drawings other than FIG. 38.

As shown in FIGS. 37 and 38, a vehicle lamp 810 according to the present embodiment is a headlamp arranged at a front end portion of a vehicle, and includes a lamp unit 820 and 320 incorporated in a lamp chamber formed by a lamp body 812 and a transparent light-transmitting cover 814 attached to a front end opening portion thereof. The vehicle lamp 810 is configured to form a low beam light distribution pattern (which will be described below) by radiated light from the lamp unit 820.

The lamp unit 820 includes a light-emitting element 822 and a lens 830 arranged on a front side of the lamp relative to the light-emitting element, and is configured to radiate light emitted from the light-emitting element 822 toward the front of the lamp through the lens 830.

The light-emitting element 822 is supported on the lamp body 812 via a substrate 824, and the lens 830 is supported on the lamp body 812 via an attachment structure (not shown).

Next, the specific configuration of the lamp unit 820 will be described.

Figure 39:
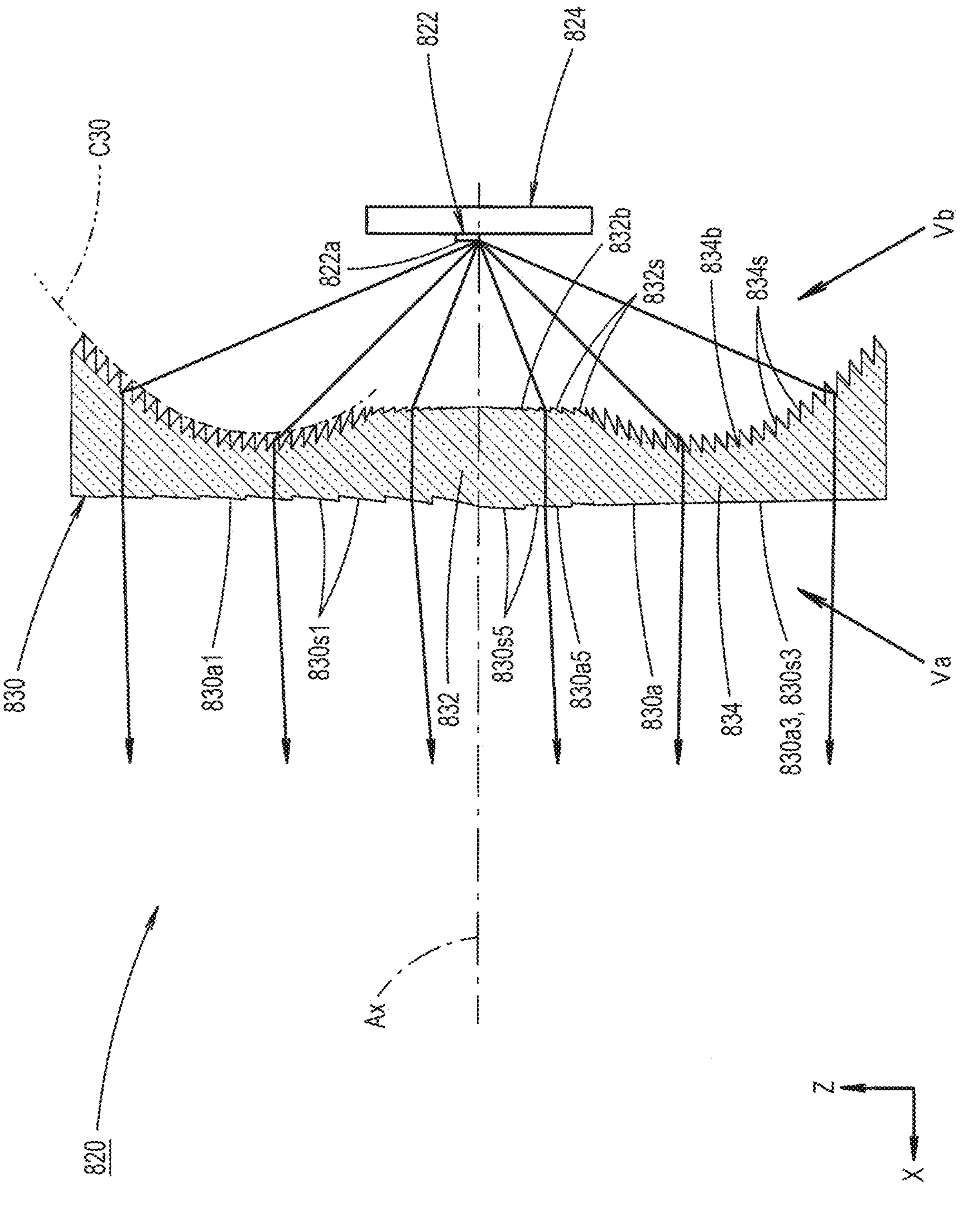
FIG. 39 is a cross-sectional view taken along line III-III of FIG. 37.
Figure 40:
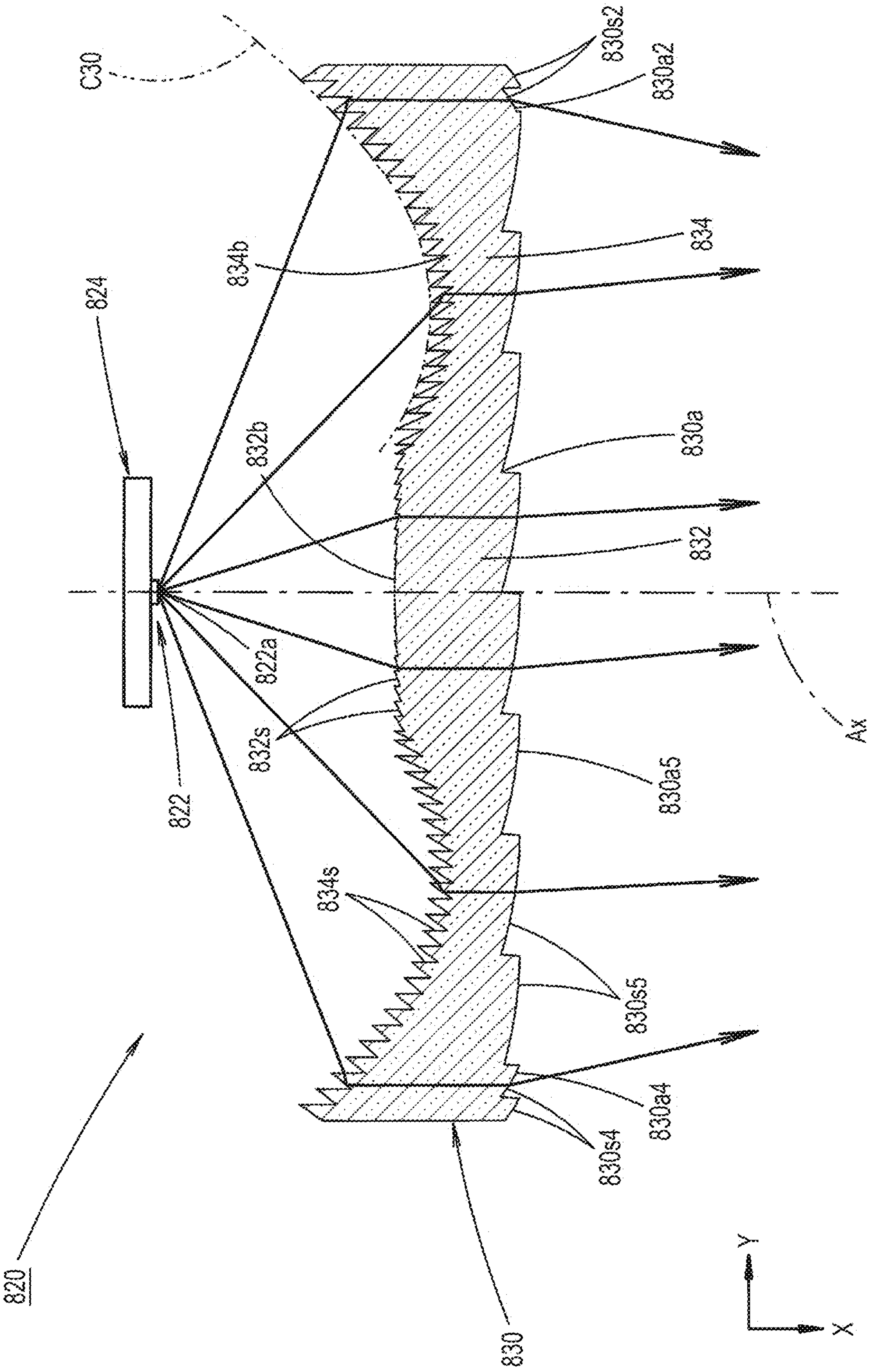
FIG. 40 is a cross-sectional view taken along line IV-IV of FIG. 37.
Figure 41A:
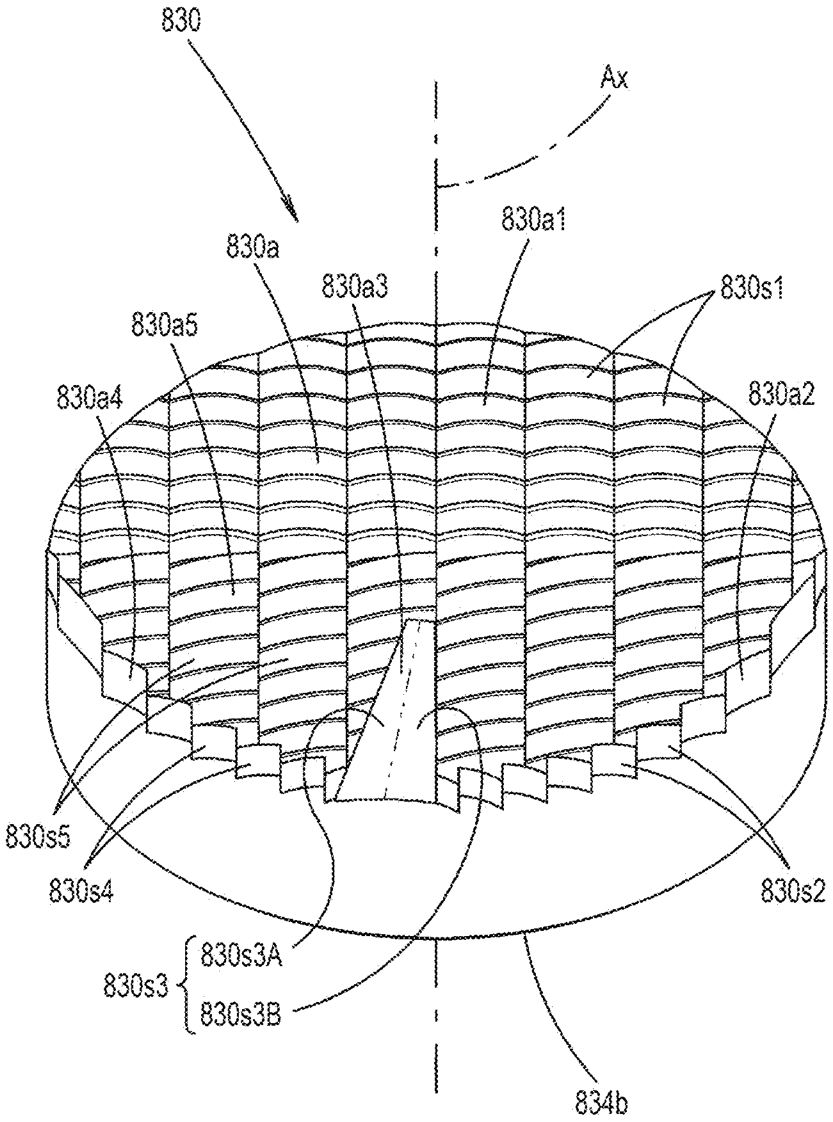
FIG. 41A is a view as viewed in a direction of arrow Va of FIG. 39.
Figure 41B:
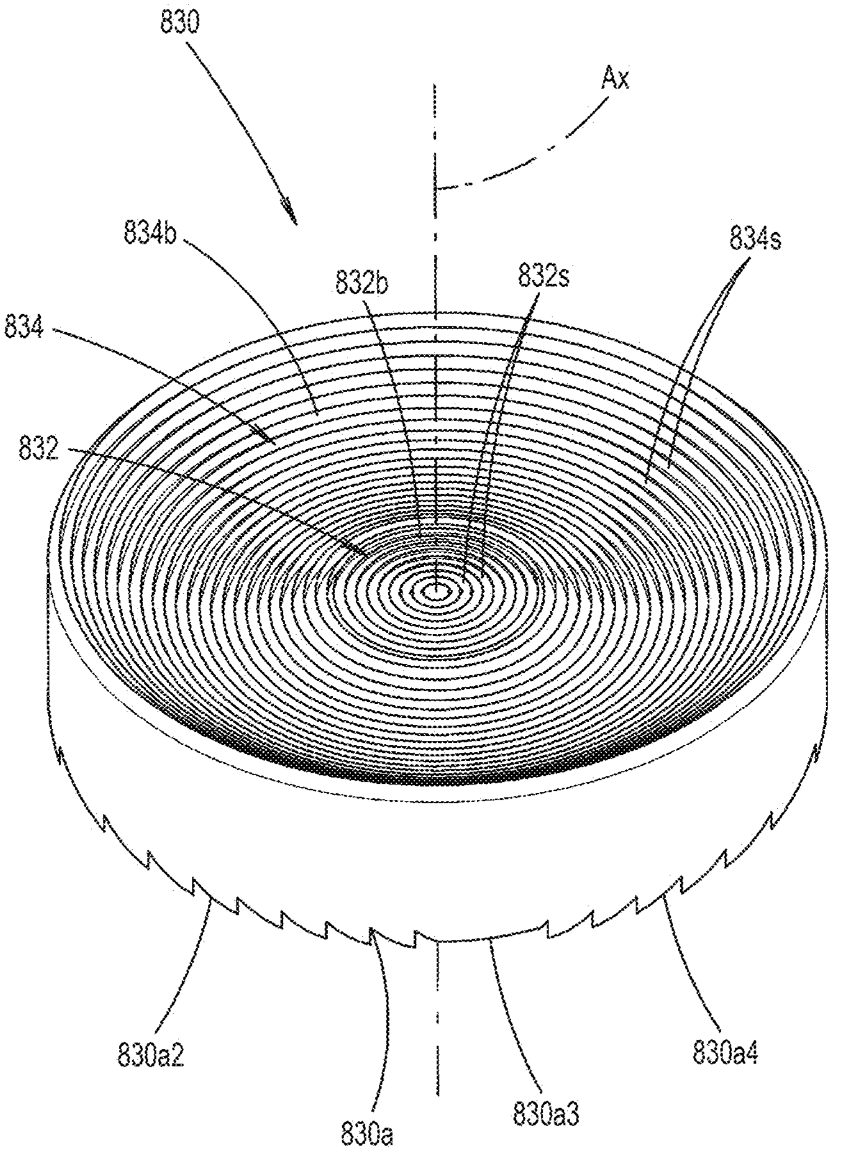
FIG. 41B is a view as viewed in a direction of arrow Vb of FIG. 39.

FIG. 39 is a cross-sectional view taken along line III-III of FIG. 37, and FIG. 40 is a cross-sectional view taken along line IV-IV of FIG. 37. FIG. 41A is a view as viewed in a direction of arrow Va of FIG. 39, and FIG. 41B is a view as viewed in a direction of arrow Vb of FIG. 39

As shown in FIGS. 37 to 41B, the lens 830 has an optical axis Ax extending in the front-rear direction of the lamp, and has a circular outer shape centered on the optical axis Ax when viewed from the front of the lamp. An outer dimension of the lens 830 is set to a value of 50 mm or less (e.g., about 35 mm).

The light-emitting element 822 is a white light-emitting diode, and is arranged with its light-emitting surface 822*a* facing the front of the lamp (specifically, toward the forward-facing direction of the lamp). The light-emitting surface 822*a* of the light-emitting element 822 has a rectangular outer shape (specifically, a square of about 1×1 mm). The light-emitting element 822 is arranged in a state where a center position in the left-right direction at a lower end edge of the light-emitting surface 822*a* (hereinafter, referred to as a "reference position") is positioned on the optical axis Ax of the lens 830.

The lens 830 is an injection-molded product made of transparent resin and has a central region 832 centered on the optical axis Ax and a peripheral region 834 located around the central region 832.

A rear surface 832*b* of the central region 832 is configured as a Fresnel lens in which a plurality of lens elements 832*s* are arranged concentrically around the optical axis Ax, thereby allowing light emitted from the light-emitting element 822 to be incident on the collimator lens 830 while being refracted in a direction close to the optical axis Ax. Specifically, the rear surface 832*b* of the central region 832 is designed to guide light emitted from the reference position of the light-emitting element 822 to the front surface 830*a* of the lens 830 as parallel light directed toward the forward-facing direction of the lamp, in each lens element 832*s*.

A plurality of total reflection prism elements 834*s* are formed on the rear surface 834*b* of the peripheral region 834 in a state of being aligned in a concentric circular form centered on the optical axis Ax. Each of the plurality of total reflection prism elements 834*s* is a Fresnel lens-type total reflection prism and is configured to allow light emitted from the light-emitting element 822 to be incident and then totally reflected toward the front of the lamp. Specifically, each of the plurality of total reflection prism elements 834*s* is designed to allow light emitted from the reference position of the light-emitting element 822 to be incident while being refracted in a direction away from the optical axis Ax and then to be guided to the front surface 830*a* of the lens 830 as parallel light directed toward the forward-facing direction of the lamp.

A boundary position between the central region 832 and the peripheral region 834 is defined by a circle with a radius of 4 to 6 mm (e.g., a radius of about 5 mm) centered on the optical axis Ax.

As shown in FIGS. 39 and 40, the plurality of total reflection prism elements 834*s* formed on the rear surface 834*b* of the peripheral region 834 form an annular concave curved surface C30 (a cross-sectional shape is indicated by a two-dot chain line in the drawing) centered on the optical axis Ax as an envelope surface.

In this case, in the rear surface 834*b* of the peripheral region 834, a pitch of the plurality of total reflection prism elements 834*s* and a curvature of the annular concave curved surface C30 are set such that the light emitted from the light-emitting element 822 is incident approximately equally on each of the plurality of total reflection prism elements 834*s*.

As a result, the plurality of total reflection prism elements 834*s* have a cross-sectional shape in which the total reflection prism elements 834*s* located closer to an outer peripheral edge of the rear surface 834*b* of the peripheral region 834 are larger than the total reflection prism elements 834*s* located closer to an inner peripheral edge.

As shown in FIGS. 37 to 41B, the front surface 830*a* of the lens 830 includes a plurality of lens elements (which will be described below) formed on a vertical plane orthogonal to the optical axis Ax.

The front surface 830*a* of the lens 830 is divided into five emission regions 830*a*1, 830*a*2, 830*a*3, 830*a*4, and 830*a*5.

The emission region 830*a*1 is a semicircular region located in an upper half of the front surface 830*a*, the emission regions 830_a_2 and 830_a_4 are semicircular arc-shaped regions extending in a band shape along an outer peripheral edge of the lower half of the front surface 830_a_, the emission region 830_a_3 is a region having a vertically long outer shape expanding downward in a fan shape in a lower region of the front surface 830_a_, and the emission region 830_a_5 is a remaining region in the lower half of the front surface 830_a_.

The emission region 830_a_1 is divided into a shape of vertical and horizontal grids, each of which is horizontally long (e.g., about 2×4 mm), with a convex curved lens element 830_s_1 assigned to each grid. Each lens element 830_s_1 is configured to emit light from the light-emitting element 822, arriving as parallel light from the rear surfaces 832_b_ and 834_b_ of the lens 830, toward the front of the lamp while deflecting the light downward and then diffusing the deflected light in the left-right direction.

The plurality of lens elements 830_s_1 constituting the emission region 830_a_1 have vertical inclination angles set to different values from each other among the lens elements 830_s_1 constituting vertical rows divided into a shape of vertical and horizontal grids. Specifically, each of the plurality of lens elements 830_s_1 is formed to protrude obliquely downward from its upper end edge toward its lower end edge, and in this case, an inclination angle with respect to a vertical plane orthogonal to the optical axis Ax is set to a larger value for the lens element 830_s_1 located closer to the lower end edge of the emission region 830_a_1. In addition, the curvature in the left-right direction of each of the plurality of lens elements 830_s_1 is set to a larger value for the lens elements 830_s_1 located closer to the lower end edge of the emission region 830_a_1.

The emission regions 830_a_2 and 830_a_4 are divided into a shape of vertical stripes (e.g., with a horizontal width of about 2 mm) with each of convex curve-shaped lens elements 830_s_2 and 830_s_4 assigned to each vertical striped region.

Each of the lens elements 830_s_2 constituting the emission region 830_a_2 located on the left side of the emission region 830_a_3 (on the right side when viewed from the front of the lamp) is configured to emit light from the light-emitting element 822, arriving as parallel light from the rear surface 834_b_ of the lens 830, toward the front of the lamp while slightly deflecting the light downward and then widely diffusing the deflected light in the right direction.

Each of the lens elements 830_s_4 constituting the emission region 830_a_4 located on the right side of the emission region 830_a_3 is configured to emit light from the light-emitting element 822, arriving as parallel light from the rear surface 834_b_ of the lens 830, toward the front of the lamp while slightly deflecting the light upward and then widely diffusing the deflected light in the left direction.

The emission region 830_a_3 has a left side edge (a right edge when viewed from the front of the lamp) configured by a straight line extending in a direction directly downward from the optical axis Ax, and a right side edge configured by a straight line extending in a direction inclined to the right with respect to the direction directly downward from the optical axis Ax (specifically, a direction inclined at an angle of about 15° to the right from the direction directly downward). An upper end edge of the emission region 830_a_3 is configured by an arc centered on the optical axis Ax. The arc is located on a slightly outer periphery side with respect to the boundary position between the central region 832 and the peripheral region 834 of the lens 830. In addition, a lower end edge of the emission region 830_a_3 is configured by an outer peripheral edge of the front surface 830_a_.

The emission area 830_a_3 is configured by a single lens element 830_s_3. The lens element 830_s_3 has a surface shape with a convex free-form curved surface. That is, the surface of the lens element 830_s_3 has a free-form surface whose curvature of the convex curved surface gradually changes from a right half 830_s_3A to a left half 830_s_3B. The lens element 830_s_3 is configured to emit light from the light-emitting element 822, arriving as parallel light from the rear surface 834_b_ of the lens 830, toward the front of the lamp while slightly deflecting the light upward and then gradually changing an emission direction thereof from the right half 830_s_3A to the left half 830_s_3B.

Similarly to the emission region 830_a_1, the emission region 830_a_5 is divided into a shape of vertical stripes with a convex curved lens element 830_s_5 assigned to each striped region. However, each lens element 830_s_5 is configured to emit light from the light-emitting element 822, arriving as parallel light from the rear surfaces 832_b_ and 834_b_ of the lens 830, toward the front of the lamp while slightly deflecting the light downward and then widely diffusing the deflected light in the left direction.

As shown in FIGS. 39 and 40, in the lens 830, the central region 832 has a substantially constant thickness of about 3 to 4 mm, and the peripheral region 834 has a thinner thickness than the central region 832 in a middle portion thereof and a thicker thickness of about 5 to 6 mm in an outer peripheral edge portion.

Figure 42:
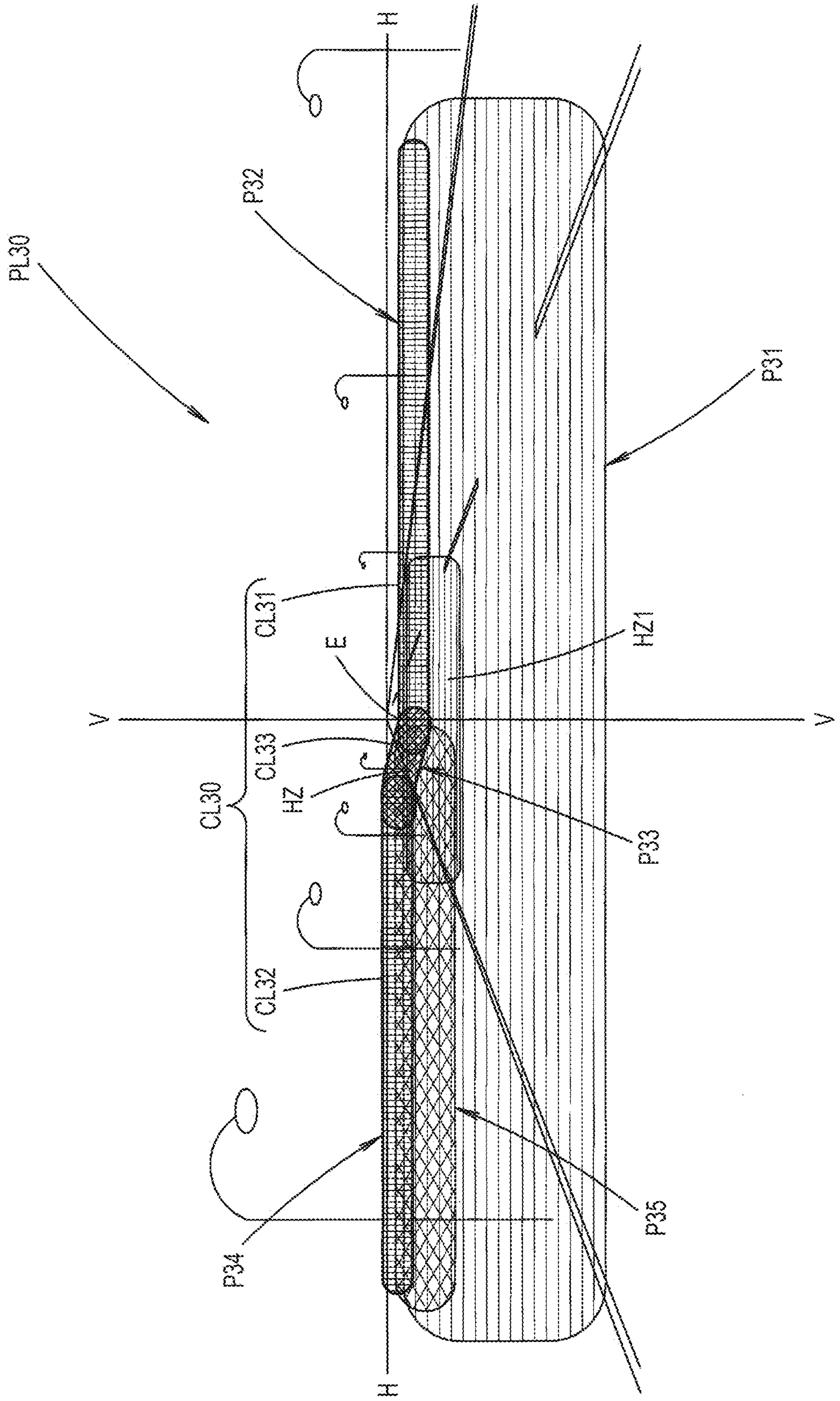
FIG. 42 is a perspective view showing a low beam light distribution pattern formed by radiated light from the vehicle lamp.

FIG. 42 is a perspective view showing a low beam light distribution pattern PL30 formed on a virtual vertical screen placed 25 m ahead of the lamp by radiated light from the vehicle lamp 810.

The low beam light distribution pattern PL30 is a low beam light distribution pattern of left light distribution, and an upper end portion thereof is formed with a stepped cutoff line CL30.

The stepped cutoff line CL30 has a shape in which a lower cutoff line CL31 and an upper cutoff line CL32, offset vertically and extending horizontally, are connected via a slope portion CL33. In this case, the stepped cutoff line CL30 is formed such that the lower cutoff line CL31 is positioned on the opposite lane side with respect to a V-V line, which is a vertical line passing through an H-V vanishing point in the forward-facing direction of the lamp, and the slope portion CL33 and the upper cutoff line CL32 are positioned on the own lane side. The upper cutoff line CL32 is positioned slightly above a line H-H, which is a horizontal line passing through H-V.

In the low beam light distribution pattern PL30, an elbow point E, which is an intersection of the lower cutoff line CL31 and the slope portion CL33, is located about 0.5 to 0.6° below H-V, and the slope portion CL33 extends obliquely in the upper left direction from the elbow point E at an inclination angle of 15° with respect to the horizontal direction. In the low beam light distribution pattern PL30, a high-intensity region HZ is formed near the lower left of the elbow point E.

The low beam light distribution pattern PL30 is formed as a combined light distribution pattern in which five light distribution patterns P31, P32, P33, P34, and P35 are superimposed.

The light distribution pattern P31 is a light distribution pattern formed by light emitted from the light emission region 830_a_1 of the front surface 830_a_ of the lens 830, and is formed as a horizontally long light distribution pattern widely expanding in the left-right direction with a relatively large vertical width below the H-H line. The light distribution pattern P31 is designed to form a wide diffusion area of the low beam light distribution pattern PL30. In this case, the light distribution pattern P31 itself is also designed to form a high-intensity area HZ1 for reinforcing the brightness of the high-intensity area HZ in the vicinity below the elbow point E. The formation process of the light distribution pattern P31 will be described below.

The light distribution pattern P32 is a light distribution pattern formed by light emitted from the emission region 830*a*2 on the front surface 830*a* of the lens 830, and is formed as a horizontally long bright light distribution pattern expanding rightward from the vicinity of the V-V line with a narrow vertical width in the vicinity below the H-H line. The light distribution pattern P32 is designed to form the lower cutoff line CL31 of the low beam light distribution pattern PL30 by its upper end edge.

The formation of such a light distribution pattern P32 is due to the fact that an opening angle of the light-emitting surface 822*a* of the light-emitting element 822 from the outer peripheral edge portion in the outer periphery-side region of the peripheral region 834 becomes small, and therefore, the light distribution pattern formed by the light emitted from the emission region 830*a*2 located on the front side of the lamp is likely to be small and bright.

The light distribution pattern P33 is a light distribution pattern formed by light emitted from the emission region 830*a*3 on the front surface 830*a* of the lens 830, and is formed as a small and bright light distribution pattern extending obliquely upward to the left with a narrow vertical width in the vicinity below the H-V. The light distribution pattern P33 is designed to form the slope portion CL33 and a right end portion of the upper cutoff line CL32 of the low beam light distribution pattern PL30 by its upper end edge. The formation process of the light distribution pattern P33 will be described below.

The light distribution pattern P34 is a light distribution pattern formed by light emitted from the emission region 830*a*4 on the front surface 830*a* of the lens 50, and is formed as a horizontally long bright light distribution pattern expanding leftward from the vicinity of the left of the V-V line with a narrow vertical width substantially along the H-H line. The light distribution pattern P34 is designed to form the upper cutoff line CL32 of the low beam light distribution pattern PL30 by its upper end edge. In this case, the light distribution pattern P34 is formed so that a right end portion thereof smoothly connects to and overlaps the light distribution pattern P33.

As in the light distribution pattern P32, the formation of such a light distribution pattern P34 is due to the fact that an opening angle of the light-emitting surface 822*a* of the light-emitting element 822 from the outer peripheral edge portion in the outer periphery-side region of the peripheral region 834 becomes small, and therefore, the light distribution pattern formed by the light emitted from the emission region 830*a*4 located on the front side of the lamp is likely to be small and bright.

The light distribution pattern P35 is a light distribution pattern formed by light emitted from the emission region 830*a*5 on the front surface 830*a* of the lens 830 and is formed as a horizontally long, relatively bright light distribution pattern expanding leftward from the vicinity of the left side of the V-V line with a relatively narrow vertical width, spanning both the light distribution pattern P34 and the light distribution pattern P31, with its right end portion overlapping the light distribution pattern P33.

Figure 43A:
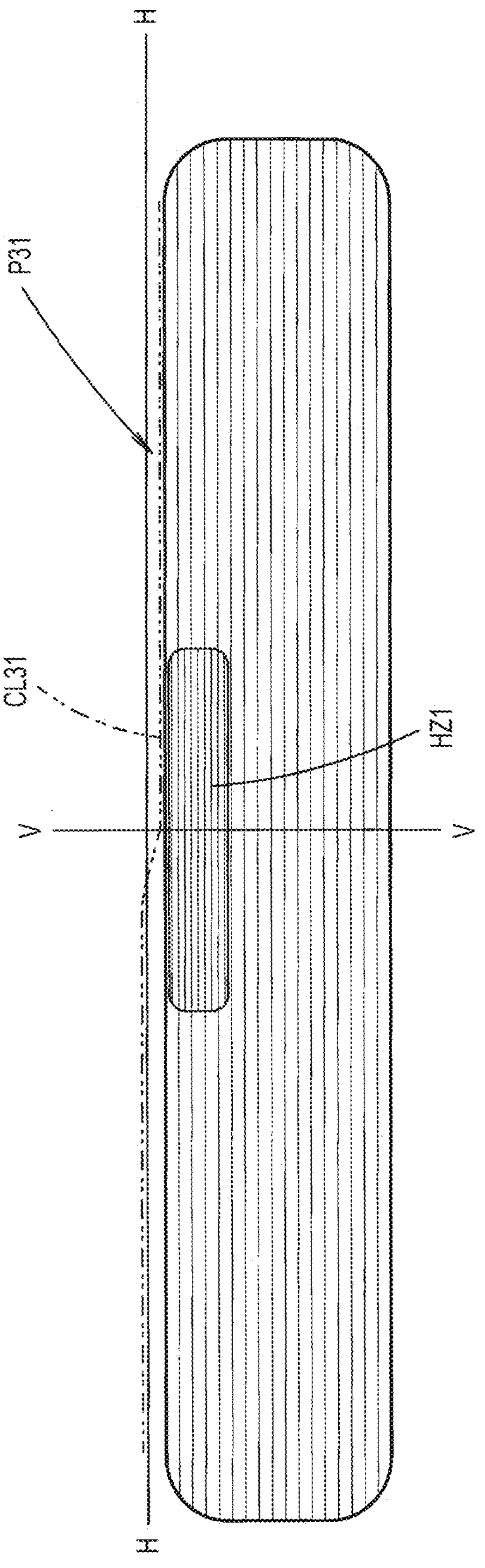
FIG. 43A is a view for illustrating a formation process of part of the low beam light distribution pattern.

FIG. 43A is a view showing only the light distribution pattern P31 extracted from the low beam light distribution pattern PL30.

As shown in FIG. 43A, the light distribution pattern P31 is formed as a horizontally long light distribution pattern widely expanding in the left-right direction centered on the V-V line with a relatively large vertical width, and a position of its upper end edge substantially coincides with the lower cutoff line CL31. An upper end portion of the light distribution pattern P31 is formed with a horizontally long high-intensity area HZ1 centered on the V-V line, and a position of its upper end edge substantially coincides with the lower cutoff line CL31.

Figure 43B:
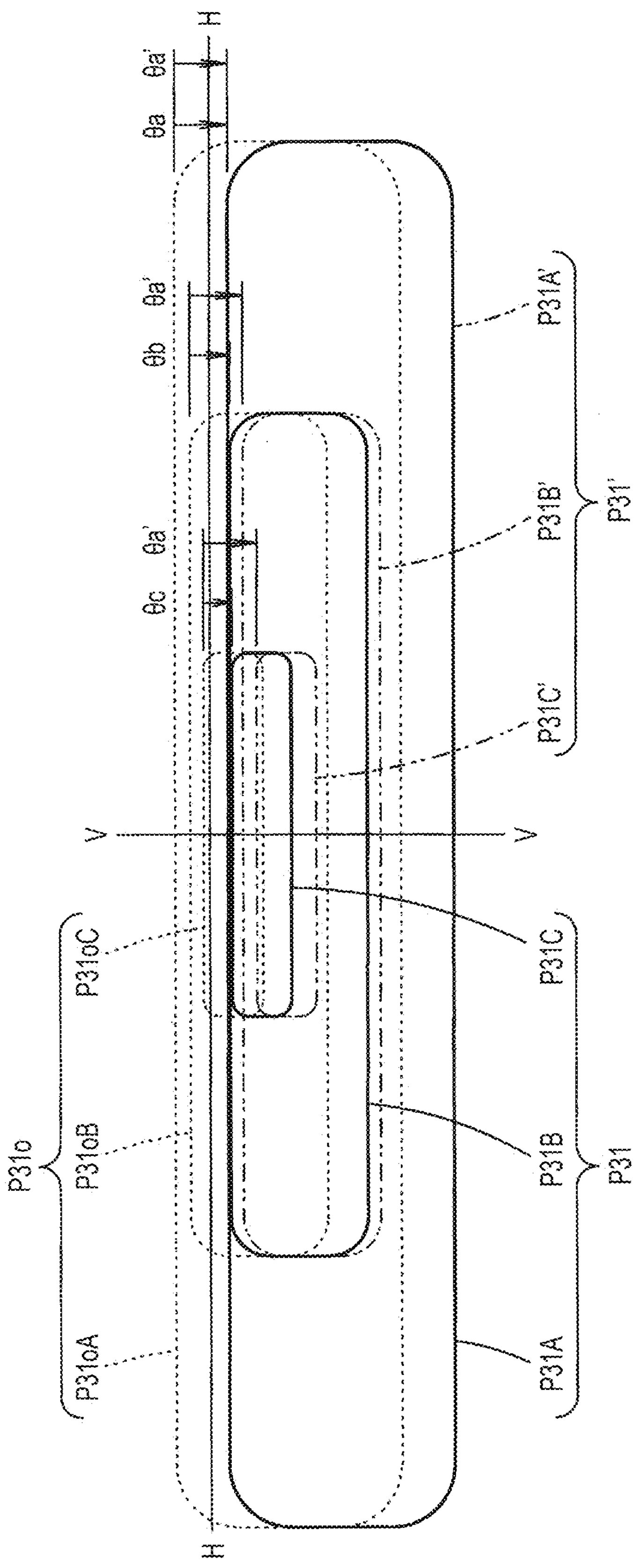
FIG. 43B is a view for illustrating the formation process of part of the low beam light distribution pattern.

FIG. 43B is a view for illustrating a formation process of the light distribution pattern P31.

In FIG. 43B, the light distribution pattern P31 is shown as a combined light distribution pattern of three light distribution patterns P31A, P31B, and P31C of different sizes.

Among the three light distribution patterns P31A to P31C, the largest light distribution pattern P31A is a light distribution pattern formed by light emitted from the plurality of lens elements 830*s*1 located in a lower region of the emission region 830*a*1, the smallest light distribution pattern P31C is a light distribution pattern formed by light emitted from the plurality of lens elements 830*s*1 located in an upper region of the emission region 830*a*1, and the middle-sized light distribution pattern P31B is a light distribution pattern formed by light emitted from the plurality of lens elements 830*s*1 located in an middle region in the vertical direction of the emission region 830*a*1.

The three light distribution patterns P31A to P31C have their upper end edges substantially aligned. This is because, as a configuration of each of the plurality of lens elements 830*s*1, the inclination angle with respect to the vertical plane orthogonal to the optical axis Ax is set to a larger value for the lens element 830*s*1 located closer to the lower end edge of the emission region 830*a*1.

It is noted that a size of a left-right diffusion angle of each of the three light distribution patterns P31A to P31C is set by the size of the curvature in the left-right direction of each of the plurality of lens elements 830*s*1.

On the other hand, a light distribution pattern P310 indicated by a broken line in FIG. 43B is a light distribution pattern formed when the plurality of lens elements 830*s*1 constituting the emission region 830*a*1 are configured to emit light from the light-emitting elements 822, arriving as parallel light from the rear surfaces 832*b* and 834*b* of the lens 830, without being deflected downward.

It is noted that, in FIG. 43B, the light distribution pattern P310 is shown as a combined light distribution pattern of three light distribution patterns P31*o*A, P31*o*B, and P31*o*C of different sizes, corresponding to the light distribution pattern P31.

The three light distribution patterns P31*o*A to P31*o*C are formed in multiple layers so as to cross the H-H line in the vertical direction at their upper end portions, and furthermore, the positions of the upper end edges are displaced downward in the order of light distribution patterns P31*o*A, P31*o*B, and P31*o*C.

In addition, a light distribution pattern P31' indicated by the two-dot chain line in FIG. 43B is a light distribution pattern formed when, as a configuration of each of the plurality of lens elements 830*s*1, the inclination angle with respect to the vertical plane orthogonal to the optical axis Ax is unified to the inclination angle of the lens element 830*s* 1 located at the lower end edge of the emission region 830*a*1.

It is noted that, in FIG. 43B, the light distribution pattern P31' is also shown as a combined light distribution pattern of three light distribution patterns P31A', P31B', and P31C' of different sizes, corresponding to the light distribution pattern P31.

The three light distribution patterns P31A' to P31C' are formed by parallelly translating the three light distribution patterns P31*o*A to P31*o*C downward in parallel by the same angle θa'.

In contrast, the three light distribution patterns P31A to P31C are such that the light distribution pattern P31A is formed by parallelly translating the light distribution pattern P31*o*A downward by an angle θa (θa=θa'), the light distribution pattern P31B is formed by parallelly translating the light distribution pattern P31*o*B downward by an angle θb (θb<θa), and the light distribution pattern P31C is formed by parallelly translating the light distribution pattern P31*o*C downward by an angle θc (θc<θb).

For this reason, the light distribution pattern P31 is designed such that the positions of the upper end edges of the three light distribution patterns P31A to P31C are substantially aligned. With this, as shown in FIG. 43A, the light distribution pattern P31 is formed with a horizontally long high-intensity area HZ1 at its upper end portion.

Figure 44:
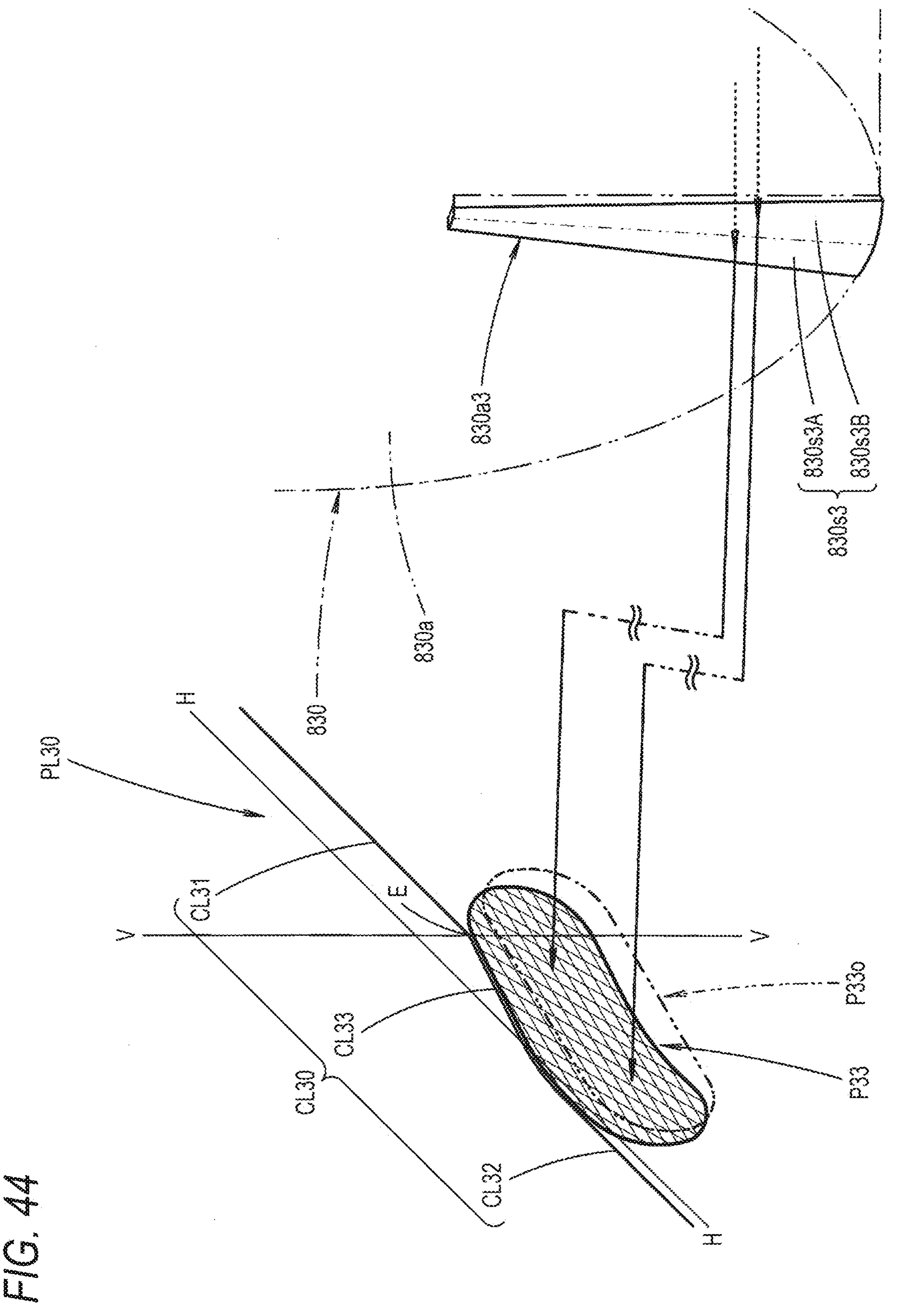
FIG. 44 is a view for illustrating a formation process of another part of the low beam light distribution pattern.

FIG. 44 is a view for illustrating the formation process of the light distribution pattern P33, and shows a part of the front surface 830*a* of the lens 830 and a part of the first light distribution pattern PL30 in perspective view, respectively.

As shown in FIG. 44, the light distribution pattern P33 formed by the light emitted from the lens element 830*s*3 constituting the emission region 830*a*3 on the front surface 830*a* of the lens 830 is formed so that its upper end edge extends from the slope portion CL33 to the right end portion of the upper cutoff line CL32 of the low beam light distribution pattern PL30, as described above.

On the other hand, a light distribution pattern P330 indicated by a two-dot chain line in FIG. 44 is a light distribution pattern formed if the lens element 830*s*3 is not present in the emission region 830*a*3, and is formed to extend obliquely upward to the left in the vicinity below the slope portion CL33. The light distribution pattern P330 is formed with an upper end edge as a clear light-dark boundary line. This is because the light-emitting element 822 is arranged with the lower end edge of the light-emitting surface 822*a* positioned on the optical axis Ax of the lens 830.

Since the lens element 830*s*3 is formed in the emission region 830*a*3, the light distribution pattern P330 changes like the light distribution pattern P33. This is because the lens element 830*s*3 forms the free-form curved surface whose curvature of the convex curved surface gradually changes from the right half 830*s*3A to the left half 830*s*3B, thereby slightly deflecting upward the parallel light arriving at the front surface 830*a* of the lens 830 and then gradually changing the emission direction from the right half 830*s*3A to the left half 830*s*3B.

In addition, since the emission region 830*a*3 is configured by the single lens element 830*s*3 and has no steps on its surface, a light pool that causes glare is not unintentionally formed in a space above the slope portion CL33 as part of the light distribution pattern P33.

Next, the operations of the present embodiment will be described.

The vehicle lamp 810 according to the present embodiment is configured to form the low beam light distribution pattern PL30 having the stepped cutoff line CL30 by radiating light emitted from the light-emitting element 822 (light sources) of the lamp unit 820 toward the front of the lamp through the lens 830. However, on the rear surface 834*b* of the peripheral region 834 located around the central region 832 centered on the optical axis Ax extending in the front-rear direction of the lamp in the lens 830, the plurality of total reflection prism elements 834*s*, which allow light emitted from the light-emitting elements 822 to be incident and then totally reflected toward the front of the lamp, are formed in a state of being aligned in a concentric circular form centered on the optical axis Ax. Therefore, the light emitted from the light-emitting element 822 can be used as forward-radiated light over a wide area.

In addition, the lens 830 is configured such that its front surface 830*a* is divided into five emission regions 830*a*1, 830*a*2, 830*a*3, 830*a*4, 830*a*5, and the respective emission regions are formed with the plurality of lens elements 830*s*1, 830*s*2, 830*s*3, 830*s*4, 830*s*5 to control the emission of light from the light-emitting elements 822, arriving as parallel light from the rear surfaces 832*b* and 834*b* of the lens 830, resulting in an enhanced degree of freedom of light distribution control.

In this case, since the plurality of lens elements 830*s*1 constituting the emission region 830*a*1 located in the upper half of the front surface 830*a* are formed in a state of being divided into a shape of vertical and horizontal grids, it becomes possible to easily form the light distribution pattern P31 with an arbitrary light distribution by appropriately adjusting the directions of the plurality of lens elements 830*s*1. Specifically, since the plurality of lens elements 830*s*1 have the inclination angles with respect to the vertical plane orthogonal to the optical axis Ax set to a larger value for the lens element located closer to the lower end edge of the emission region 830*a*1, the positions of the upper end edges of the plurality of light distribution patterns (see three light distribution patterns P31A, P31B, and P31C shown in FIG. 43B) formed by light emitted from the plurality of lens elements 830*s*1 can be aligned. Accordingly, the upper end edge of the light distribution pattern P31 formed as a combined light distribution pattern of the plurality of light distribution patterns can be set to follow the lower cutoff line CL31 of the low beam light distribution pattern PL30.

According to the present embodiment, in the vehicle lamp 810 configured to radiate light from the light-emitting element 822 toward the front of the lamp through the lens 830, the low beam light distribution pattern PL30 having the clear stepped cutoff line CL30 can be formed.

In this case, in the present embodiment, since the light source of the lamp unit 820 includes the light-emitting element 822 arranged with the light-emitting surface 822*a* facing toward the front of the lamp, it becomes possible to easily form the low beam light distribution pattern PL30 having the stepped cutoff line CL30 by radiated light from the vehicle lamp 810.

Furthermore, in the present embodiment, since the plurality of total reflection prism elements 834*s* form the annular concave curved surface C30 centered on the optical axis Ax as an envelope surface, a sufficient amount of light can be obtained even for light emitted from the light-emitting element 822 toward the outer peripheral edge portion of the lens 830.

In the above embodiment, the plurality of lens elements 830*s*1 constituting the entire area of the emission region 830*a*1 have been described as having the inclination angles with respect to the vertical plane orthogonal to the optical axis Ax set to a larger value for the lens element located closer to the lower end edge of the emission region 830*a*1. A configuration can also be adopted in which such a setting is made for the plurality of lens elements 830*s*1 constituting a part of the emission region 830*a*1 (for example, the central region in the left-right direction of the or upper region). In addition, for the emission region 830$a$5, a configuration can also be adopted in which the plurality of lens elements 830$s$5 have vertical inclination angles set to different values from each other among the lens elements 830$s$5 constituting vertical rows divided into a shape of vertical and horizontal grids.

In the above embodiment, the light-emitting surface 822$a$ of the light-emitting element 822 has been described as having an outer shape of about 1×1 mm. A light-emitting surface with other shapes can also be used.

In the above embodiment, the rear surface 832$b$ of the central region 832 of the lens 830 of the lamp unit 820 has been described as being formed in a Fresnel lens shape. Other configurations (e.g., a configuration formed with a single convex lens surface) can also be adopted.

In the above embodiment, the lens 830 of the lamp unit 820 has been described as having a circular outer shape when viewed from the front of the lamp. A configuration having other outer shapes can also be adopted.

In the above embodiment, the lens 830 has been described as being configured as an injection-molded product. Other configurations (e.g., those configured as compression-molded products) can also be adopted.

In the above embodiment, the low beam light distribution pattern PL30 for left light distribution having the stepped cutoff line CL30 has been described as being formed by radiated light from the vehicle lamp 810. A configuration that forms other light distribution patterns can also be adopted.

Next, modified examples of the above embodiment will be described.

First, a first modified example of the above embodiment will be described.

Figure 45:
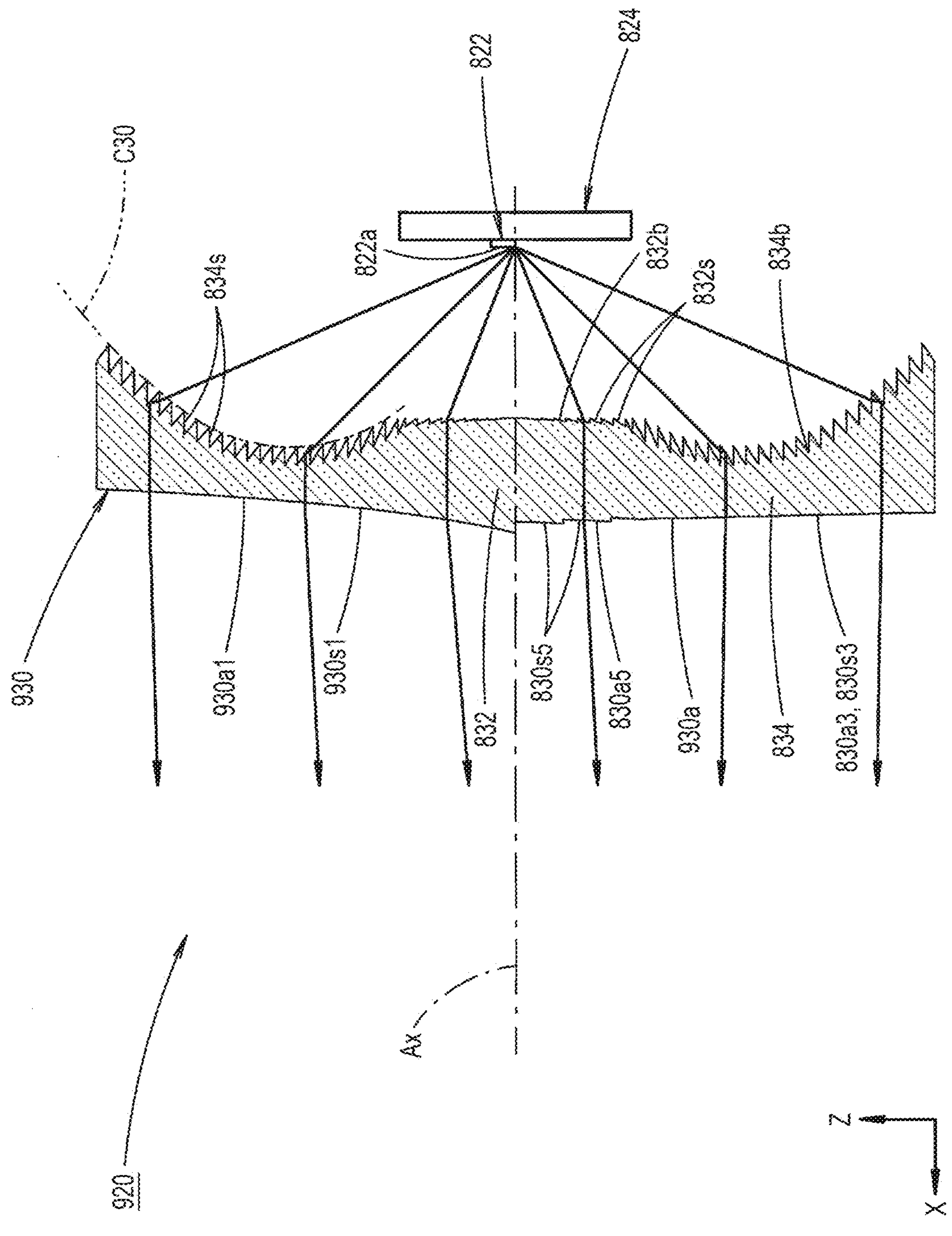
FIG. 45 is a view similar to FIG. 39, showing a first modified example of the fourth embodiment.
Figure 46A:
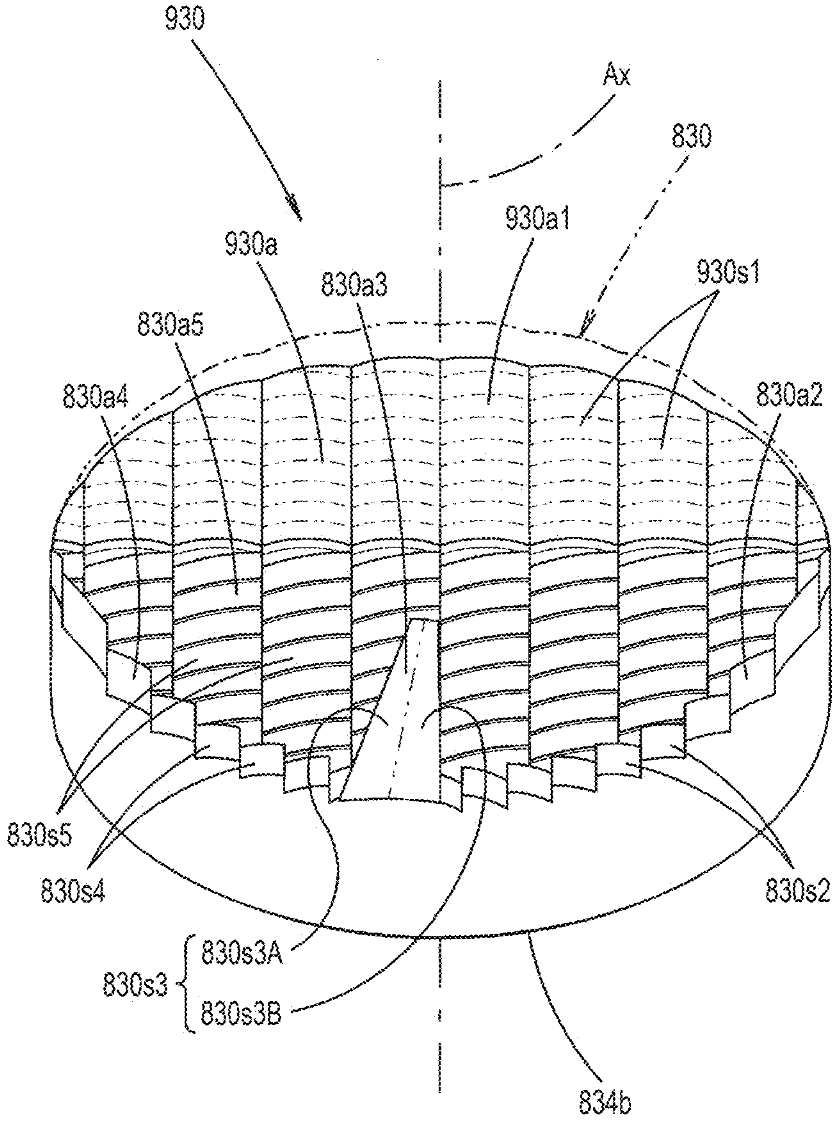
FIG. 46A is a view similar to FIG. 41A, showing the first modified example.
Figure 46B:
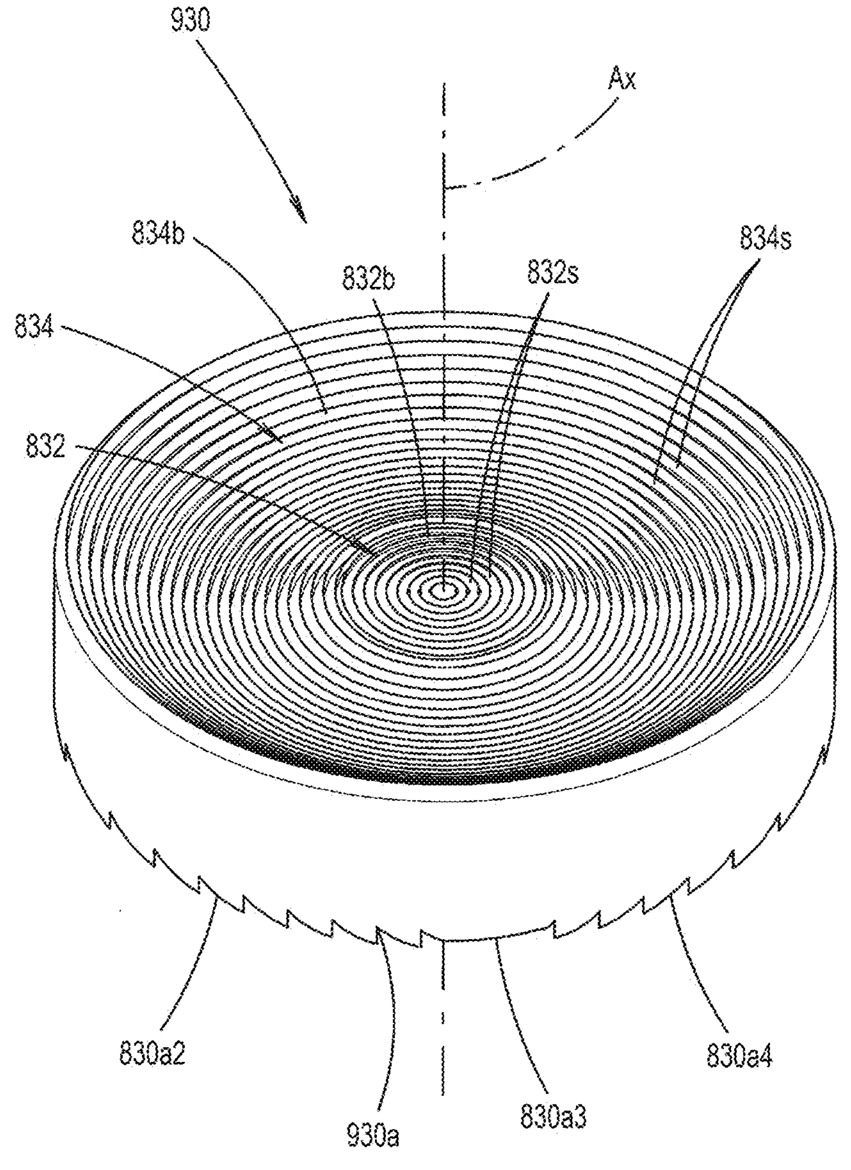
FIG. 46B is a view similar to FIG. 41B, showing the first modified example.

FIG. 45 is a view similar to FIG. 39, showing a lamp unit 920 of the vehicle lamp according to the present modified example. FIG. 46A is a view similar to FIG. 41A, showing a lens 930 of the lamp unit 920. FIG. 46B is a view similar to FIG. 41B, showing the lens 930 of the lamp unit 920.

As shown in FIGS. 45, 46A, and 46B, the basic configuration of the lamp unit 920 of the present modified example is similar to that of the above embodiment, and the configuration of a front surface 930$a$ of the lens 930 is partially different from that of the above embodiment.

Specifically, the lens 930 of the present modified example is configured such that each of a plurality of lens elements 930$s$1 constituting an emission region 930$a$1 of the front surface 930$a$ is formed to extend vertically in a cylindrical lens shape.

That is, in the present modified example, the plurality of lens elements 830$s$1 constituting each vertical row divided in a shape of vertical and horizontal grids in the emission region 830$a$1 of the front surface 830$a$ of the lens 830 of the above embodiment are formed continuously with each other to form one lens element 930$s$1.

In this case, each of the plurality of lens elements 930$s$1 is formed with the same width in the left-right direction as each of the plurality of lens elements 830$s$1 of the above embodiment, and the vertical inclination angle thereof is set to a different value depending on the vertical portion of the lens element 930$s$1.

Specifically, each of the plurality of lens elements 930$s$1 is formed to extend at an incline toward the front side of the lamp from its upper end edge toward its lower end edge, and in this case, the inclination angle with respect to the vertical plane orthogonal to the optical axis Ax is set to a larger value for a portion of the lens element 930$s$1 located closer to the lower end edge of the emission region 930$a$1. In addition, the curvature in the left-right direction of each of the plurality of lens elements 930$s$1 is set to a larger value for a portion of the lens element 930$s$1 located closer to the lower end edge of the emission region 930$a$1.

Also in the present modified example, a light distribution pattern (i.e., light distribution pattern P31 shown in FIG. 43A) similar to that of the above embodiment is formed by light emitted from the emission region 930$a$1 on the front surface 930$a$ of the lens 930.

It is noted that the configurations of the other emission regions 830$a$2 to 830$a$5 on the front surface 930$a$ of the lens 930 of the present modified example are similar to those of the above embodiment, and the configurations of the rear surfaces 832$b$ and 834$b$ are also similar to those of the above embodiment.

Even when the configuration of the present modified example is adopted, the effects substantially similar to those of the above embodiment can be obtained.

In addition, by adopting the configuration of the present modified example, unlike the lens 830 of the above embodiment, no steps are formed between the plurality of lens elements 830$s$1 constituting the vertical row in the emission region 830$a$1. Therefore, it is possible to prevent unintentional upward scattered light from being radiated from the stepped portions. Therefore, the stepped cutoff line CL30 of the low beam light distribution pattern PL30 can be made clearer.

In addition, by adopting the configuration of the present modified example, the front surface 930$a$ of the lens 930 can be made a simpler design compared to the above embodiment, thereby enhancing the appearance of the lens 930.

It is noted that when the configuration is adopted in which each of the plurality of lens elements 930$s$1 extends vertically in a cylindrical lens shape, as in the present modified example, the emission region 930$a$1 bas a surface shape inclined toward the rear as shown in FIG. 45. On the rear surface 834$b$ of the peripheral region 834 of the lens 930, the plurality of total reflection prism elements 834$s$ form the annular concave curved surface C30 centered on the optical axis Ax as an envelope surface, preventing the thickness of the lens 930 from becoming excessively thin at its upper end portion.

In the first modified example, the plurality of lens elements 930$s$1 constituting the entire area of the emission region 930$a$1 have been described as having the inclination angles with respect to the vertical plane orthogonal to the optical axis Ax set to a larger value for a portion of the lens element located closer to the lower end edge of the emission region 930$a$1. A configuration can also be adopted in which such a setting is made for the plurality of lens elements 930$s$1 constituting a part of the emission region 930$a$1 (for example, the central region in the left-right direction). In addition, for the emission region 830$a$5, a configuration can also be adopted in which the plurality of lens elements 830$s$5 constituting vertical rows divided into a shape of vertical and horizontal grids are continuously formed.

Next, a second modified example of the above embodiment will be described.

Figure 47A:
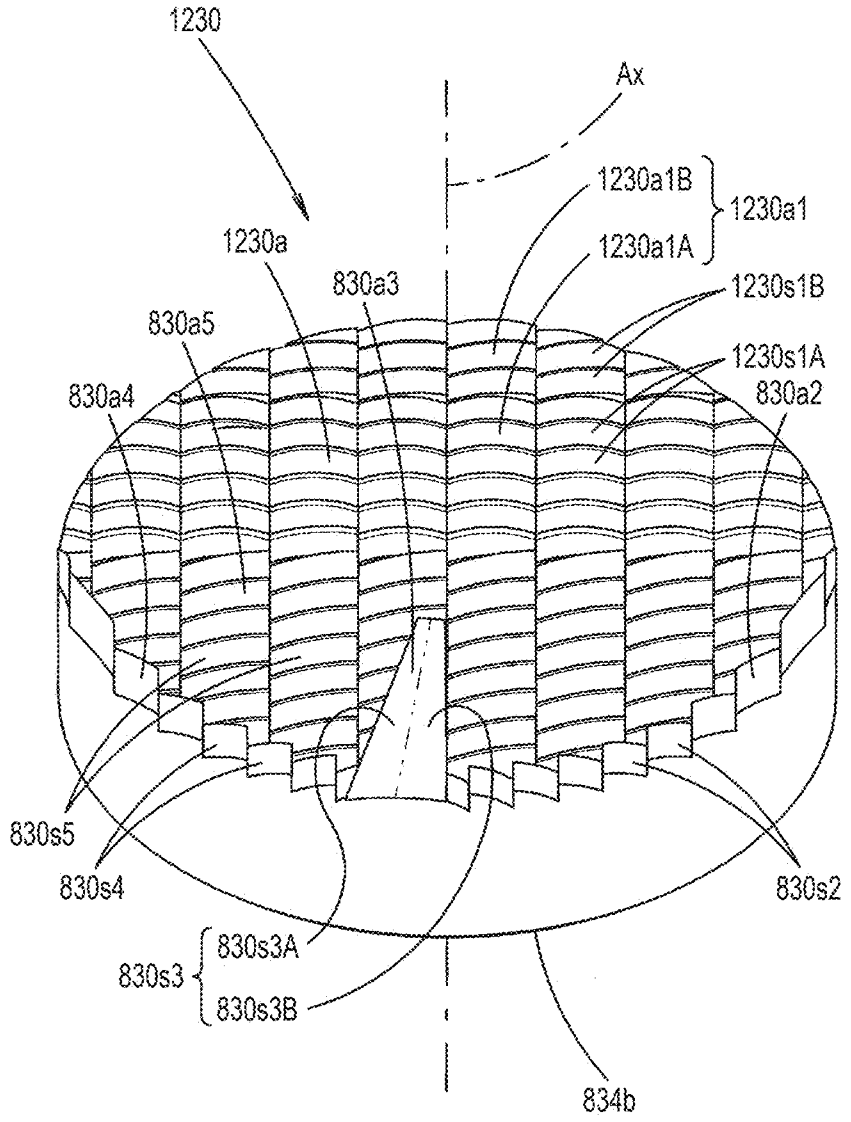
FIG. 47A is a view similar to FIG. 41A, showing a second modified example of the fourth embodiment.
Figure 47B:
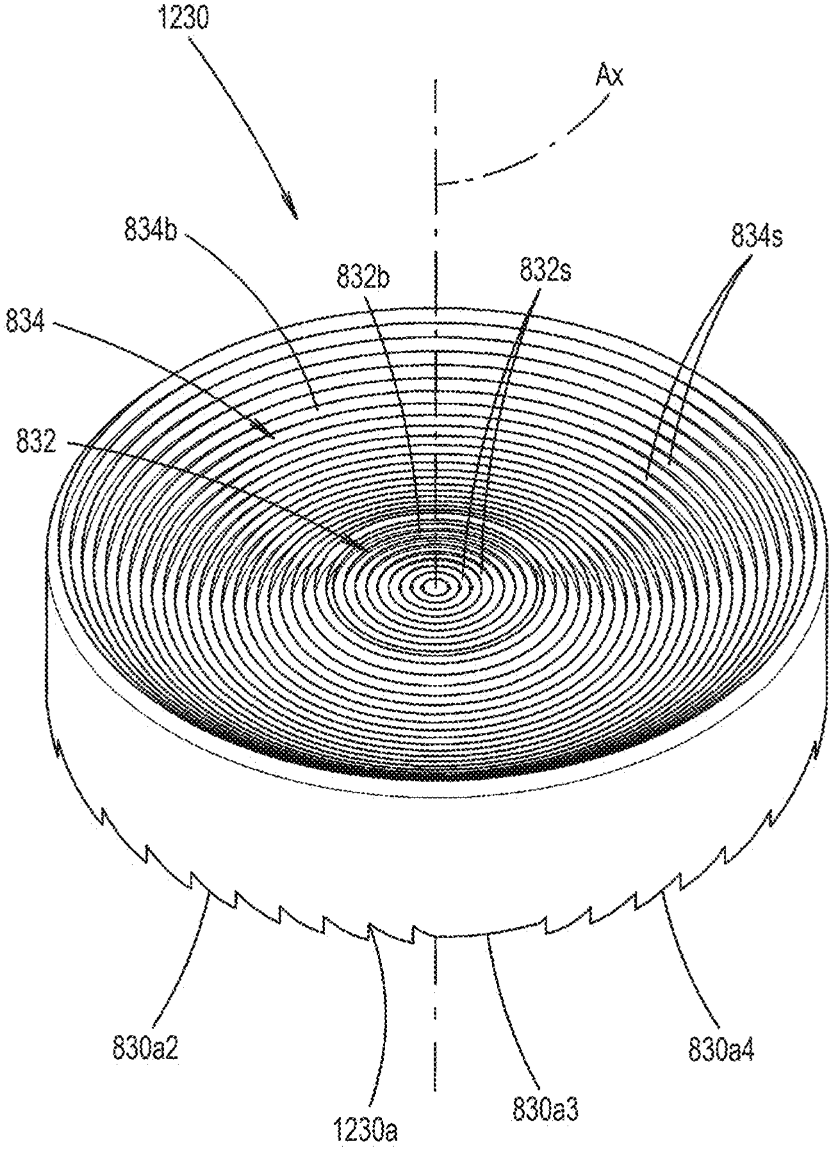
FIG. 47B is a view similar to FIG. 41B, showing the second modified example of the fourth embodiment.

FIG. 47A is a view similar to FIG. 41A, showing a lens 1230 in a lamp unit of a vehicle lamp according to the present modified example. FIG. 47B is a view similar to FIG. 41B, showing the lens 1230 in the lamp unit of the vehicle lamp according to the present modified example.

As shown in FIGS. 47A and 47B, the basic configuration of the lens 1230 of the present modified example is similar to that of the above embodiment, and the configuration of an emission region 1230*a*1 on a front surface 1230*a* is partially different from that of the above embodiment.

That is, the emission region 1230*a*1 on the front surface 1230*a* of the lens 1230 of the present modified example is different from that of the above embodiment, in terms of a configuration of a plurality of lens elements 1230*s*1B constituting an upper region 1230*a*1B.

Specifically, each of the plurality of lens elements 1230*s*1B is configured to emit light from the light-emitting element 822, arriving as parallel light from the rear surfaces 832*b* and 834*b* of the lens 1230, toward the front of the lamp while slightly deflecting the light downward and then more widely diffusing the deflected light in the left direction than in the right direction.

It is noted that the configuration of the plurality of lens elements 1230*s*1A constituting the general area 1230*a*1A other than the upper region 1230*a*1B in the emission region 1230*a*1 is similar to that of the above embodiment.

Figure 48:
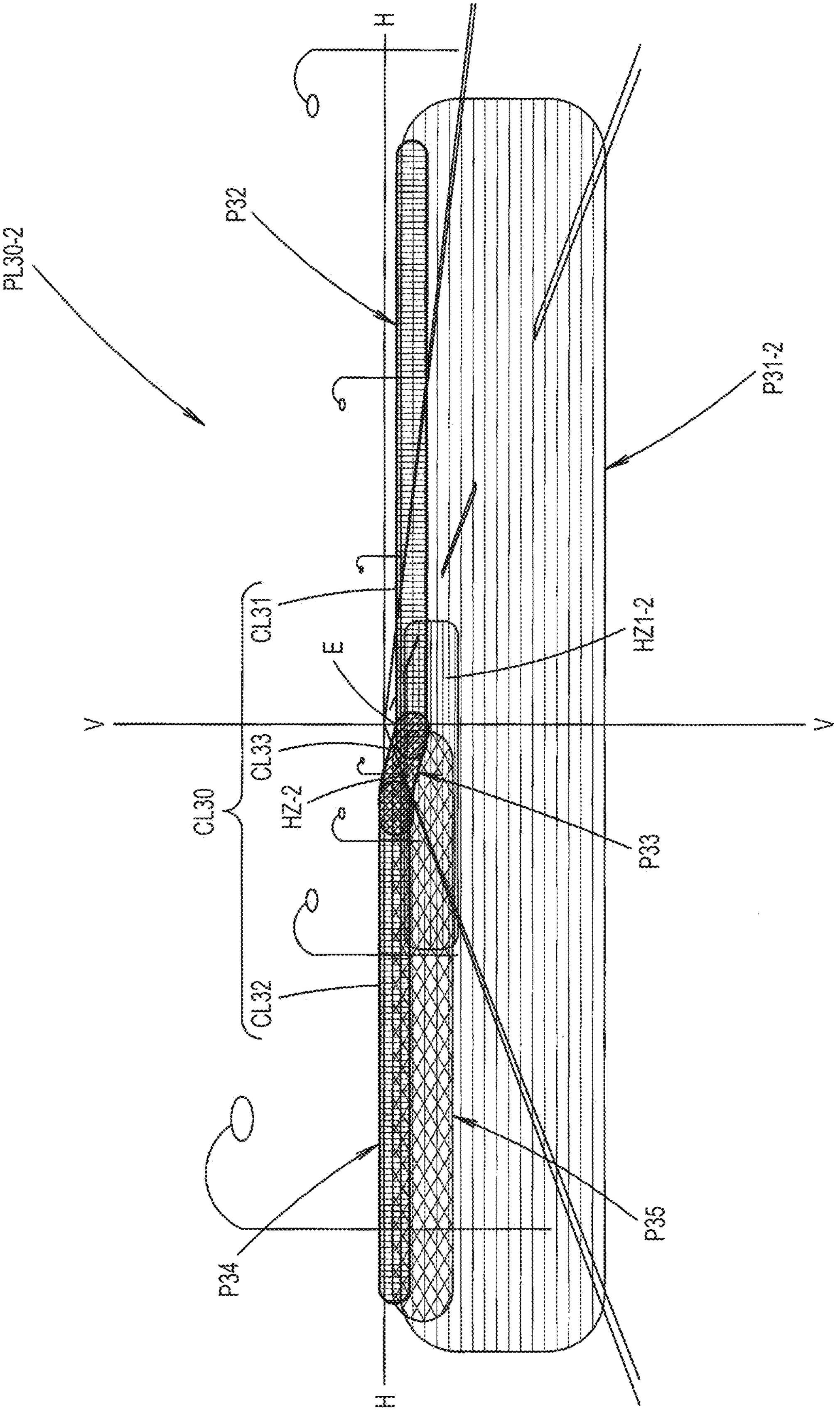
FIG. 48 is a view similar to FIG. 42, showing an operation of the second modified example.

FIG. 48 is a perspective view showing a low beam light distribution pattern PL30-2 formed on the virtual vertical screen by radiated light from the vehicle lamp according to the present modified example.

The low beam light distribution pattern PL30-2 is also formed as a combined light distribution pattern in which five light distribution patterns P31-2, P32, P33, P34, and P35 are superimposed, as with the low beam light distribution pattern PL30 of the above embodiment. The formation position of the high-intensity area HZ1-2 in the light distribution pattern P31-2 is displaced further to the left than the high-intensity area HZ1 in the light distribution pattern P31 of the above embodiment. This is because the plurality of lens elements 1230*s*1B constituting the upper region 1230*a*1B of the emission region 1230*a*1 are configured to emit light from the light-emitting element 822 toward the front of the lamp while more widely diffusing the light in the left direction than in the right direction.

Even when the configuration of the present modified example is adopted, the effects substantially similar to those of the above embodiment can be obtained.

In addition, by adopting the configuration of the present modified example, the high-intensity area HZ-2 in the low beam light distribution pattern PL30-2 can be formed closer to the shoulder on the own lane side than in the above embodiment, thereby achieving a light distribution more suitable for vehicle traveling.

It is noted that the numerical values shown as specifications in the above embodiment and the modified example are only examples and may be set to other values as appropriate.

In addition, the present disclosure is not limited to the configurations described in the above embodiment and the modified example thereof, and configurations with various other modifications can also be adopted.

The present application is based on Japanese Patent Application No. 2022-093903, filed on Jun. 9, 2022, Japanese Patent Application No. 2022-093904, filed on Jun. 9, 2022, Japanese Patent Application No. 2022-093905, filed on Jun. 9, 2022, and Japanese Patent Application No. 2022-093906, filed on Jun. 9, 2022, the contents of which are incorporated herein by reference.

The invention claimed is:

1. A vehicle lamp comprising:

a light source; and a lens, wherein the vehicle lamp is configured to radiate the light emitted from the light source toward a front of the vehicle lamp through the lens, the lens includes a central region centered on an optical axis extending in a front-rear direction of the vehicle lamp and a peripheral region located around the central region, a plurality of total reflection prism elements configured to allow light emitted from the light source to be incident and then totally reflected toward the front of the vehicle lamp are formed on a rear surface of the peripheral region in a state of being aligned in a concentric circular form centered on the optical axis, the rear surface of the peripheral region is divided into an inner periphery-side region and an outer periphery-side region, the plurality of total reflection prism elements form a first annular concave curved surface centered on the optical axis as an envelope surface in the inner periphery-side region and form a second annular concave curved surface centered on the optical axis as an envelope surface in the outer periphery-side region, a plurality of lens elements configured to control emission of light arriving from the plurality of total reflection prism elements are formed on a front surface of the lens, and the plurality of lens elements are configured such that a horizontal cross-sectional shape including the optical axis forms a convex curve centered on the optical axis as an envelope line.

2. A vehicle lamp comprising:

a light source; and a lens, wherein the vehicle lamp is configured to radiate the light emitted from the light source toward a front of the vehicle lamp through the lens, the lens includes a central region centered on an optical axis extending in a front-rear direction of the vehicle lamp and a peripheral region located around the central region, a plurality of total reflection prism elements configured to allow light emitted from the light source to be incident and then totally reflected toward the front of the vehicle lamp are formed on a rear surface of the peripheral region in a state of being aligned in a concentric circular form centered on the optical axis, the rear surface of the peripheral region is divided into an inner periphery-side region and an outer periphery-side region, and the plurality of total reflection prism elements form a first annular concave curved surface centered on the optical axis as an envelope surface in the inner periphery-side region and form a second annular concave curved surface centered on the optical axis as an envelope surface in the outer periphery-side region, each of the plurality of total reflection prism elements formed in the inner periphery-side region is configured to totally reflect light emitted from a first virtual point light source located on a rear side of the vehicle lamp relative to the light source as parallel light directed toward a forward-facing direction of the vehicle lamp, within a plane including the optical axis, and each of the plurality of total reflection prism elements formed in the outer periphery-side region is configured to totally reflect light emitted from a second virtual point light source located on a rear side of the vehicle lamp relative to the light source and on a front side of the vehicle lamp relative to the first virtual point light source as parallel light directed toward the forward-facing direction of the vehicle lamp, within the plane including the optical axis.

3. The vehicle lamp according to claim 2, wherein the first virtual point light source is positioned on an opposite side to an incidence region, in the inner periphery-side region, of light emitted from the first virtual point light source with respect to the optical axis, and the second virtual point light source is positioned on an opposite side to an incidence region, in the outer periphery-side region, of light emitted from the second virtual point light source with respect to the optical axis.

4. The vehicle lamp according to claim 1, wherein the light source includes a light-emitting element arranged with a light-emitting surface facing the front of the vehicle lamp.

* * * * *